US008619089B2

(12) United States Patent
Makabe

(10) Patent No.: US 8,619,089 B2
(45) Date of Patent: Dec. 31, 2013

(54) DATA TRANSFER CIRCUIT AND SEMICONDUCTOR INTEGRATED CIRCUIT EQUIPPED WITH DATA TRANSFER CIRCUIT

(75) Inventor: Takeshi Makabe, Tama (JP)

(73) Assignee: Seiko Epson Corporation (JP)

( * ) Notice: Subject to any disclaimer, the term of this patent is extended or adjusted under 35 U.S.C. 154(b) by 1380 days.

(21) Appl. No.: 11/877,927

(22) Filed: Oct. 24, 2007

(65) Prior Publication Data

US 2008/0100634 A1 May 1, 2008

(30) Foreign Application Priority Data

Oct. 25, 2006 (JP) ................................ 2006-290091

(51) Int. Cl.
*G09G 5/39* (2006.01)
*G06F 13/28* (2006.01)
*G06F 13/372* (2006.01)
*G06F 12/00* (2006.01)
*G06F 12/02* (2006.01)

(52) U.S. Cl.
USPC ........... 345/534; 345/531; 345/533; 345/564; 345/565; 345/566

(58) Field of Classification Search
USPC .................. 345/531, 533, 534, 564, 565, 566
See application file for complete search history.

(56) References Cited

U.S. PATENT DOCUMENTS 4,897,636 A * 1/1990 Nishi et al. .................... 345/682
7,057,620 B2 * 6/2006 Aleksic et al. ................ 345/522
7,102,645 B2 * 9/2006 Chow ............................ 345/520
2002/0176011 A1 * 11/2002 Kuwayama ................... 348/239
2006/0262133 A1 * 11/2006 Sakamaki et al. ............ 345/592

FOREIGN PATENT DOCUMENTS

JP 62-114055 5/1987
JP 08-194812 7/1996
JP 11-296472 10/1999
WO WO2005-010670 2/2005

* cited by examiner

*Primary Examiner* — Jeffrey Chow
(74) *Attorney, Agent, or Firm* — Harness, Dickey & Pierce, P.L.C.

(57) ABSTRACT

A data transfer circuit that transfers a first kind of data stored in an external memory circuit includes: an internal memory circuit that is capable of, by an external circuit, writing and/or rewriting a second kind of data including information for one region as a transfer source in the external memory circuit and another region as a transfer destination in the external memory circuit; a transfer circuit that transfer the first kind of data; and a control circuit that makes the transfer circuit transfer the first kind of data stored in the one region to the other region based on the second kind of data.

6 Claims, 39 Drawing Sheets

| WORD | Bit | NAME | FUNCTION | VALUE |
|---|---|---|---|---|
| FIRST WORD | 31–24 | —— | —— | —— |
| | 23 | LINKEN | iBitBLT LINK ENABLE | 1: ALLOW<br>0: PROHIBIT |
| | 22 | —— | —— | —— |
| | 21–16 | LINKCHN | iBitBLT LINK FIELD | 0~63 |
| | 15–14 | —— | —— | —— |
| | 13–12 | FORMAT | IMAGE DATA FORMAT | 11:32bpp(ARGB)<br>10:32bpp(AYCbCr)<br>01:16bpp(YCbCr)<br>00:Reserved |
| | 11–10 | —— | —— | —— |
| | 9–8 | MODE | iBitBLT MODE SET | 11:NOP<br>10:Fill<br>01:Transparency<br>00:Copy |
| | 7 | —— | —— | —— |
| | 6–4 | TRGSRC | TRIGGER SIGNAL SELECTION | 111:Reserved<br>110:Reserved<br>101:Port(Pos.)<br>100:Port(Neg.)<br>011:HSYNC<br>010:VSYNC EVEN or ODD<br>001:VSYNC ODD<br>000:VSYNC EVEN |

| ADDRESS | REGISTER NAME | R/W | FUNCTION | INITIAL VALUE |
|---|---|---|---|---|
| 0x00 | ibitblt_INTSTAT | R/W | INTERRUPT FACTOR FLAG | 0x0000 |
| 0x04 | ibitblt_INTENB | R/W | INTERRUPT ENABLE | 0x0000 |
| 0x08 | ibitblt0_DMAENB | R/W | iBitBLT0 TRANSFER START | 0x0000 |
| 0x0C | ibitblt1_DMAENB | R/W | iBitBLT1 TRANSFER START | 0x0000 |
| 0x10 | ibitblt_TRGCNT | R | TRIGGER COUNTER | 0x0000 |

FIG. 3

FIG. 4A

| ADDRESS | REGISTER NAME | Bit | R/W | FUNCTION | VALUE | INITIAL VALUE |
|---|---|---|---|---|---|---|
| 0x00 | ibitblt_INTSTAT | 31-30 | — | — | — | |
| | | 29-24 | R | BLT1 COMPLETED CHANNEL NUMBER | | 0 |
| | | 23-17 | — | — | — | |
| | | 16 | R | BLT1 COMPLETED | 1: FACTOR OCCURRED<br>0: NO FACTOR | 0 |
| | | | W | | 1: CLEAR<br>0: IGNORE | |
| | | 15-14 | — | — | — | |
| | | 13-8 | R | BLT0 COMPLETED CHANNEL NUMBER | | 0 |
| | | 7-1 | — | — | — | |
| | | 0 | R | BLT0 COMPLETED | 1: FACTOR OCCURRED<br>0: NO FACTOR | 0 |
| | | | W | | 1: CLEAR<br>0: IGNORE | |

FIG. 4B

| ADDRESS | REGISTER NAME | Bit | R/W | FUNCTION | VALUE | INITIAL VALUE |
|---|---|---|---|---|---|---|
| 0x04 | ibitblt_INTENB | 31-2 | — | — | — | |
| | | 1 | R/W | BLT1 COMPLETED INTERRUPT ENABLE | 1: ALLOW<br>0: PROHIBIT | 0 |
| | | 0 | R/W | BLT0 COMPLETED INTERRUPT ENABLE | 1: ALLOW<br>0: PROHIBIT | 0 |

FIG. 5A

| ADDRESS | REGISTER NAME | Bit | R/W | FUNCTION | VALUE | INITIAL VALUE |
|---|---|---|---|---|---|---|
| 0x08 | ibitblt0_DMAENB | 31–8 | — | — | | |
| | | 7 | R/W | BLT0 START | 1: START<br>0: STOP | 0 |
| | | 6 | — | — | | |
| | | 5–0 | R/W | BLT0 CHANNEL NUMBER | | 0 |

FIG. 5B

| ADDRESS | REGISTER NAME | Bit | R/W | FUNCTION | VALUE | INITIAL VALUE |
|---|---|---|---|---|---|---|
| 0x0C | ibitblt1_DMAENB | 31–8 | — | — | | |
| | | 7 | R/W | BLT1 START | 1: START<br>0: STOP | 0 |
| | | 6 | — | — | | |
| | | 5–0 | R/W | BLT1 CHANNEL NUMBER | | 0 |

FIG. 5C

| ADDRESS | REGISTER NAME | Bit | R/W | FUNCTION | VALUE | INITIAL VALUE |
|---|---|---|---|---|---|---|
| 0x10 | ibitblt_TRGCNT | 31–16 | R | BLT1 TRIGGER COUNTER | | 0 |
| | | 15–0 | R | BLT0 TRIGGER COUNTER | | 0 |

| WORD | Bit | NAME | FUNCTION | VALUE |
|---|---|---|---|---|
| FIRST WORD | 31-24 | — | — | — |
| | 23 | LINKEN | iBitBLT LINK ENABLE | 1: ALLOW<br>0: PROHIBIT |
| | 22 | — | — | — |
| | 21-16 | LINKCHN | iBitBLT LINK FIELD | 0~63 |
| | 15-14 | — | — | — |
| | 13-12 | FORMAT | IMAGE DATA FORMAT | 11: 32bpp (ARGB)<br>10: 32bpp (AYCbCr)<br>01: 16bpp (YCbCr)<br>00: Reserved |
| | 11-10 | — | — | — |
| | 9-8 | MODE | iBitBLT MODE SET | 11: NOP<br>10: Fill<br>01: Transparency<br>00: Copy |
| | 7 | — | — | — |
| | 6-4 | TRGSRC | TRIGGER SIGNAL SELECTION | 111: Reserved<br>110: Reserved<br>101: Port (Pos.)<br>100: Port (Neg.)<br>011: HSYNC<br>010: VSYNC EVEN or ODD<br>001: VSYNC ODD<br>000: VSYNC EVEN |

FIG. 6

| WORD | Bit | NAME | FUNCTION | VALUE |
|---|---|---|---|---|
| FIRST WORD | 3-2 | — | — | — |
| | 1 | **ADRCTRL** | ADDRESS CONTROL | 1: INCREMENT<br>0: DECREMENT |
| | 0 | **INTENB** | END INTERRUPT ENABLE | 1: ALLOW<br>0: PROHIBIT |
| SECOND WORD | 31-16 | — | — | — |
| | 15-0 | **TRGCNT** | TRANSFER START TRIGGER FREQUENCY | |
| THIRD WORD | 31-16 | — | — | — |
| | 15-0 | **WSIZE** | HORIZONTAL DIRECTION DATA SIZE | |
| FOURTH WORD | 31-16 | — | — | — |
| | 15-0 | **HSIZE** | VERTICAL DIRECTION DATA SIZE | |
| FIFTH WORD | 31-16 | — | — | — |
| | 15-0 | **SROFFSIZE** | TRANSFER SOURCE IMAGE LINE OFFSET | |
| SIXTH WORD | 31-16 | — | — | — |
| | 15-0 | **DSOFFSIZE** | TRANSFER DESTINATION IMAGE LINE OFFSET | |
| SEVENTH WORD | 31-0 | **SRADR** | TRANSFER SOURCE HEAD ADDRESS<br>(FILL PATTERN DATA WHEN SOLID FILL) | |
| EIGHTH WORD | 31-0 | **DSADR** | TRANSFER DESTINATION HEAD ADDRESS | |

FIG. 7

DATA TRANSFER CIRCUIT AND SEMICONDUCTOR INTEGRATED CIRCUIT EQUIPPED WITH DATA TRANSFER CIRCUIT

The entire disclosure of Japanese Patent Application No. 2006-290091, filed Oct. 25, 2006 is expressly incorporated by reference herein.

BACKGROUND

1. Technical Field

Several aspects of the invention relate to a data transfer circuit that transfers data stored in an external memory. Further, several aspects of the invention relate to a semiconductor integrated circuit equipped with such a data transfer circuit.

2. Related Art

Apparatuses that use a display device such as an LCD display device (for example, cellular phone devices, personal computers and the like) display blinking icons, animated icons and the like, for indicating that, for example, a battery has a few remaining capacity, an external device such as a printer, a hard disk device or the like is being accessed, etc.

In general, image data for displaying an image is stored in a memory (frame memory). Addresses of a frame memory have one-to-one correspondence to positions (pixels) on a display screen of a display body (for example, an LCD panel), and a display controller (for example, an LCD controller) transfers the image data stored in the frame memory to the display body, whereby the image is displayed on the display screen of the display body. Generally, the display body does not have a function to store image data. Therefore, the display controller repeatedly transfer image data stored in the frame memory to the display body periodically (cyclically) according to the frame rate.

For example, the blinking display of an icon can be realized through rewriting image data in a frame memory at a longer cycle than the frame rate. For example, a blinking display of a letter (character) such as "○" can be realized as follows. First image data that has a character "○" disposed therein and second image data that does not have the character "○" are prepared in a memory region (work area) other than the frame memory, and the first image data and the second image data are alternately transferred to the frame memory according to a desired blinking display time interval. Also, an animated display can be realized as follows. Many more image data sets are prepared in a work area, and some or selected ones of the image data sets are transferred to the frame memory according to a desired time interval.

In prior art, in the above-described operation of transferring image data to the frame memory, a timer circuit measures an interval (timing) to change the display, the timer circuit informs the CPU of the timing to change the display with an interrupt signal or the like, and the CPU rewrites the image data in the frame memory. However, according to the prior art technology, the CPU has to perform an interrupt processing (a processing to rewrite the image data in the frame memory) while temporarily stopping a processing being conducted at the time of generation of the interrupt.

Japanese Laid-open Patent Application JP-A-11-296472 describes a display control circuit having a memory device that stores data for cyclical display and a transfer device that performs DMA transfer of the data to a predetermined display device, wherein the transfer device repeats DMA transfers in synchronism with a periodic signal corresponding to a predetermined cycle. By this display control circuit, image data for blinking display or the like can be DMA-transferred, such that it becomes unnecessary for the CPU to perform an interrupt processing each time a blinking display or the like takes place.

However, this display control circuit can perform only predetermined (designed) DMA transfers. Therefore, for example, when the number of icons to be blinked wants to be increased, there is a problem in that the hardware needs to be reconfigured, and thus it is not easy to expand the display function.

SUMMARY

In accordance with an embodiment of the present invention, there is provided a data transfer circuit that is capable of readily expanding its data transfer function. Also, in accordance with an embodiment of the present invention, a semiconductor integrated circuit equipped with such a data transfer circuit can be provided.

A data transfer circuit in accordance with an aspect of an embodiment of the invention pertains to a circuit that transfers a first kind of data stored in an external memory circuit, and the data transfer circuit including an internal memory circuit that is capable of, by an external circuit, writing and/or rewriting a second kind of data including information for one region as a transfer source in the external memory circuit and another region as a transfer destination in the external memory circuit, a transfer circuit that transfers the first kind of data, and a control circuit that makes the transfer circuit transfer the first kind of data stored in the one region to the other region based on the second kind of data.

A semiconductor integrated circuit in accordance with an aspect of an embodiment of the invention is equipped with the data transfer circuit described above.

In accordance with the embodiment of the invention described above, a first kind of data stored in one region of an external memory circuit can be transferred to another region of the external memory circuit based on a second kind of data that may be written and/rewritten by an external circuit. Accordingly, an expansion of the data transfer function can be readily made.

BRIEF DESCRIPTION OF THE DRAWINGS

FIG. 3 is a figure showing an outline of the register group shown in FIG. 2.

FIGS. 4A and 4B are figures showing details of the register group shown in FIG. 3.

FIGS. 5A-5C are figures showing details of the register group shown in FIG. 3.

FIG. 6 is a figure showing details of the register group shown in FIG. 3.

FIG. 7 is a figure showing details of the register group shown in FIG. 3.

DESCRIPTION OF EXEMPLARY EMBODIMENTS

Figure 1:
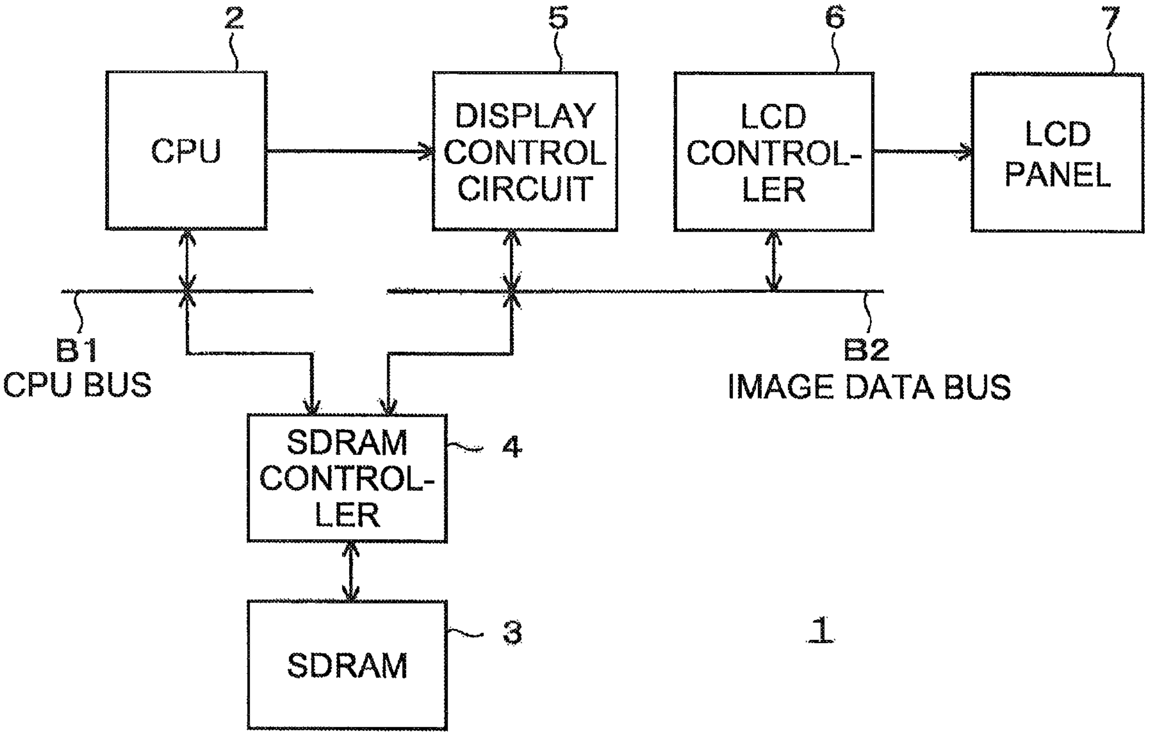
FIG. 1 is a schematic diagram of a system using a display control circuit in accordance with an embodiment of the invention.

Preferred embodiments of the invention are described below with reference to the accompanying drawings. It is noted that the same components are appended with the same reference numerals, and their description is not repeated. FIG. 1 shows a schematic diagram of a system using a data transfer circuit in accordance with an embodiment of the invention. According to the present embodiment, the invention is applied to a display control circuit.

As shown in FIG. 1, the system 1 is equipped with a CPU 2, a SDRAM (synchronous DRAM) 3, a SDRAM controller 4, a display control circuit 5 in accordance with the present embodiment, a LCD controller 6, and a LCD panel 7.

The SDRAM 3 is connected to and controlled by the SDRAM controller 4, has a portion that is used as a display region (frame memory region), and another portion that is used as a work area. The SDRAM controller 4 is connected to the CPU 2 through a CPU bus B1, and is connected to the display control circuit 5 and the LCD controller 6 through an image data bus B2. The CPU 2 is capable of accessing the SDRAM 3 through the CPU bus B1 and the SDRAM controller 4, and the display control circuit 5 and the LCD controller 6 are capable of accessing the SDRAM 3 through the image data but B2 and the SDRAM controller 4. It is noted that a communication circuit and the like may be further connected to the CPU bus B1.

The LCD controller 6 reads out image data in a frame memory region of the SDRAM 3 at a timing according to a frame rate (which is 30 fps in an interlace mode in the present embodiment), drives the LCD panel 7 based on the image data read out, and makes the LCD panel 7 display the image. It is noted that the frame memory region of the SDRAM 3 may be fixed or variable. When the frame memory region of the SDRAM 3 is variable, the CPU 2 may write information specifying a frame memory region in a setting register or the like of the LCD controller 6. The display control circuit 5 performs image transfers within the SDRAM 3.

Figure 2:
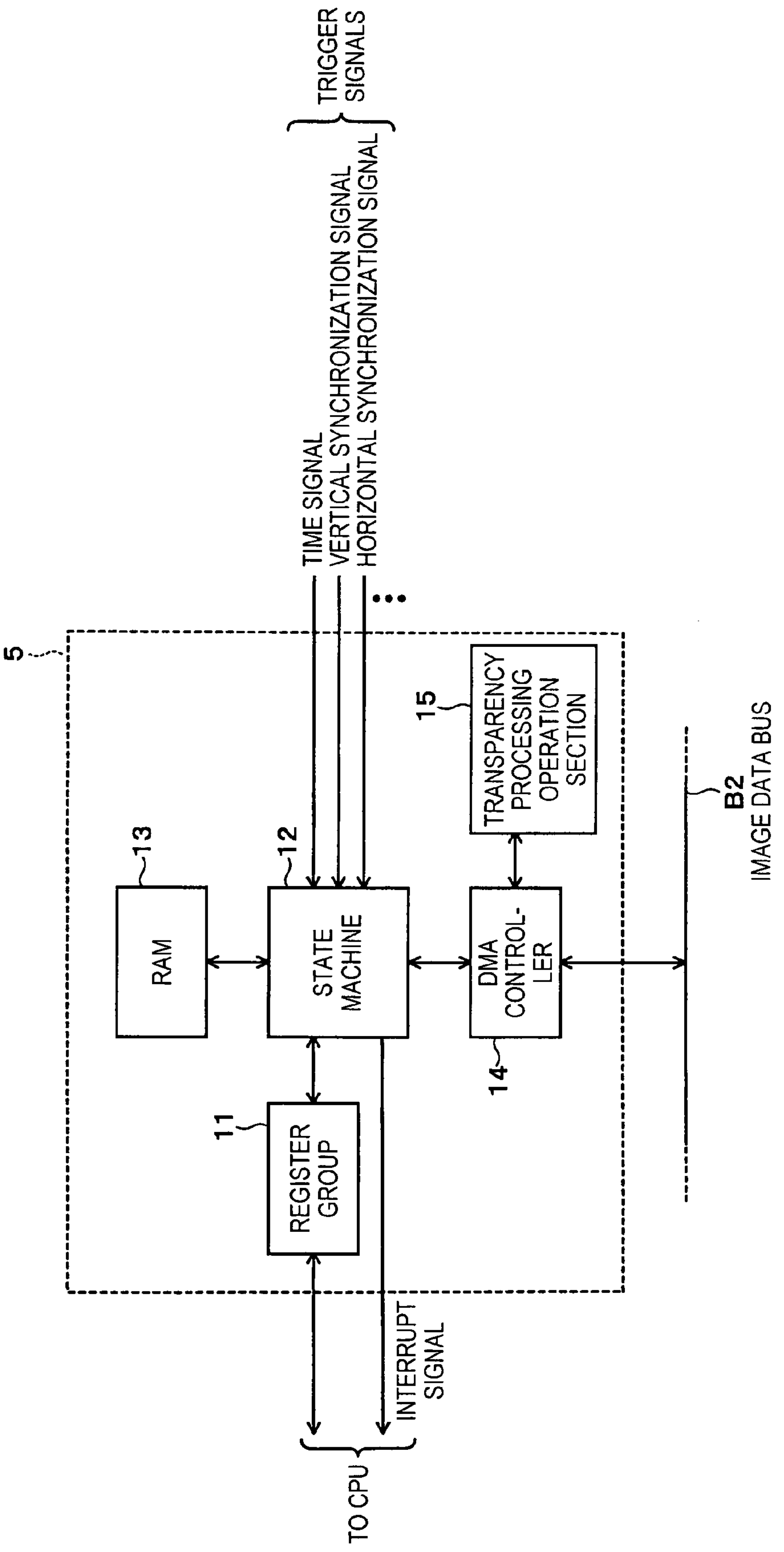
FIG. 2 is a schematic diagram of an internal structure of the display control circuit of FIG. 1.

FIG. 2 is a schematic diagram of the internal structure of the display control circuit 5. As shown in FIG. 2, the display control circuit 5 is equipped with a register group 11, a state machine 12, a RAM 13, a DMA (direct memory access) controller 14, and a transparency processing operation section 15. The state machine 12 can be composed of a sequential circuit and a combinational circuit. It is noted that the display control circuit 5 may be formed as a semiconductor integrated circuit.

The register group 11 is comprised of a plurality of registers that are accessible from the CPU 2. The register group 11 may be mapped in an address space (for example, an I/O address space) of the CPU 2 so as to be accessible from the CPU 2, or may be made accessible from the CPU 2 by other methods. In the present embodiment, the register group 11 is mapped in an address space of the CPU 2.

FIG. 3 is a figure showing one example of the register group 11. FIG. 3 shows five (first-fifth) 32-bit registers. The first-fifth registers are mapped at addresses 0x00, 0x04, 0x08, 0x0C and 0x10, respectively. The first-fourth registers are readable and writable from the CPU 2, and the fifth register is readable from the CPU 2. Initial values of the first-fifth registers are 0x0000, respectively.

FIG. 4A is a figure showing a bit field of the first register (register name "ibitblt_INTSTAT"). The display control circuit 5 is capable of parallel image data transfer in two systems, to be described below. Each of the systems is represented by one channel or a plurality of linked channels (a table (data structure body), to be described below). A bit 0 of the first register represents as to whether an image data transfer of the first system (hereafter called "BLT0") is completed. When BLT0 is completed, the state machine 12 writes "1" at the bit 0 of the first register. The CPU 2 can learn as to whether BLT0 has been completed by reading the bit 0 of the first register. Also, the CPU 2 can clear the bit 0 of the first register by writing "1" at the bit 0 of the first register. Further, when BLT0 has been completed, the state machine 12 writes a channel number of the last channel of the completed BLT0 at bits 13-8 of the first register. The CPU 2 can learn the channel number of the last channel of the completed BLT0 by reading the bits 13-8 of the first register.

Similarly, a bit 16 of the first register represents as to whether an image data transfer of the second system (hereafter called "BLT1") is completed. When BLT1 is completed, the state machine 12 writes "1" at the bit 16 of the first register. The CPU 2 can learn as to whether BLT1 has been completed by reading the bit 16 of the first register. Also, the CPU 2 can clear the bit 16 of the first register by writing "1" at the bit 16 of the first register. Further, when BLT1 has been completed, the state machine 12 writes a channel number of the last channel of the completed BLT1 at bits 29-24 of the first register. The CPU 2 can learn the channel number of the last channel of the completed BLT1 by reading the bits 29-24 of the first register.

FIG. 4B is a figure showing a bit field of the second register (register name "ibitblt_INTENB"). A bit 0 of the second register is a bit for setting as to whether the state machine 12 should output an interrupt signal to the CPU 2, when an interrupt factor (to be described below) occurs at BLT0. By writing "1" at the bit 0 of the second register, the CPU 2 can set such that the state machine 12 outputs an interrupt signal to the CPU 2 when an interrupt factor occurs at BLT0. Also, by writing "0" at the bit 0 of the second register, the CPU 2 can set such that the state machine 12 does not output an interrupt signal to the CPU 2 when an interrupt factor occurs at BLT0.

Similarly, a bit 1 of the second register is a bit for setting as to whether the state machine 12 outputs an interrupt signal to the CPU 2, when an interrupt factor occurs at BLT1. By writing "1" at the bit 1 of the second register, the CPU 2 can set such that the state machine 12 outputs an interrupt signal to the CPU 2 when an interrupt factor occurs at BLT1. Also, by writing "1" at the bit 1 of the second register, the CPU 2 can set such that the state machine 12 does not output an interrupt signal to the CPU 2 when an interrupt factor occurs at BLT1.

FIG. 5A is a figure showing a bit field of the third register (register name "ibitblt0_DMAENB"). By writing a start channel number of BLT0 at bits 5-0 of the third register, and writing "1" at a bit 7 of the third register, the CPU 2 can make the display control circuit 5 start BLT0. When BLT0 is started, the state machine 12 writes a channel number currently being executed at bits 5-0 of the third register. By reading the bits 5-0 of the third register, the CPU 2 can learn as to which of the channels at BLT0 is being executed.

FIG. 5B is a figure showing a bit field of the fourth register (register name "ibitblt1_DMAENB"). By writing a start channel number of BLT1 at bits 5-0 of the fourth register, and writing "1" at a bit 7 of the fourth register, the CPU 2 can make the display control circuit 5 start BLT1. When BLT1 is started, the state machine 12 writes a channel number currently being executed at bits 5-0 of the fourth register. By reading the bits 5-0 of the fourth register, the CPU 2 can learn as to which of the channels at BLT1 is being executed.

FIG. 5C is a figure showing a bit field of the fifth register (register name "ibitblt_TRGCNT"). In order to measure the timing to execute BLT0 and BLT1, the state machine 12 receives inputs of a variety of trigger signals (for example, a timer signal from a timer circuit, a vertical synchronization signal, a horizontal synchronization signal, etc. from the LCD controller 6, and the like), and can count these signals. The state machine 12 writes a count value of a trigger signal of a channel of BLT0 being executed at bits 15-0 of the fifth register, and writes a count value of a trigger signal of a channel of BLT1 being executed at bits 31-16 of the fifth register. By reading these bit fields, the CPU 2 can learn the count values of the trigger signals of BLT0 and BLT1 being executed.

Next, the channel is described. As mentioned above, the channel is a table (data structure), and is stored in the RAM 13 (see FIG. 2). In accordance with the present embodiment, the RAM 13 is capable of storing a maximum of 64 channels. It is noted that the RAM 13 is read/write-accessible from the CPU 2. The RAM 13 may be mapped into an address space (for example, an I/O address space or the like) of the CPU 2 so as to be accessible from the CPU 2, or may be made accessible from the CPU by other methods (for example, through the register group 11—the state machine 12, or the like). In the present embodiment, each one of the channels is composed of 32 bits×8 words.

FIG. 6 and FIG. 7 are figures showing a bit field of first-eighth words of the channel. As shown in FIG. 6, a bit 23 of the first word (called "LINKEN") is a bit that represents as to whether, upon completion of an image data transfer for the current channel, an image data transfer for another channel should be performed. When this bit is "0," BLT0 or BLT1 is completed upon completion of the image data transfer for the current channel. On the other hand, when this bit is "1," an image data transfer for a channel represented by bits 21-16 (called "LINKCHN") of the first word is performed in succession.

Bits 13-12 of the first word represent a format of image data stored in the SDRAM 3 (see FIG. 1). When the bits 13-12 of the first word are "0b11," the format of the image data stored in the SDRAM 3 is an ARGB (RGB with alpha channel (alpha blending) added) format in 32 bpp (bits per pixel).

Figure 8C:
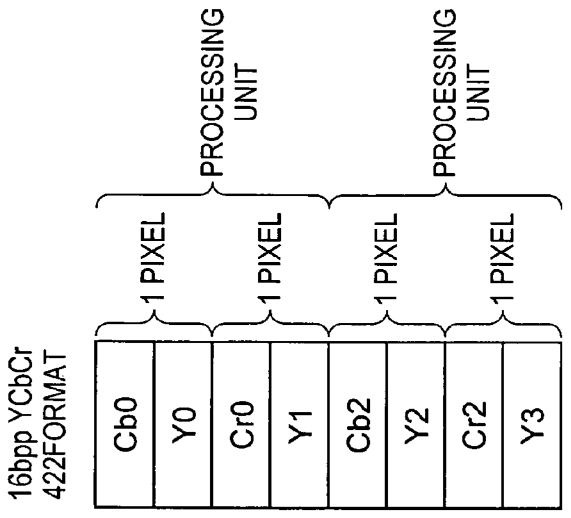
FIGS. 8A-8C are figures showing examples of formats of image data stored in SDRAM shown in FIG. 1.
Figure 8B:
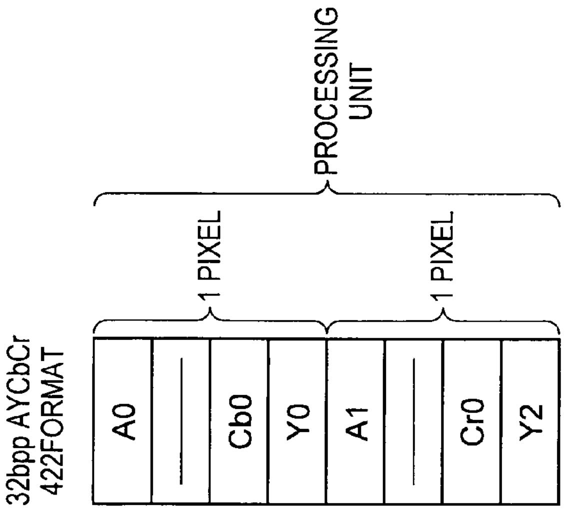
Figure 8A:
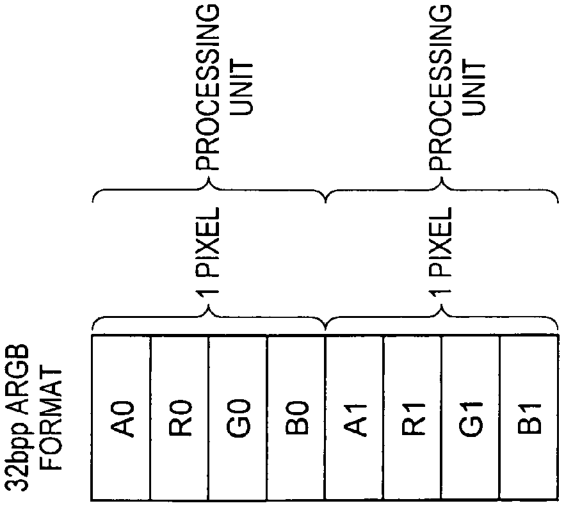

FIG. 8A is a figure showing the ARGB format in 32 bpp. In the case of this format, as shown in FIG. 8A, each pixel is represented by 32 bits in total consisting of A (alpha value) of an 8-bit unsigned integer, R (red) in 8 bits, G (green) in 8 bits and B (blue) in 8 bits. In the case of this format, one pixel defines a processing unit.

Referring back to FIG. 6, when the bits 13-12 of the first word is "0b10," the format of image data stored in the SDRAM 3 is an AYCbCr (YCbCr with alpha channel added) format in 32 bpp.

FIG. 8B is a figure showing the AYCbCr format in 32 bpp. In the case of this format, as shown in FIG. 8B, each pixel is represented by 24 bits in total consisting of A (alpha value) in 8 bits, Cb or Cr in 8 bits, and Y in 8 bits, and also has an unused 8-bit region secured between A and Cb or Cr for word alignment. Also, in the case of this format, two pixels define a processing unit.

Referring back to FIG. 6 again, when the bits 13-12 of the first word is "0b01," the format of image data stored in the SDRAM 3 is a YCbCr format in 16 bpp.

FIG. 8C is a figure showing the YCbCr format in 16 bpp. In the case of this format, as shown in FIG. 8C, each pixel is represented by 16 bits in total consisting of Cb or Cr in 8 bits and Y in 8 bits. In the case of this format, two pixels define a processing unit.

Referring back to FIG. 6 again, bits 9-8 (called "MODE") of the first word represent an image data transfer mode. When the bits 9-8 of the first word are "0b10," an area at the transfer destination is filled with fill pattern data stored in the seventh word to be described below.

When the bits 9-8 of the first word are "0b01," a transparency processing is rendered on image data at the transfer source and on image data at the transfer destination. In this case, the DMA controller 14 (see FIG. 2) reads out the image data at the transfer source and the image data at the transfer destination from the SDRAM 3 (see FIG. 1) and sends them to the transparency processing operation section 15 (see FIG. 2), and the transparency processing operation section 15 performs an operation of $$R_{blended}=\{(255-\alpha)\cdot R_{foreground}+\alpha\cdot R_{background}\}/256 \quad (1)$$

$$G_{blended}=\{(255-\alpha)\cdot G_{foreground}+\alpha\cdot G_{background}\}/256 \quad (2)$$

$$B_{blended}=\{(255-\alpha)\cdot B_{foreground}+\alpha\cdot B_{background}\}/256 \quad (3)$$

In here, $\alpha$ is a $\alpha$ value of pixel data at the transfer source, $R_{foreground}$ is R (red) component of pixel data at the transfer source, $R_{background}$ is R (red) component of pixel data at the transfer destination, and $R_{blended}$ is R (red) component of pixel data to be written at the transfer destination. Similarly, $G_{foreground}$ is G (green) component of pixel data of the transfer source, $G_{background}$ is G (green) component of pixel data at the transfer destination, $G_{blended}$ is G (green) component of pixel data to be written at the transfer destination, $B_{foreground}$ is B (blue) component of pixel data at the transfer source, $B_{background}$ is B (blue) component of pixel data at the transfer destination, and $B_{blended}$ is B (blue) component of pixel data to be written at the transfer destination.

Accordingly, the case where the $\alpha$ value of image data at the transfer source is 0 (0x00) defines complete non-transparency (image data at the transfer source as is), and the case where the $\alpha$ value of image data at the transfer source is 255 (0xFF) defines complete transparency (image data at the transfer destination as is).

Referring back to FIG. 6 again, when the bits 9-8 of the first word are "0b00," image data at the transfer source is merely copied to the transfer destination.

Bits 6-4 (called "TRGSRC") of the first word represent a trigger signal selected for measuring the timing of image data transfer for the current channel. When the bits 6-4 of the first word are "0b101," the state machine 12 counts rising edges (positive edges) of a signal (for example, a timer signal) inputted in the external signal input port. When the bits 6-4 of the first word are "0b100," the state machine 12 counts falling edges (negative edges) of a signal (for example, a timer signal) inputted in the external signal input port. When the bits 6-4 of the first word are "0b011," the state machine 12 counts a horizontal synchronization (HSYNC) signal. When the bits 6-4 of the first word are "0b0100," the state machine 12 counts vertical synchronization (VSYNC EVEN or ODD) signals of both of an even number field and an odd number field. When the bits 6-4 of the first word are "0b001," the state machine 12 counts a vertical synchronization (VSYNC ODD) signal of an odd number field. Also, when the bits 6-4 of the first word are "0b000," the state machine 12 counts a vertical synchronization (VSYNC EVEN) signal of an even number field.

Referring to FIG. 7, a bit 1 (called "ADRCTRL") of the first word represents a direction to which the transfer source and transfer destination addresses are to be changed. When the bit 1 of the first word is "1," the transfer source and transfer destination addresses are incremented; and when the bit 1 of the first word is "0," the transfer source and transfer destination addresses are decremented.

A bit 0 of the first word represents as to whether an interrupt factor should be generated upon completion of a data transfer for the current channel. When the bit 0 of the first word is "1," the state machine 12 generates an interrupt factor upon completion of a data transfer for the current channel; and when the bit 0 of the first word is "0," the state machine 12 does not generate an interrupt factor upon completion of a data transfer for the current channel.

Bits 15-0 (called "TRGCNT") of the second word represent the number of trigger signals to be counted before a data transfer for the current channel is started. The state machine 12 makes the DMA controller 14 start a data transfer for the current channel, after counting trigger signals in the same number as the number set at the bits 15-0 of the second word.

Bits 15-0 (called "WSIZE") of the third word represent a data size in a horizontal direction of data transfer for the current channel, and bits 15-0 (called "HSIZE") of the fourth word represent a data size in a vertical direction of data transfer for the current channel. Bits 15-0 (called "SROFFSIZE") of the fifth word represent an offset between adjacent lines of image data at the transfer source, and bits 15-0 (called "DSOFFSIZE") of the sixth word represent an offset between adjacent lines of image data at the transfer destination.

Bits 31-0 (called "SRADR") of the seventh word represent a head address of the transfer source. It is noted that, when the aforementioned bits 9-8 (called "MODE") of the first word have a value of "0b10" (Fill), the bits 31-0 of the seventh word are used as pattern data (Fill Pattern Data) to fill the transfer destination, not as an address.

Bits 31-0 (called "DSADR") of the eighth word represent a head address of the transfer destination.

Next, operations of the display control circuit 5 are described with reference to concrete examples. A first concrete example is described as to a case where a blinking display of an icon is performed. First, the CPU 2 (or another circuit connected to the CPU bus B1) writes image data in the SDRAM 3 (see FIG. 1). Also, the CPU 2 writes channels in the RAM 13 (see FIG. 2).

Figure 9:
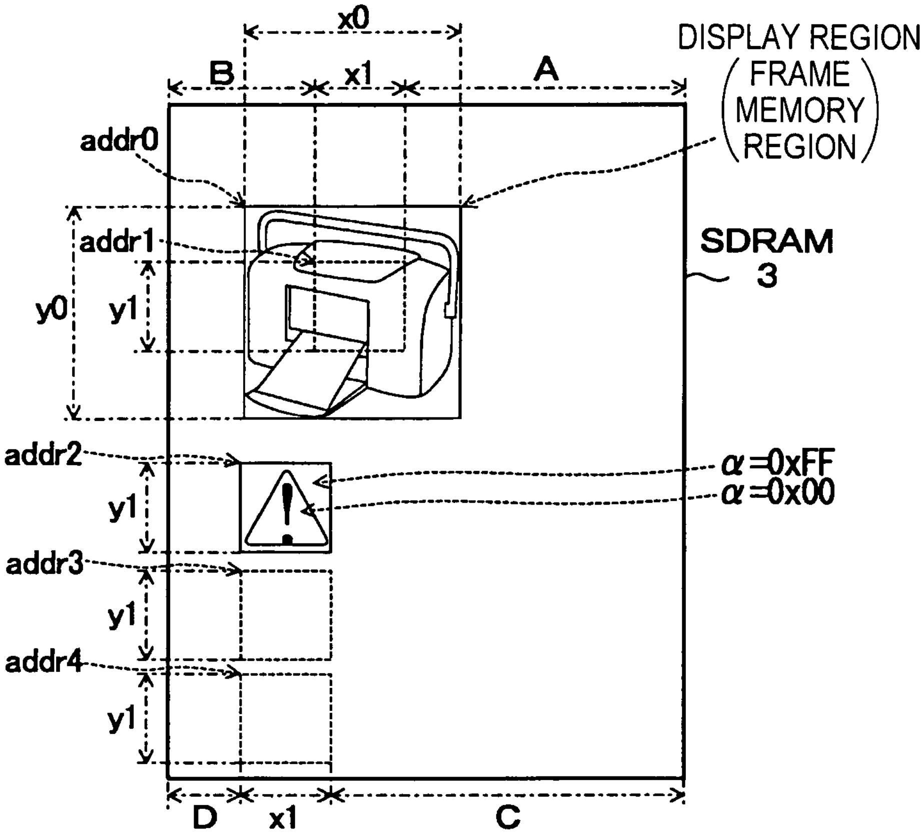
FIG. 9 is a figure showing an example of image data stored in SDRAM shown in FIG. 1.

FIG. 9 is a figure showing an example of image data written to the SDRAM 3. It is noted that the SDRAM 3 is not a display body but is a memory circuit, and the image data is written to the SDRAM 3. However, for ready understanding, an image represented by the image data is indicated in the SDRAM 3.

Also, in this figure, a rectangular region within the SDRAM 3 having a width (traverse size) x0 and a height (longitudinal size) y0 with an address addr0 as being a head address is set as a display region (frame memory region), and it is assumed that an image based on the image data within the rectangular region is displayed on the LCD panel 7 (see FIG. 1).

Also, in a rectangular region within the SDRAM 3 having a width x1 and a height y1 with an address addr2 as being a head address, icon image data is stored. However, as this rectangular region is not a display region (frame memory region), an icon image based on the icon image data within the rectangular region shall not be displayed on the LCD panel 7. It is noted that the $\alpha$ value of the background (marginal region) of the icon image data is assumed to be "0xFF" and the $\alpha$ value of the foreground (region adjacent to the center) of the icon image data is assumed to be "0x00."

Figure 10:
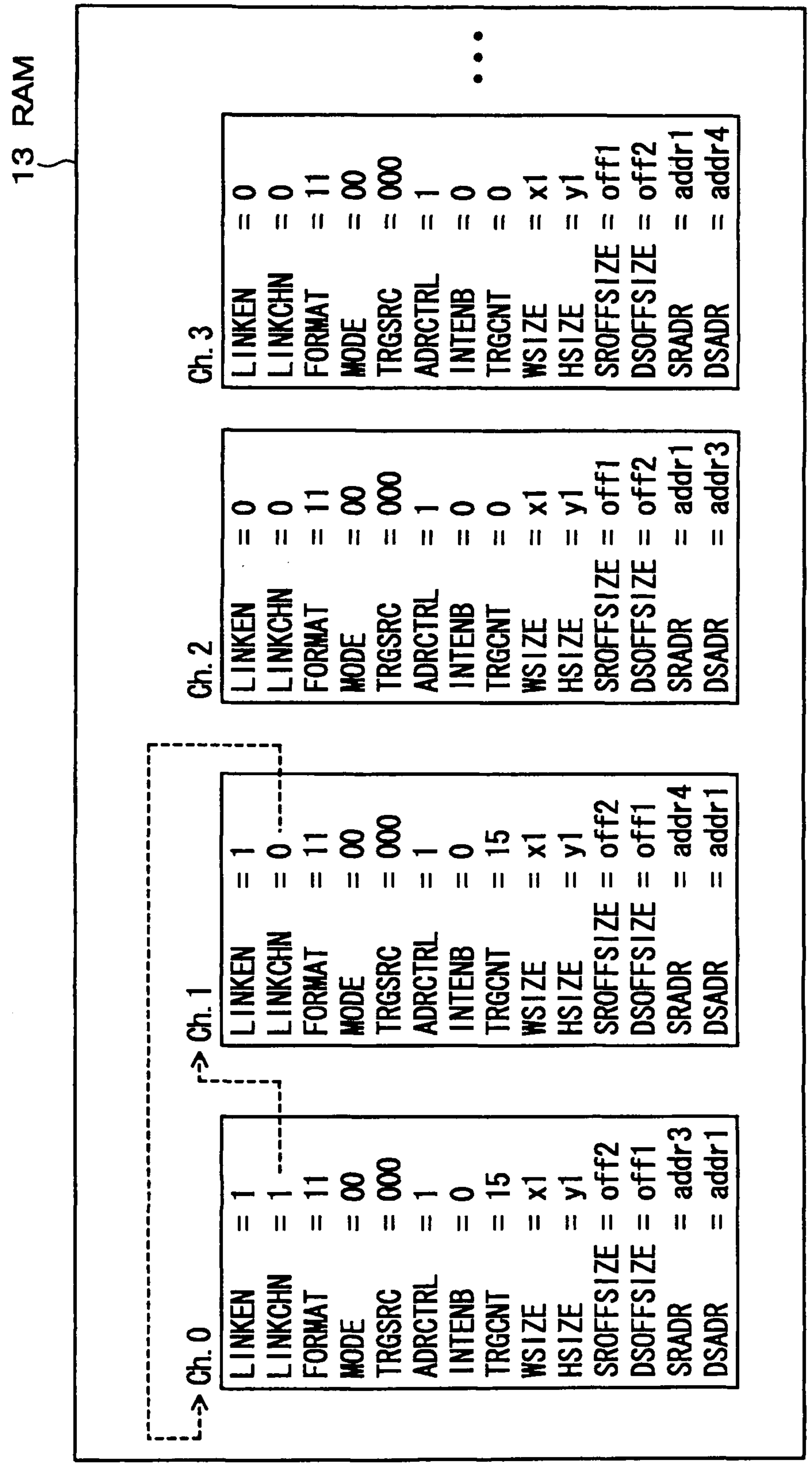
FIG. 10 is a figure showing an example of channels stored in RAM shown in FIG. 2.
Figure 11:
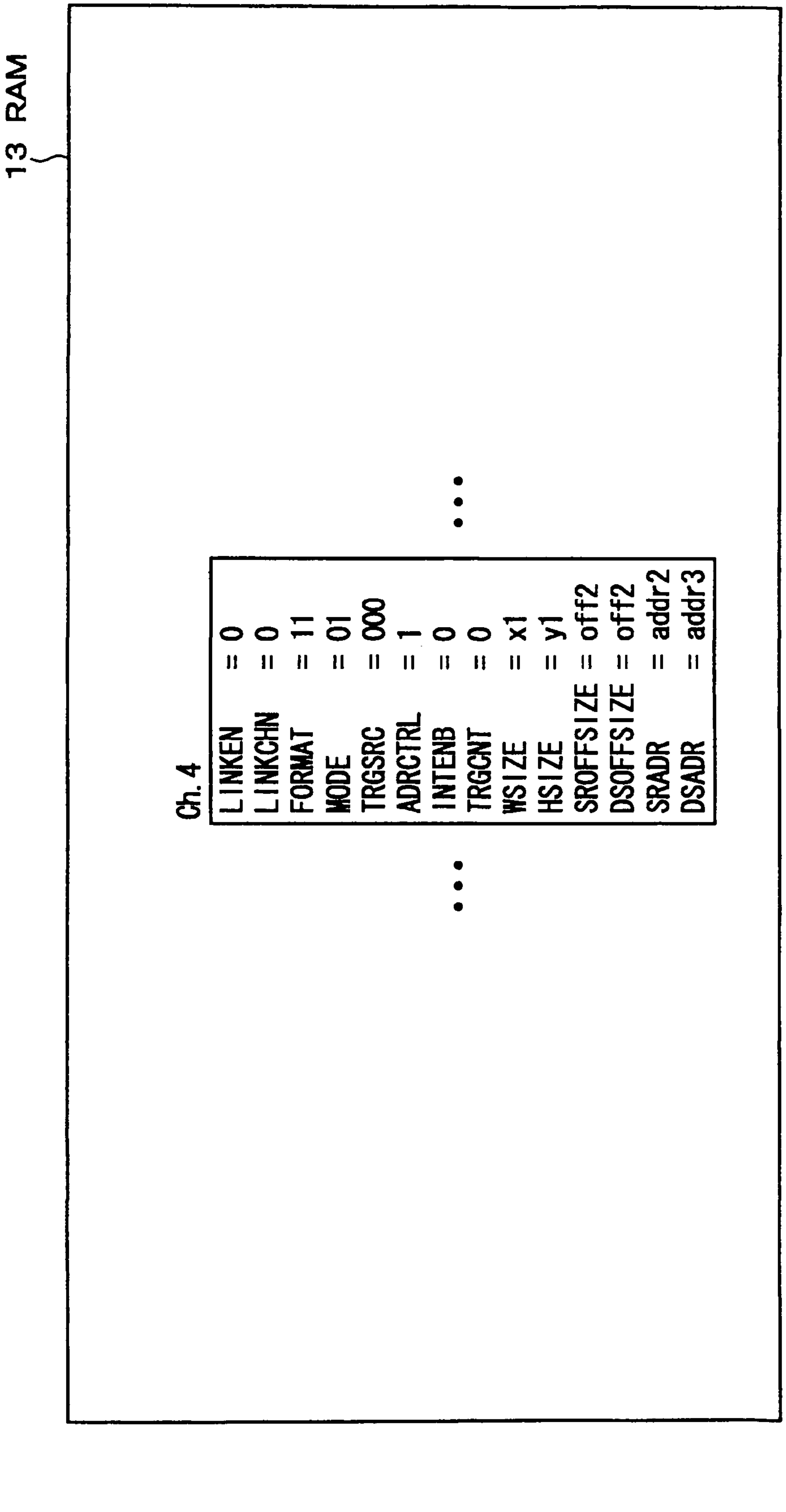
FIG. 11 is a figure showing an example of channels stored in RAM shown in FIG. 2.

FIGS. 10 and 11 are figures showing examples of the channels written to the RAM 13. As shown in FIG. 10, the channel 0 stores "1" as LINKEN, "1" as LINKCHN, "0b11" as FORMAT, "0b00" as MODE, "0b000" as TRGSRC, "1" as ADRCTRL, "0" as INTENB, "0d15" as TRGCNT, "x1" as WSIZE, "y1" as HSIZE, "off2" as SROFFSIZE, "off1" as DSOFFSIZE, "addr3" as SRADR, and "addr1" as DSADR, respectively. It is noted that "off1" is the sum of A and B shown in FIG. 9, "off2" is the sum of C and D shown in FIG. 9, and "addr1" is an address within the display region (frame memory region).

Also, the channel 1 stores "1" as LINKEN, "0" as LINKCHN, "0b11" as FORMAT, "0b00" as MODE, "0b000" as TRGSRC, "1" as ADRCTRL, "0" as INTENB, "0d15" as TRGCNT, "x1" as WSIZE, "y1" as HSIZE, "off2" as SROFFSIZE, "off1" as DSOFFSIZE, "addr4" as SRADR, and "addr1" as DSADR, respectively.

Further, the channel 2 stores "0" as LINKEN, "0" as LINKCHN, "0b11" as FORMAT, "0b00" as MODE, "0b000" as TRGSRC, "1" as ADRCTRL, "0" as INTENB, "0d0" as TRGCNT, "x1" as WSIZE, "y1" as HSIZE, "off1" as SROFFSIZE, "off2" as DSOFFSIZE, "addr1" as SRADR, and "addr3" as DSADR, respectively.

Also, the channel 3 stores "0" as LINKEN, "0" as LINKCHN, "0b11" as FORMAT, "0b00" as MODE, "0b000" as TRGSRC, "1" as ADRCTRL, "0" as INTENB, "0d0" as TRGCNT, "x1" as WSIZE, "y1" as HSIZE, "off1" as SROFFSIZE, "off2" as DSOFFSIZE, "addr1" as SRADR, and "addr4" as DSADR, respectively.

Also, the channel 4 stores "0" as LINKEN, "0" as LINKCHN, "0b11" as FORMAT, "0b01" as MODE, "0b000" as TRGSRC, "1" as ADRCTRL, "0" as INTENB, "0d0" as TRGCNT, "x1" as WSIZE, "y1" as HSIZE, "off2" as SROFFSIZE, "off2" as DSOFFSIZE, "addr2" as SRADR, and "addr3" as DSADR, respectively.

Next, the CPU 2 writes "0d2" at bits 5-0 of a register "ibitblt0_DMAENB," "1" at a bit 7 of a register "ibitblt0_DMAENB," "0d3" at bits 5-0 of a register "ibitblt1_DMAENB," and "1" at a bit 7 of a register "ibitblt1_DMAENB," respectively. It is noted that a timer circuit or the like other than the CPU 2 may write "1" at the bit 7 of the register "ibitblt0_DMAENB" and at the bit 7 of the register "ibitblt1_DMAENB."

In response, the state machine 12 makes the DMA controller 14 perform an image data transfer for the channel 2 and an image data transfer for the channel 3 in parallel. As MODE of the channel 2 and the channel 3 is "0x00" (Copy), the image data in the rectangular region having the width x1 and the height y1 with the address addr1 as being a head address is copied to a rectangular region having a width x1 and a height y1 with an address addr3 as being a head address and to a rectangular region having a width x1 and a height y1 with an address addr4 as being a head address.

Figure 12B:
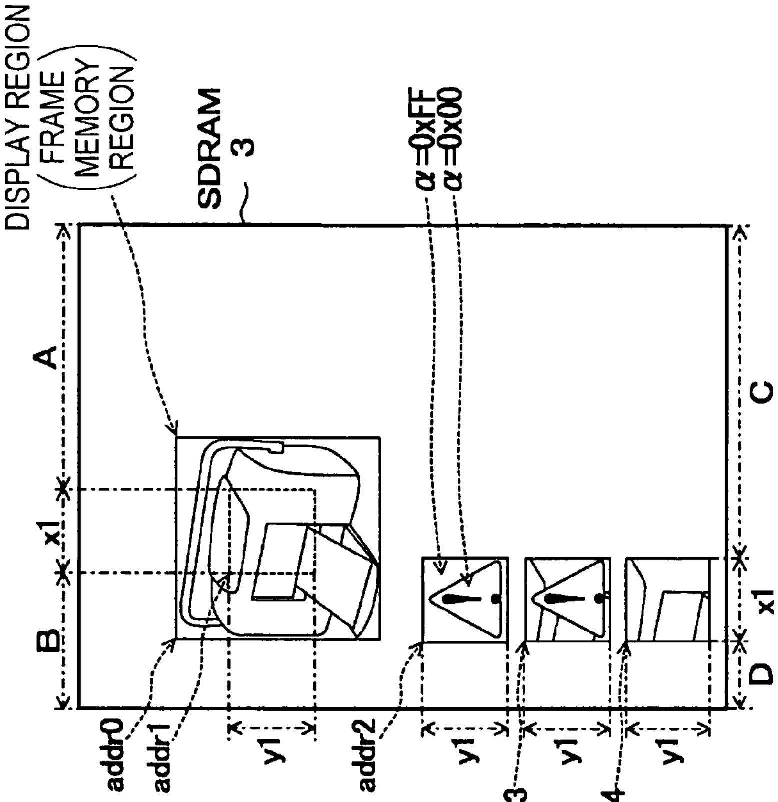
FIGS. 12A and 12B are figures showing examples of image data stored in SDRAM shown in FIG. 1.
Figure 12A:
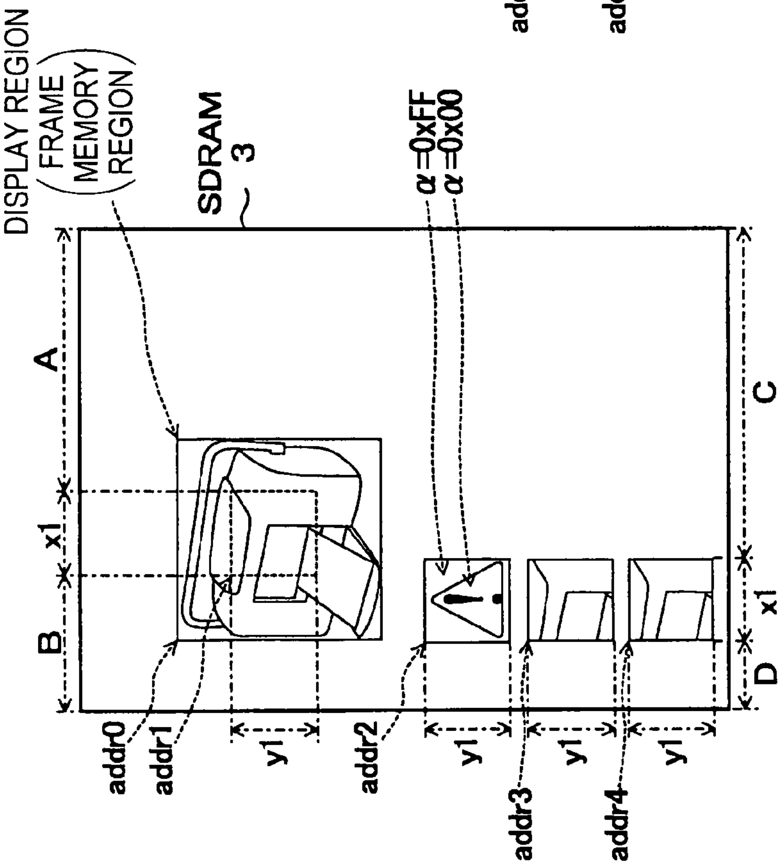

FIG. 12A is a figure showing the SDRAM 3 upon completion of the image data transfer for the channel 2 and the image data transfer for the channel 3.

Next, the CPU writes "0d4" at the bits 5-0 of the register "ibitblt0_DMAENB" and "1" at the bit 7 of the register "ibitblt0_DMAENB," respectively.

In response, the state machine 12 makes the DMA controller 14 perform an image data transfer for the channel 4. As MODE of the channel 4 is "0x01" (Transparency), the image data in the rectangular region having the width x1 and the height y1 with the address addr2 as being the head address is transparency-copied to the rectangular region having the width x1 and the height y1 with the address addr3 as being the head address.

FIG. 12B is a figure showing the SDRAM 3 upon completion of the image data transfer for the channel 4.

Next, the CPU writes "0d0" at the bits 5-0 of the register "ibitblt0_DMAENB" and "1" at the bit 7 of the register "ibitblt0_DMAENB," respectively.

As TRGCNT of the channel 0 is "0d15," the state machine 12, upon counting the trigger signal (which is VSYNC EVEN because TRGSRC of the channel 0 is "0b000" in this case) 15 times, in other words, 0.5 seconds later, makes the DMA controller 14 start an image data transfer for the channel 0. By this, the image data in the rectangular region having the width x1 and the height y1 with the address addr3 as being the head address is copied to the rectangular region having the width x1 and the height y1 with the address addr1 as being the head address.

Figure 13A:
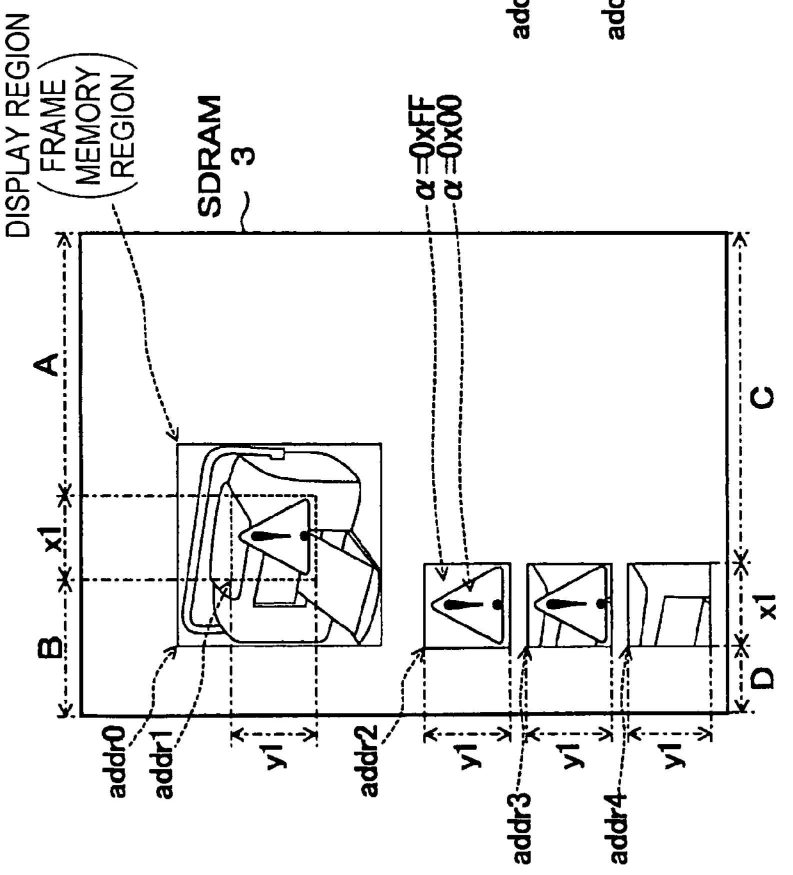
FIGS. 13A and 13B are figures showing examples of image data stored in SDRAM shown in FIG. 1.

FIG. 13A is a figure showing the SDRAM 3 upon completion of the image data transfer for the channel 0.

Next, as LINKEN of the channel 0 is "1" and LINKCHN is "1," the state machine 12 performs a processing for the channel 1. As TRGCNT of the channel 1 is "0d15," the state machine 12, upon counting the trigger signal (which is VSYNC EVEN because TRGSRC of the channel 1 is "0b000" in this case) 15 times, in other words, 0.5 seconds later, makes the DMA controller 14 start an image data transfer for the channel 1. By this, the image data in the rectangular region having the width x1 and the height y1 with the address addr4 as being the head address is copied to the rectangular region having the width x1 and the height y1 with the address addr1 as being the head address.

Figure 13B:
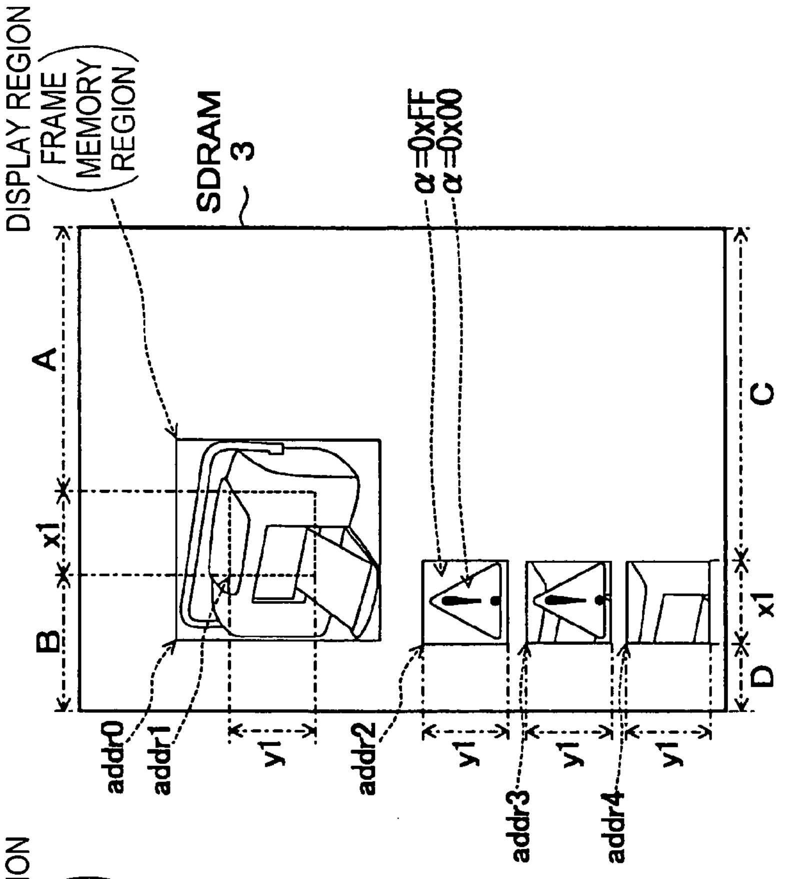

FIG. 13B is a figure showing the SDRAM 3 upon completion of the image data transfer for the channel 0.

As LINKEN of the channel 1 is "1" and LINKCHN thereof is "0," the state machine 12 repeats the processing for the channel 0 and the channel 1. As a result, a blinking display of an icon image is realized.

In this manner, in accordance with the present embodiment, the CPU 2 writes channels to the RAM 13, whereby the data transfer function of the display control circuit 5 can be readily expanded, and a blinking display of an icon can be readily realized. Also, while a blinking display of an icon is performed (in other words, while the state machine 12 is repeatedly performing the processing for the channel 0 and the channel 1), the CPU 2 does not need to perform any processing, such that the load on the CPU can be alleviated while the blinking display of an icon is performed, and the power consumption of the entire system 1 can be reduced.

Also, in accordance with the present embodiment, image data in two series can be transferred in parallel. The present example is described as to the case where one series composed of the channel 2 and another series composed of the channel 3 are processed in parallel. However, each series may be composed of a plurality of linked channels. Also, the present embodiment is implemented such that transfer of image data in two series is performed in parallel. However, it can be implemented such that transfer of image data in three or more series can be performed in parallel.

Furthermore, in accordance with the present embodiment, the SDRAM 3 is used as both of a display region (frame memory region) and a work area. However, a memory used as a display region (frame memory region) and a memory used as a work area may be independently provided.

Next, as a second concrete example of operations of the display control circuit 5, a case of performing a wipe display is described. First, the CPU 2 writes image data in the SDRAM 3 (see FIG. 1), and also writes channels in the RAM 13 (see FIG. 2).

Figure 14:
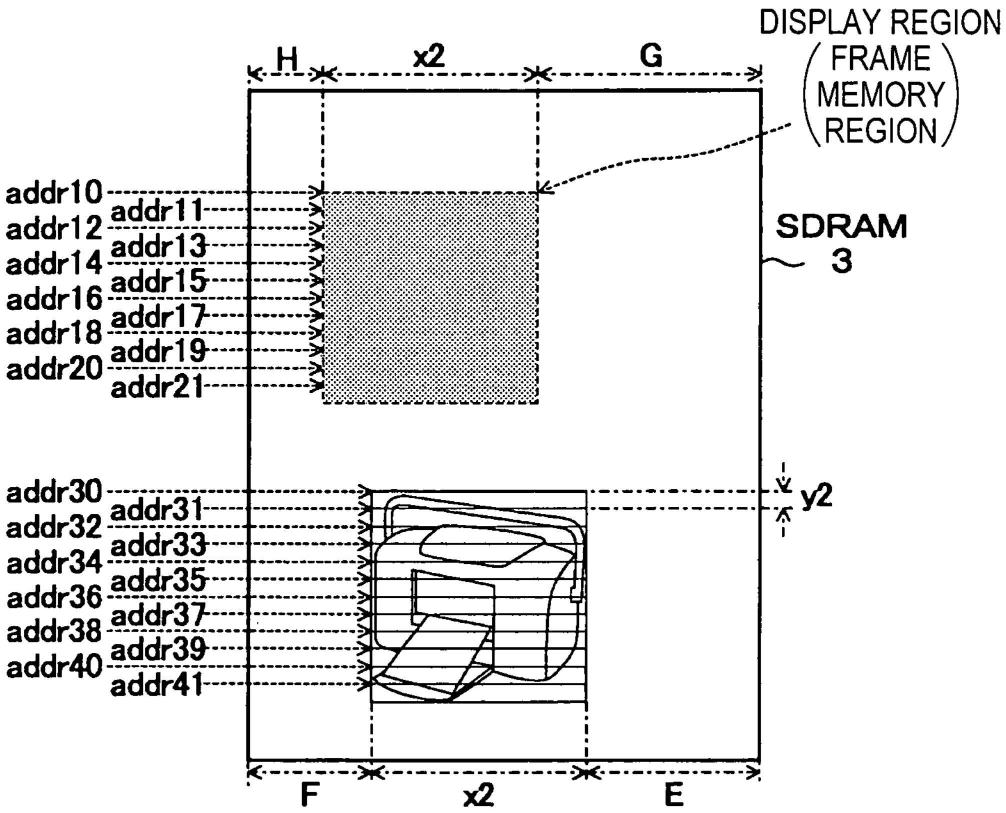
FIG. 14 is a figure showing an example of image data stored in SDRAM shown in FIG. 1.

FIG. 14 is a figure showing an example of image data written to the SDRAM 3. It is noted that the SDRAM 3 is not a display body but is a memory circuit, and what is written to the SDRAM 3 is image data. However, for ready understanding, an image represented by the image data is indicated in the SDRAM 3.

Also, in this example, a rectangular region within the SDRAM 3 having a width x2 and a height y2×12 with an address addr10 as being a head address is set as a display region (frame memory region), and it is assumed that an image based on the image data within the rectangular region is displayed on the LCD panel 7 (see FIG. 1). In the present example, it is assumed that half-tone image data is written to the display region. It is noted that a height between the address addr10 and an address addr11 in the display region, a height between the address addr11 and an address addr12 in the display region, a height between the address addr12 and an address addr13 in the display region, a height between the address addr13 and an address addr14 in the display region, a height between the address addr14 and an address addr15 in the display region, a height between the address addr15 and an address addr16 in the display region, a height between the address addr16 and an address addr17 in the display region, a height between the address addr17 and an address addr18 in the display region, a height between the address addr18 and an address addr19 in the display region, a height between the address addr19 and an address addr20 in the display region, and a height between the address addr20 and an address addr21 in the display region are each assumed to be y2.

Also, in a rectangular region within the SDRAM 3 having a width x2 and a height y2×12 with an address addr30 as being a head address, image data is stored. However, as this rectangular region is not a display region (frame memory region), an image based on the image data within the rectangular region shall not be displayed on the LCD panel 7. It is noted that a height between the address addr30 and an address addr31 in the rectangular region, a height between the address addr31 and an address addr32 in the rectangular region, a height between the address addr32 and an address addr33 in the rectangular region, a height between the address addr33 and an address addr34 in the rectangular region, a height between the address addr34 and an address addr35 in the rectangular region, a height between the address addr35 and an address addr36 in the rectangular region, a height between the address addr36 and an address addr37 in the rectangular region, a height between the address addr37 and an address addr38 in the rectangular region, a height between the address addr38 and an address addr39 in the rectangular region, a height between the address addr39 and an address addr40 in the rectangular region, and a height between the address addr40 and an address addr41 in the rectangular region are each assumed to be y2.

Figure 15:
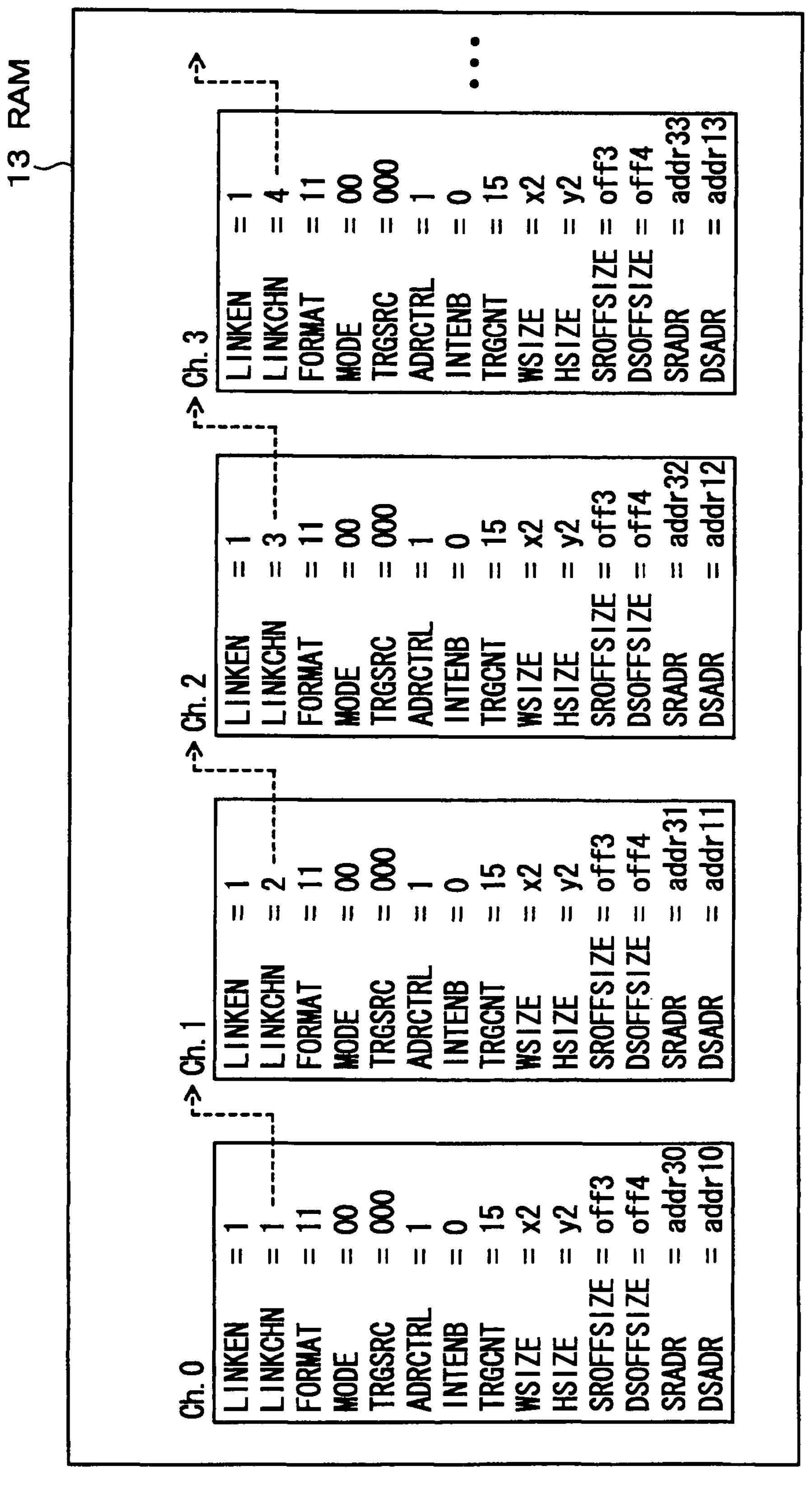
FIG. 15 is a figure showing an example of channels stored in RAM shown in FIG. 2.
Figure 16:
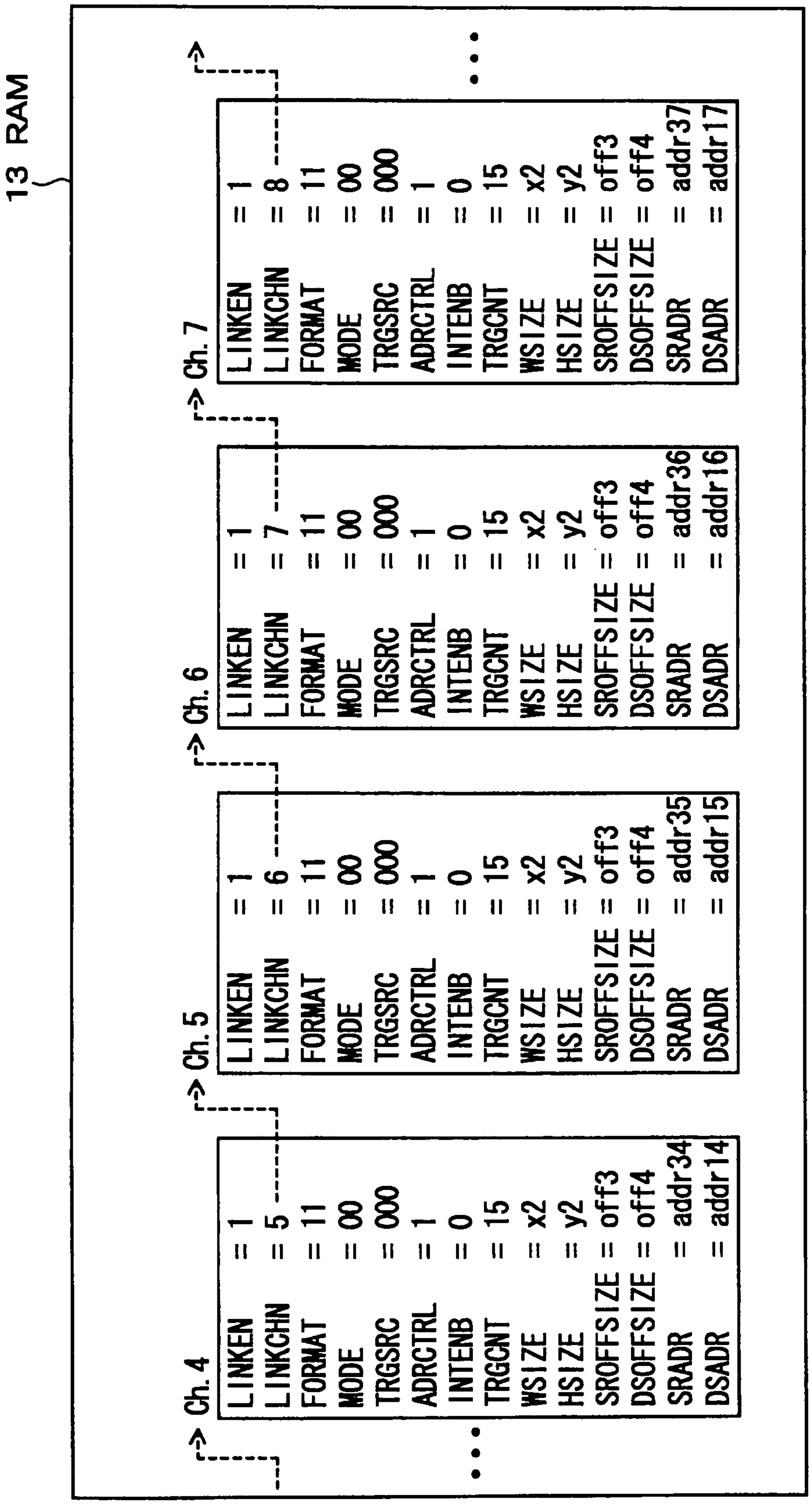
FIG. 16 is a figure showing an example of channels stored in RAM shown in FIG. 2.
Figure 17:
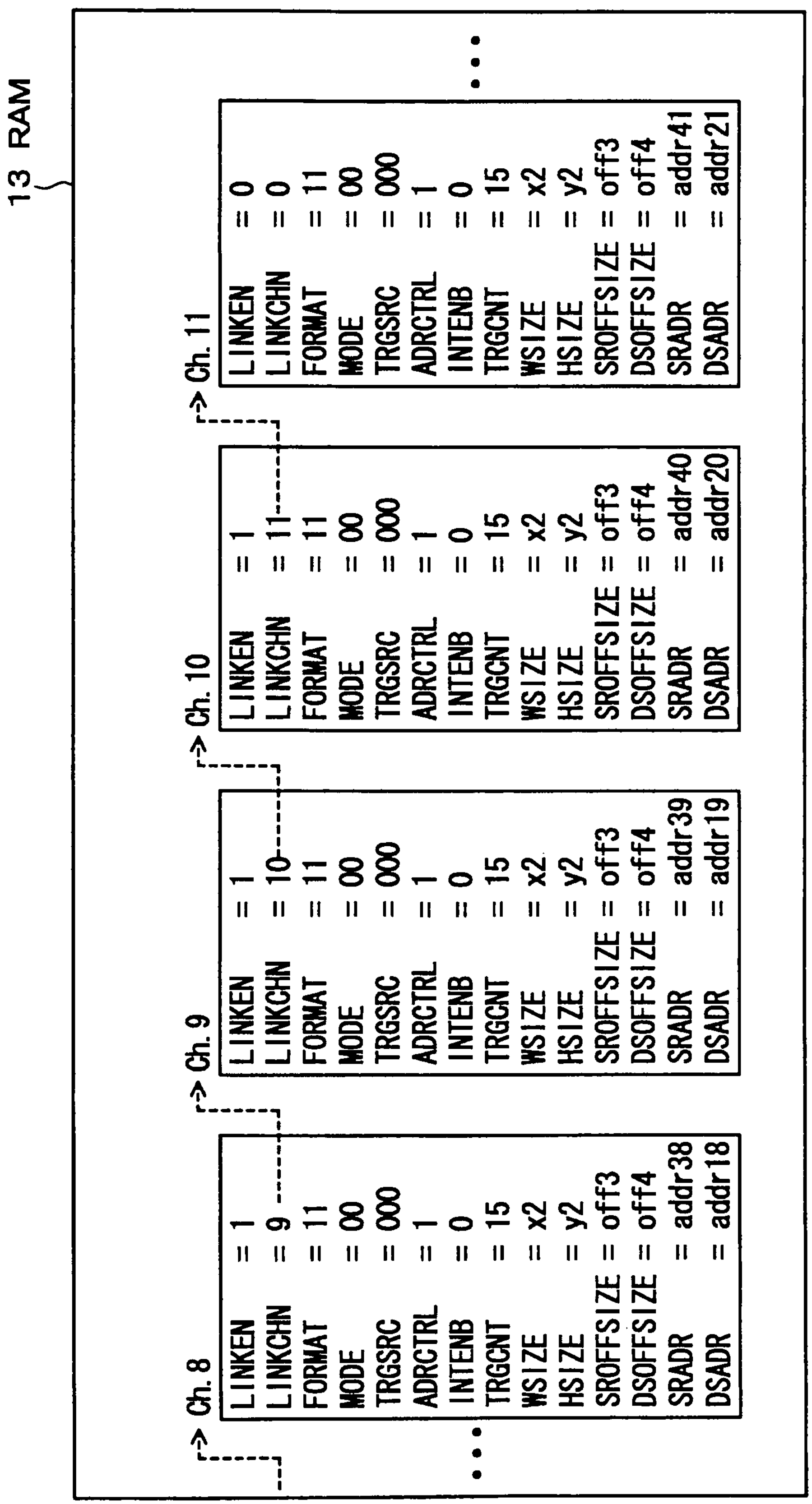
FIG. 17 is a figure showing an example of channels stored in RAM shown in FIG. 2.

FIGS. 15-17 are figures showing examples of the channels written to the RAM 13. As shown in FIG. 15, the channel 0 stores "1" as LINKEN, "1" as LINKCHN, "0b11" as FORMAT, "0b00" as MODE, "0b000" as TRGSRC, "1" as ADRCTRL, "0" as INTENB, "0d15" as TRGCNT, "x2" as WSIZE, "y2" as HSIZE, "off3" as SROFFSIZE, "off4" as DSOFFSIZE, "addr30" as SRADR, and "addr10" as DSADR, respectively. It is noted that "off3" is the sum of E and F shown in FIG. 14, and "off4" is the sum of G and H shown in FIG. 14.

The channel 1 stores "1" as LINKEN, "2" as LINKCHN, "0b11" as FORMAT, "0b00" as MODE, "0b000" as TRGSRC, "1" as ADRCTRL, "0" as INTENB, "0d15" as TRGCNT, "x2" as WSIZE, "y2" as HSIZE, "off3" as SROFFSIZE, "off4" as DSOFFSIZE, "addr31" as SRADR, and "addr11" as DSADR, respectively.

The channel 2 stores "1" as LINKEN, "3" as LINKCHN, "0b11" as FORMAT, "0b00" as MODE, "0b000" as TRGSRC, "1" as ADRCTRL, "0" as INTENB, "0d15" as TRGCNT, "x2" as WSIZE, "y2" as HSIZE, "off3" as SROFFSIZE, "off4" as DSOFFSIZE, "addr32" as SRADR, and "addr12" as DSADR, respectively.

The channel 3 stores "1" as LINKEN, "4" as LINKCHN, "0b11" as FORMAT, "0b00" as MODE, "0b00" as TRGSRC, "1" as ADRCTRL, "0" as INTENB, "0d15" as TRGCNT, "x2" as WSIZE, "y2" as HSIZE, "off3" as SROFFSIZE, "off4" as DSOFFSIZE, "addr33" as SRADR, and "addr13" as DSADR, respectively.

Also, as shown in FIG. 16, the channel 4 stores "1" as LINKEN, "5" as LINKCHN, "0b11" as FORMAT, "0b00" as MODE, "0b000" as TRGSRC, "1" as ADRCTRL, "0" as INTENB, "0d15" as TRGCNT, "x2" as WSIZE, "y2" as HSIZE, "off3" as SROFFSIZE, "off4" as DSOFFSIZE, "addr34" as SRADR, and "addr14" as DSADR, respectively.

The channel 5 stores "1" as LINKEN, "6" as LINKCHN, "0b11" as FORMAT, "0b00" as MODE, "0b000" as TRGSRC, "1" as ADRCTRL, "0" as INTENB, "0d15" as TRGCNT, "x2" as WSIZE, "y2" as HSIZE, "off3" as SROFFSIZE, "off4" as DSOFFSIZE, "addr35" as SRADR, and "addr15" as DSADR, respectively.

The channel 6 stores "1" as LINKEN, "7" as LINKCHN, "0b11" as FORMAT, "0b00" as MODE, "0b000" as TRGSRC, "1" as ADRCTRL, "0" as INTENB, "0d15" as TRGCNT, "x2" as WSIZE, "y2" as HSIZE, "off3" as SROFFSIZE, "off4" as DSOFFSIZE, "addr36" as SRADR, and "addr16" as DSADR, respectively.

The channel 7 stores "1" as LINKEN, "8" as LINKCHN, "0b11" as FORMAT, "0b00" as MODE, "0b000" as TRGSRC, "1" as ADRCTRL, "0" as INTENB, "0d15" as TRGCNT, "x2" as WSIZE, "y2" as HSIZE, "off3" as SROFFSIZE, "off4" as DSOFFSIZE, "addr3" as SRADR, and "addr17" as DSADR, respectively.

Also, as shown in FIG. 17, the channel 8 stores "1" as LINKEN, "9" as LINKCHN, "0b11" as FORMAT, "0b00" as MODE, "0b000" as TRGSRC, "1" as ADRCTRL, "0" as INTENB, "0d15" as TRGCNT, "x2" as WSIZE, "y2" as HSIZE, "off3" as SROFFSIZE, "off4" as DSOFFSIZE, "addr38" as SRADR, and "addr18" as DSADR, respectively.

The channel 9 stores "1" as LINKEN, "10" as LINKCHN, "0b11" as FORMAT, "0b00" as MODE, "0b000" as TRGSRC, "1" as ADRCTRL, "0" as INTENB, "0d15" as TRGCNT, "x2" as WSIZE, "y2" as HSIZE, "off3" as SROFFSIZE, "off4" as DSOFFSIZE, "addr39" as SRADR, and "addr19" as DSADR, respectively.

The channel 10 stores "1" as LINKEN, "11" as LINKCHN, "0b11" as FORMAT, "0b00" as MODE, "0b000" as TRGSRC, "1" as ADRCTRL, "0" as INTENB, "0d15" as TRGCNT, "x2" as WSIZE, "y2" as HSIZE, "off3" as SROFFSIZE, "off4" as DSOFFSIZE, "addr40" as SRADR, and "addr20" as DSADR, respectively.

The channel 11 stores "0" as LINKEN, "0" as LINKCHN, "0b11" as FORMAT, "0b00" as MODE, "0b000" as TRGSRC, "1" as ADRCTRL, "0" as INTENB, "0d15" as TRGCNT, "x2" as WSIZE, "y2" as HSIZE, "off3" as SROFFSIZE, "off4" as DSOFFSIZE, "addr41" as SRADR, and "addr21" as DSADR, respectively.

Next, the CPU 2 writes "0d0" at bits 5-0 of a register "ibitblt0_DMAENB," and "1" at a bit 7 of a register "ibitblt0_DMAENB," respectively.

As TRGCNT of the channel 0 is "0d15," the state machine 12, upon counting the trigger signal (which is VSYNC EVEN because TRGSRC of the channel 0 is "0b000" in this case) 15 times, in other words, 0.5 seconds later, makes the DMA controller 14 start an image data transfer for the channel 0. By this, the image data in the rectangular region having the width x2 and the height y2 with the address addr30 as being a head address is copied to the rectangular region having the width x2 and the height y2 with the address addr10 as being a head address.

Figure 18A:
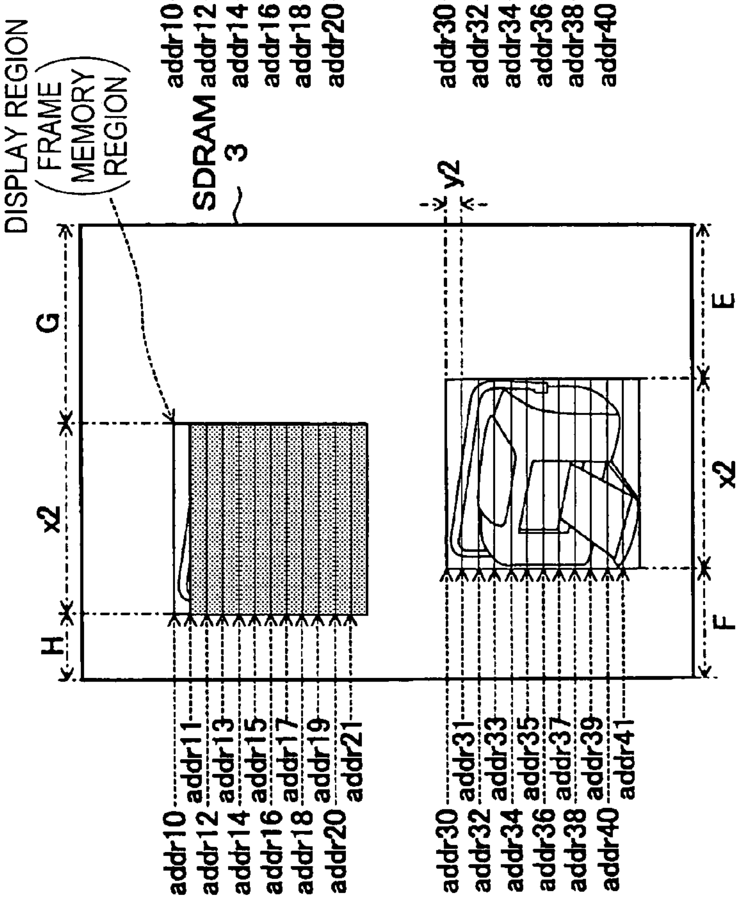
FIGS. 18A and 18B are figures showing examples of image data stored in SDRAM shown in FIG. 1.

FIG. 18A is a figure showing the SDRAM 3 upon completion of the image data transfer for the channel 0.

Next, as LINKEN of the channel 0 is "1" and LINKCHN is "1," the state machine 12 performs a processing for the channel 1. As TRGCNT of the channel 1 is "0d15," the state machine 12, upon counting the trigger signal (which is VSYNC EVEN because TRGSRC of the channel 1 is "0b000" in this case) 15 times, in other words, 0.5 seconds later, makes the DMA controller 14 start an image data transfer for the channel 1. By this, the image data in the rectangular region having the width x2 and the height y2 with the address addr31 as being a head address is copied to the rectangular region having the width x2 and the height y2 with the address addr11 as being a head address.

Figure 18B:
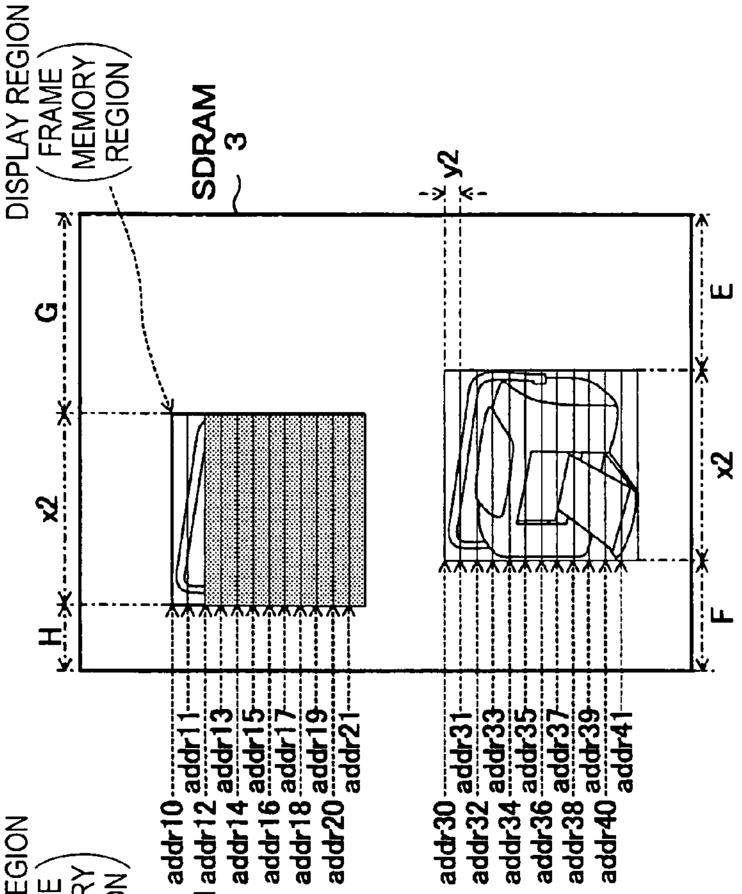

FIG. 18B is a figure showing the SDRAM 3 upon completion of the image data transfer for the channel 1.

Next, as LINKEN of the channel 1 is "1" and LINKCHN is "2," the state machine 12 performs a processing for the channel 2. As TRGCNT of the channel 2 is "0d15," the state machine 12, upon counting the trigger signal (which is VSYNC EVEN because TRGSRC of the channel 1 is "0b000" in this case) 15 times, in other words, 0.5 seconds later, makes the DMA controller 14 start an image data transfer for the channel 2. By this, the image data in the rectangular region having the width x2 and the height y2 with the address addr32 as being a head address is copied to the rectangular region having the width x2 and the height y2 with the address addr12 as being a head address.

Figure 19B:
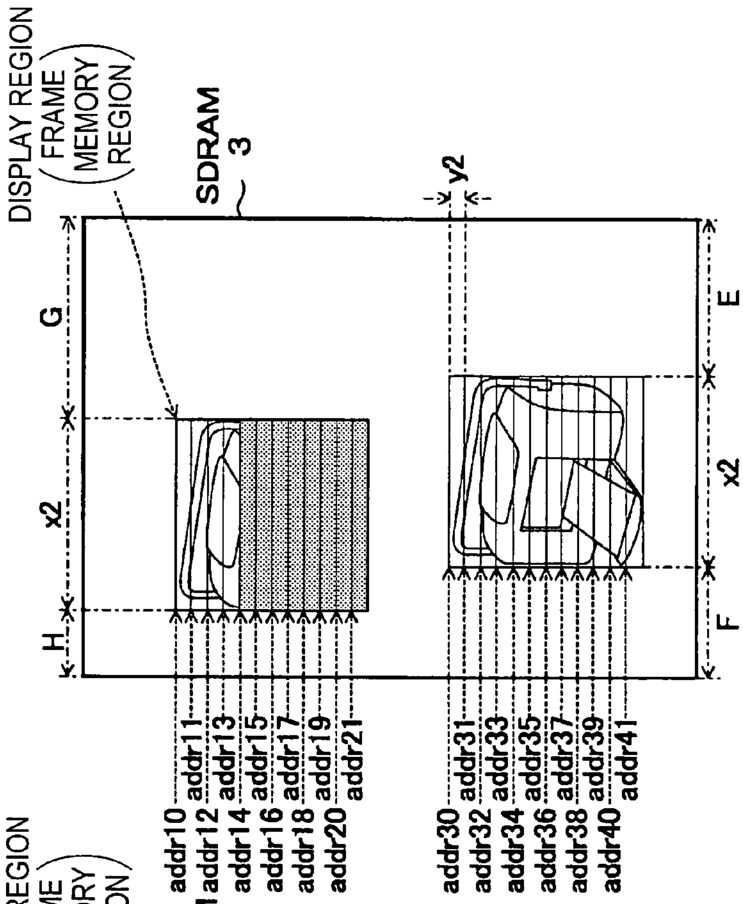
FIGS. 19A and 19B are figures showing examples of image data stored in SDRAM shown in FIG. 1.
Figure 19A:
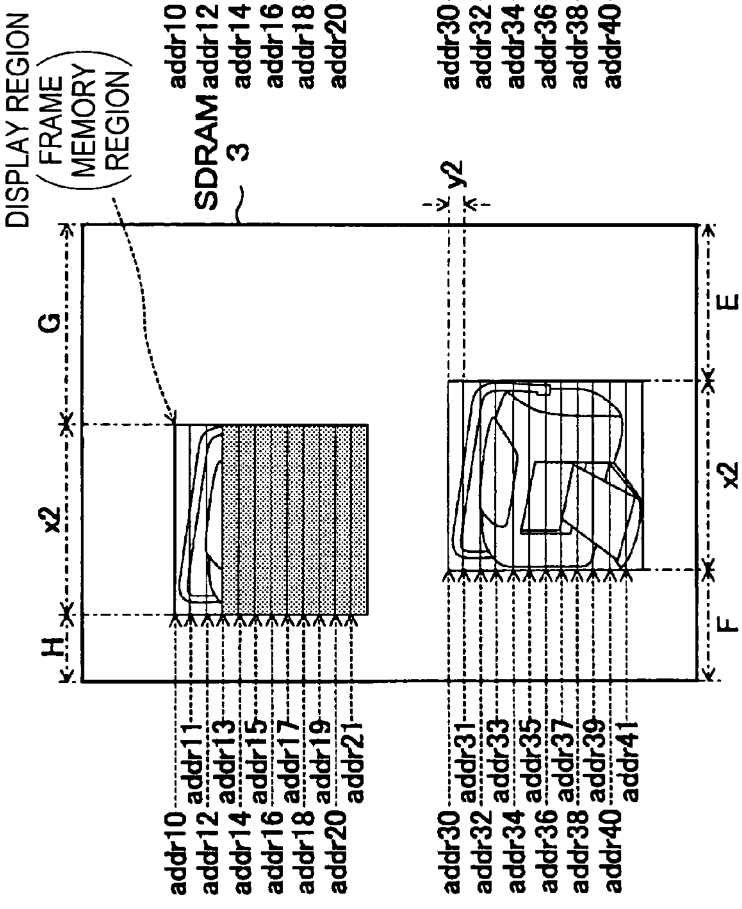

FIG. 19A is a figure showing the SDRAM 3 upon completion of the image data transfer for the channel 2.

Next, as LINKEN of the channel 2 is "1" and LINKCHN is "3," the state machine 12 performs a processing for the channel 3. As TRGCNT of the channel 3 is "0d15," the state machine 12, upon counting the trigger signal (which is VSYNC EVEN because TRGSRC of the channel 1 is "0b000" in this case) 15 times, in other words, 0.5 seconds later, makes the DMA controller 14 start an image data transfer for the channel 3. By this, the image data in the rectangular region having the width x2 and the height y2 with the address addr33 as being a head address is copied to the rectangular region having the width x2 and the height y2 with the address addr13 as being a head address.

FIG. 19B is a figure showing the SDRAM 3 upon completion of the image data transfer for the channel 3.

Next, as LINKEN of the channel 3 is "1" and LINKCHN is "4," the state machine 12 performs a processing for the channel 4. As TRGCNT of the channel 4 is "0d15," the state machine 12, upon counting the trigger signal (which is VSYNC EVEN because TRGSRC of the channel 1 is "0b000" in this case) 15 times, in other words, 0.5 seconds later, makes the DMA controller 14 start an image data transfer for the channel 4. By this, the image data in the rectangular region having the width x2 and the height y2 with the address addr34 as being a head address is copied to the rectangular region having the width x2 and the height y2 with the address addr14 as being a head address.

Figure 20B:
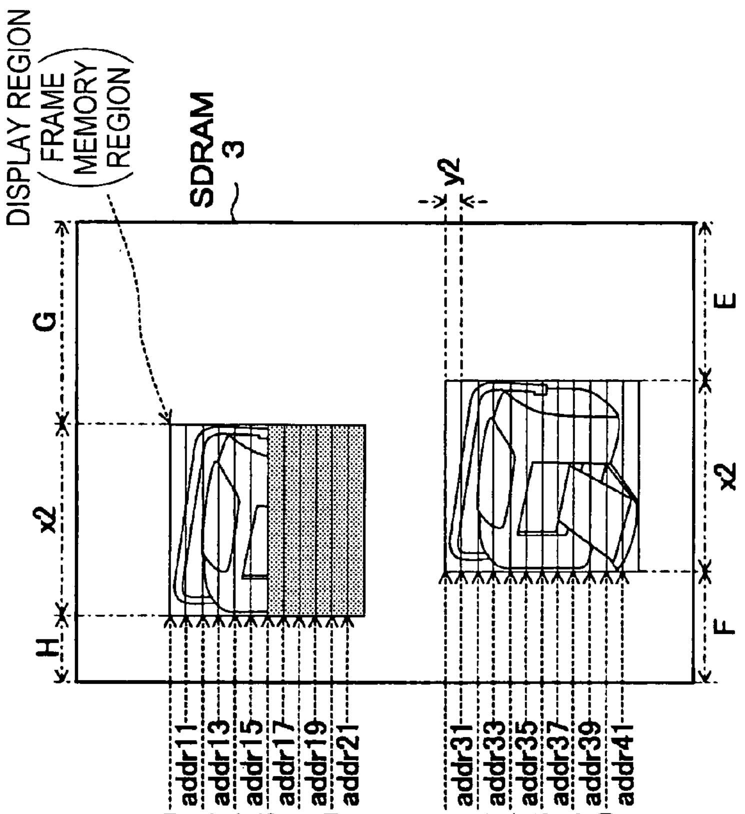
FIGS. 20A and 20B are figures showing examples of image data stored in SDRAM shown in FIG. 1.
Figure 20A:
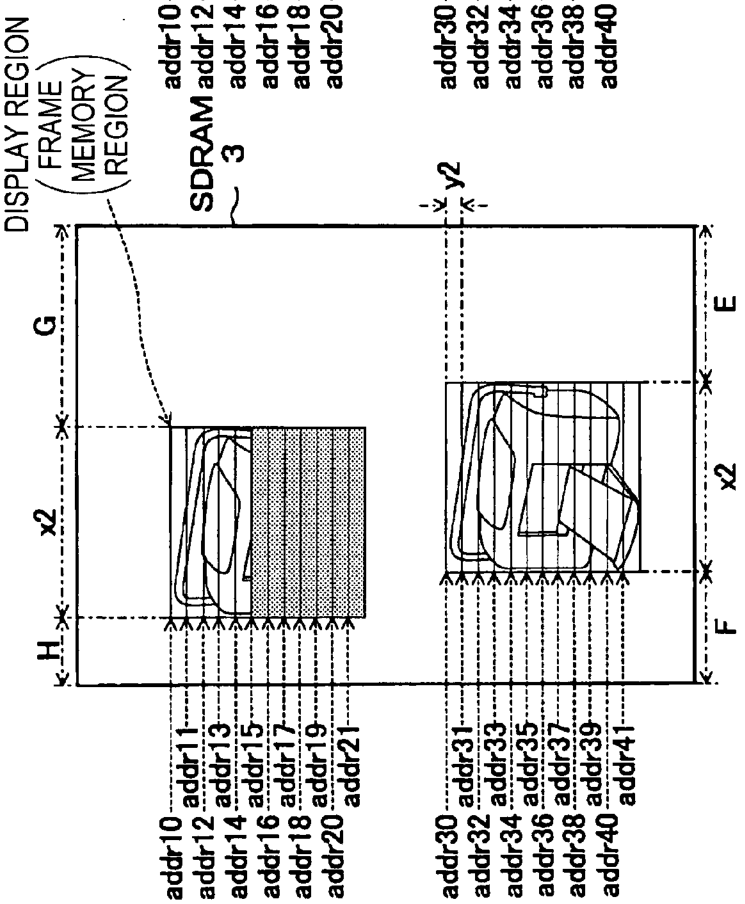

FIG. 20A is a figure showing the SDRAM 3 upon completion of the image data transfer for the channel 4.

Next, as LINKEN of the channel 4 is "1" and LINKCHN is "5," the state machine 12 performs a processing for the channel 5. As TRGCNT of the channel 5 is "0d15," the state machine 12, upon counting the trigger signal (which is VSYNC EVEN because TRGSRC of the channel 1 is "0b000" in this case) 15 times, in other words, 0.5 seconds later, makes the DMA controller 14 start an image data transfer for the channel 5. By this, the image data in the rectangular region having the width x2 and the height y2 with the address addr35 as being a head address is copied to the rectangular region having the width x2 and the height y2 with the address addr15 as being a head address.

FIG. 20B is a figure showing the SDRAM 3 upon completion of the image data transfer for the channel 5.

Next, as LINKEN of the channel 5 is "1" and LINKCHN is "6," the state machine 12 performs a processing for the channel 6. As TRGCNT of the channel 6 is "0d15," the state machine 12, upon counting the trigger signal (which is VSYNC EVEN because TRGSRC of the channel 1 is "0b000" in this case) 15 times, in other words, 0.5 seconds later, makes the DMA controller 14 start an image data transfer for the channel 6. By this, the image data in the rectangular region having the width x2 and the height y2 with the address addr36 as being a head address is copied to the rectangular region having the width x2 and the height y2 with the address addr16 as being a head address.

Figure 21B:
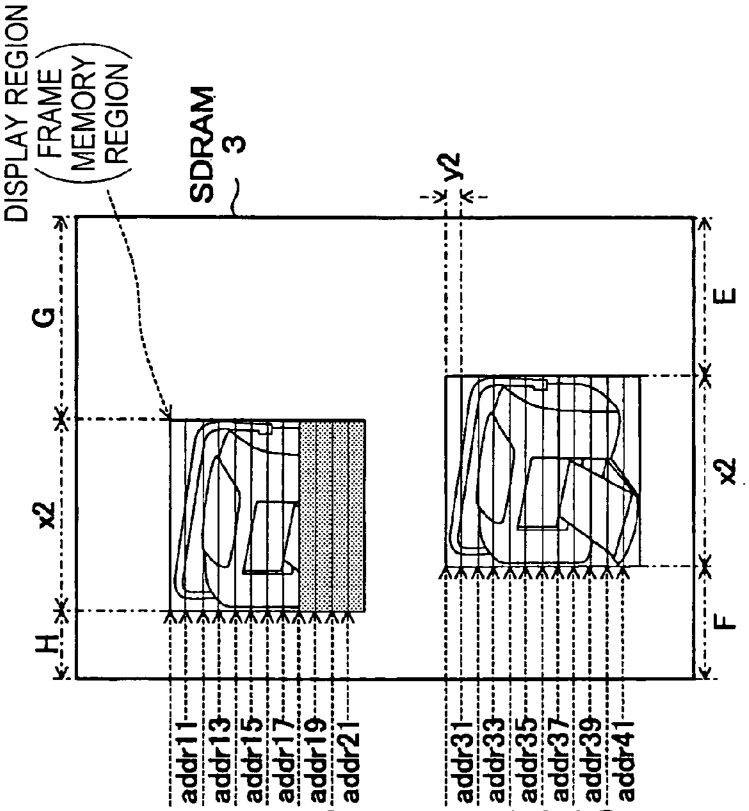
FIGS. 21A and 21B are figures showing examples of image data stored in SDRAM shown in FIG. 1.
Figure 21A:
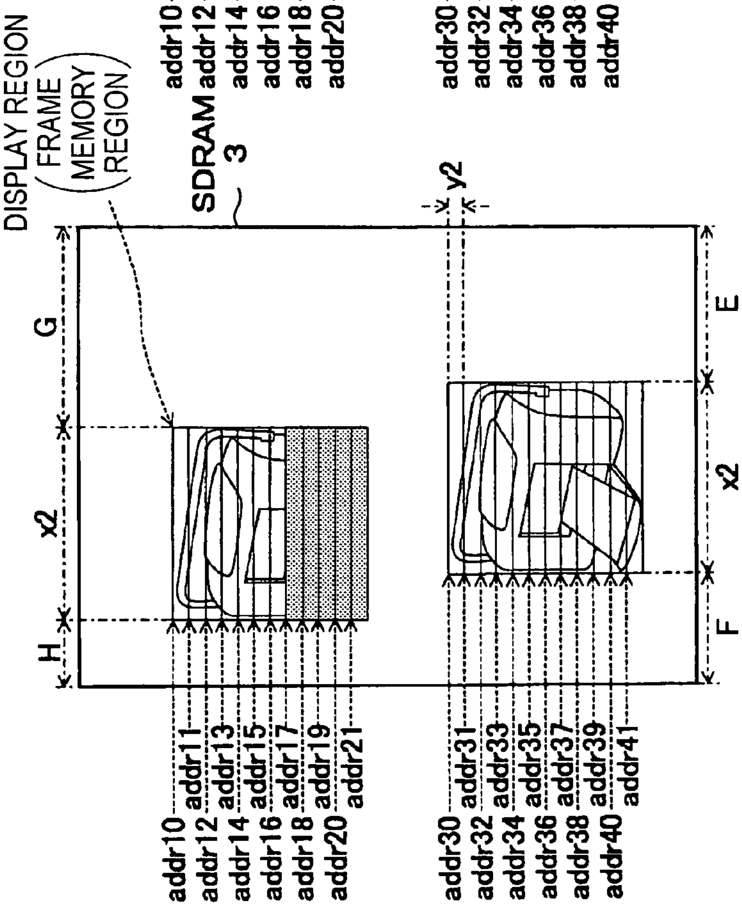

FIG. 21A is a figure showing the SDRAM 3 upon completion of the image data transfer for the channel 6.

Next, as LINKEN of the channel 6 is "1" and LINKCHN is "7," the state machine 12 performs a processing for the channel 7. As TRGCNT of the channel 7 is "0d15," the state machine 12, upon counting the trigger signal (which is VSYNC EVEN because TRGSRC of the channel 1 is "0b000" in this case) 15 times, in other words, 0.5 seconds later, makes the DMA controller 14 start an image data transfer for the channel 7. By this, the image data in the rectangular region having the width x2 and the height y2 with the address addr37 as being a head address is copied to the rectangular region having the width x2 and the height y2 with the address addr17 as being a head address.

FIG. 21B is a figure showing the SDRAM 3 upon completion of the image data transfer for the channel 7.

Next, as LINKEN of the channel 7 is "1" and LINKCHN is "8," the state machine 12 performs a processing for the channel 8. As TRGCNT of the channel 8 is "0d15," the state machine 12, upon counting the trigger signal (which is VSYNC EVEN because TRGSRC of the channel 1 is "0b000" in this case) 15 times, in other words, 0.5 seconds later, makes the DMA controller 14 start an image data transfer for the channel 8. By this, the image data in the rectangular region having the width x2 and the height y2 with the address addr38 as being a head address is copied to the rectangular region having the width x2 and the height y2 with the address addr18 as being a head address.

Figure 22A:
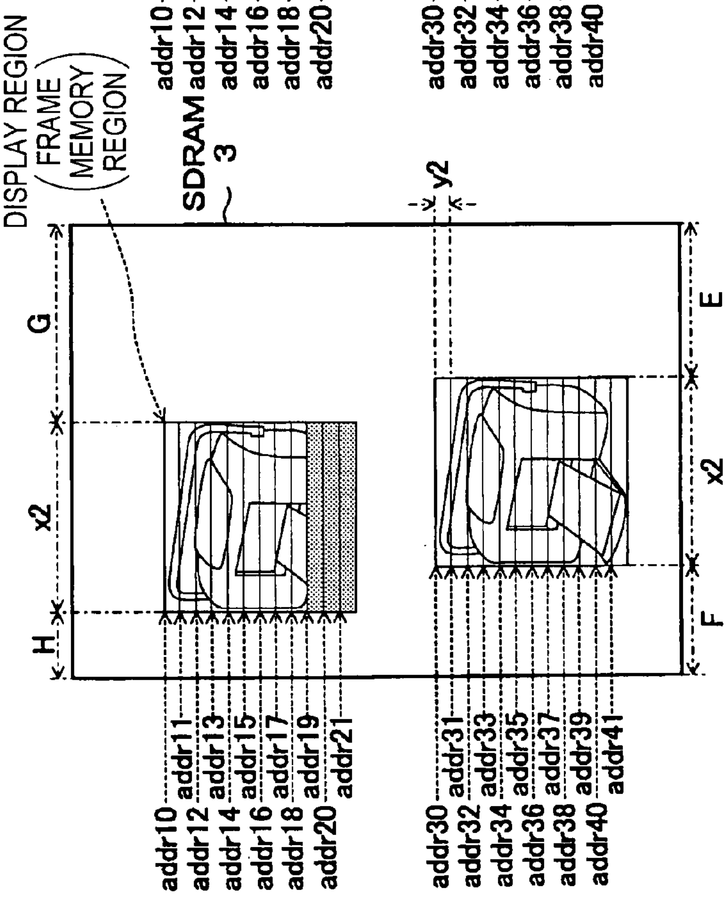
FIGS. 22A and 22B are figures showing examples of image data stored in SDRAM shown in FIG. 1.

FIG. 22A is a figure showing the SDRAM 3 upon completion of the image data transfer for the channel 8.

Next, as LINKEN of the channel 8 is "1" and LINKCHN is "9," the state machine 12 performs a processing for the channel 9. As TRGCNT of the channel 9 is "0d15," the state machine 12, upon counting the trigger signal (which is VSYNC EVEN because TRGSRC of the channel 1 is "0b000" in this case) 15 times, in other words, 0.5 seconds later, makes the DMA controller 14 start an image data transfer for the channel 9. By this, the image data in the rectangular region having the width x2 and the height y2 with the address addr39 as being a head address is copied to the rectangular region having the width x2 and the height y2 with the address addr19 as being a head address.

Figure 22B:
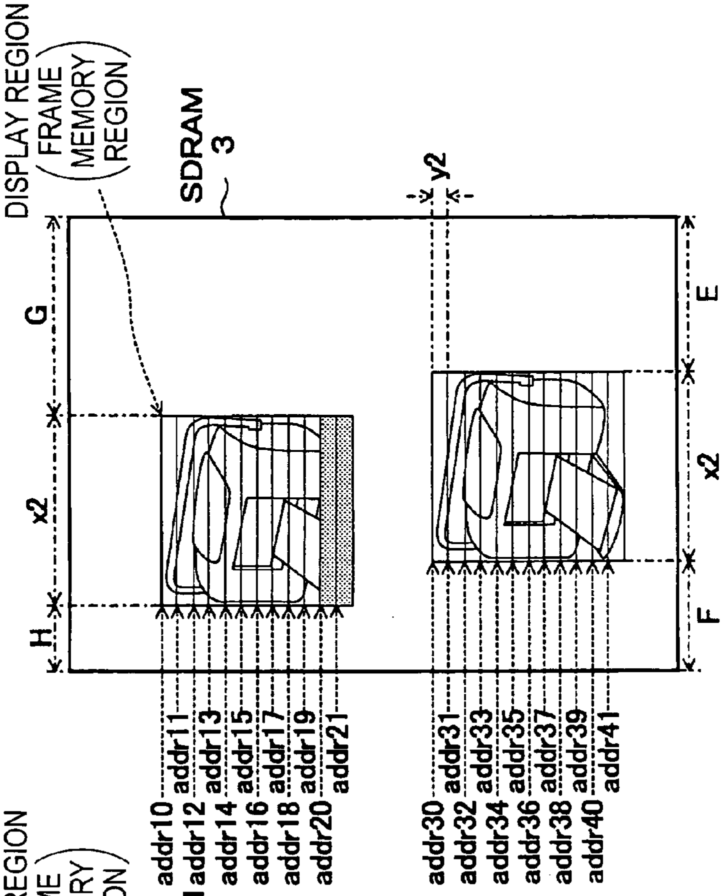

FIG. 22B is a figure showing the SDRAM 3 upon completion of the image data transfer for the channel 9.

Next, as LINKEN of the channel 9 is "1" and LINKCHN is "10," the state machine 12 performs a processing for the channel 10. As TRGCNT of the channel 10 is "0d15," the state machine 12, upon counting the trigger signal (which is VSYNC EVEN because TRGSRC of the channel 1 is "0b000" in this case) 15 times, in other words, 0.5 seconds later, makes the DMA controller 14 start an image data transfer for the channel 10. By this, the image data in the rectangular region having the width x2 and the height y2 with the address addr40 as being a head address is copied to the rectangular region having the width x2 and the height y2 with the address addr20 as being a head address.

Figure 23A:
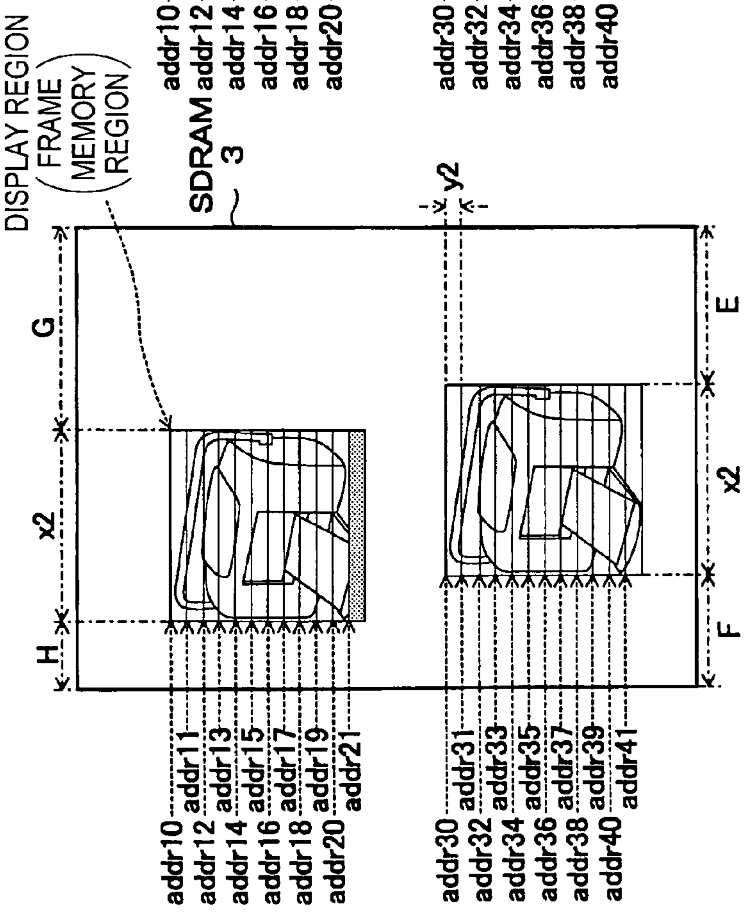
FIGS. 23A and 23B are figures showing examples of image data stored in SDRAM shown in FIG. 1.

FIG. 23A is a figure showing the SDRAM 3 upon completion of the image data transfer for the channel 10.

Next, as LINKEN of the channel 10 is "1" and LINKCHN is "11," the state machine 12 performs a processing for the channel 11. As TRGCNT of the channel 11 is "0d15," the state machine 12, upon counting the trigger signal (which is VSYNC EVEN because TRGSRC of the channel 1 is "0b000" in this case) 15 times, in other words, 0.5 seconds later, makes the DMA controller 14 start an image data transfer for the channel 11. By this, the image data in the rectangular region having the width x2 and the height y2 with the address addr41 as being a head address is copied to the rectangular region having the width x2 and the height y2 with the address addr21 as being a head address.

Figure 23B:
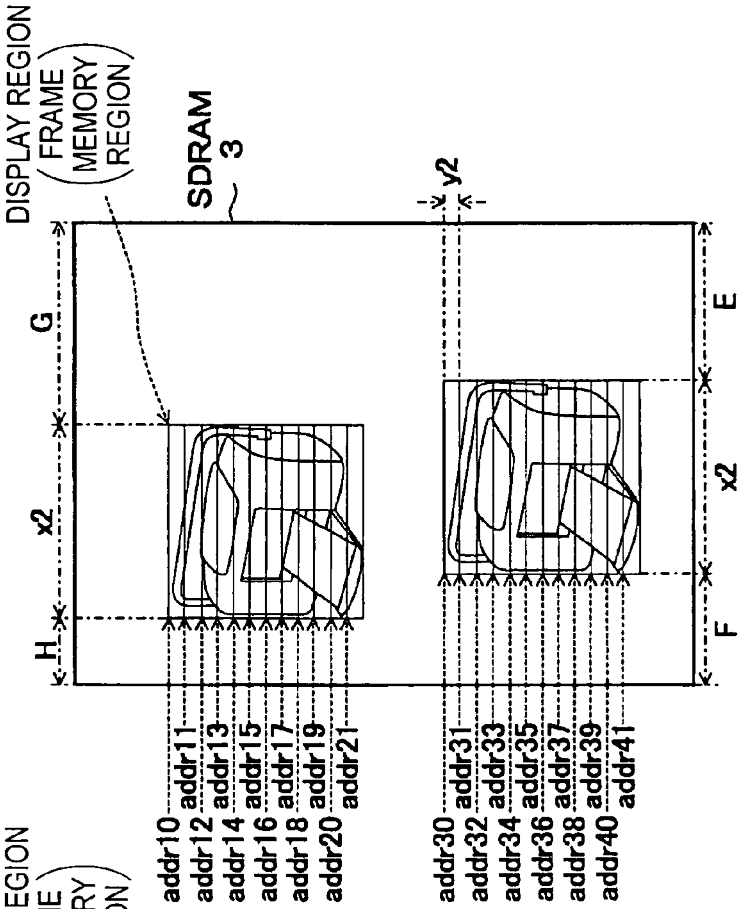

FIG. 23B is a figure showing the SDRAM 3 upon completion of the image data transfer for the channel 11.

In this manner, in accordance with the present embodiment, the CPU 2 writes channels to the RAM 13, whereby the data transfer function of the display control circuit 5 can be readily expanded, and a wipe display can be readily realized. Also, while a wipe display is performed (in other words, while the state machine 12 is performing the processing for the channel 0 through the channel 11), the CPU 2 does not need to perform any processing, such that the load on the CPU can be alleviated while the wipe display is performed, and the power consumption of the entire system 1 can be reduced.

Also, in the concrete example, image data transfer is performed in synchronism with the vertical synchronization signal (VSYNC EVEN), such that flickering of the screen can be suppressed.

Next, as a third concrete example of operations of the display control circuit 5, a case of performing a blind display is described. First, the CPU 2 writes image data in the SDRAM 3 (see FIG. 1), and also writes channels in the RAM 13 (see FIG. 2).

Figure 24:
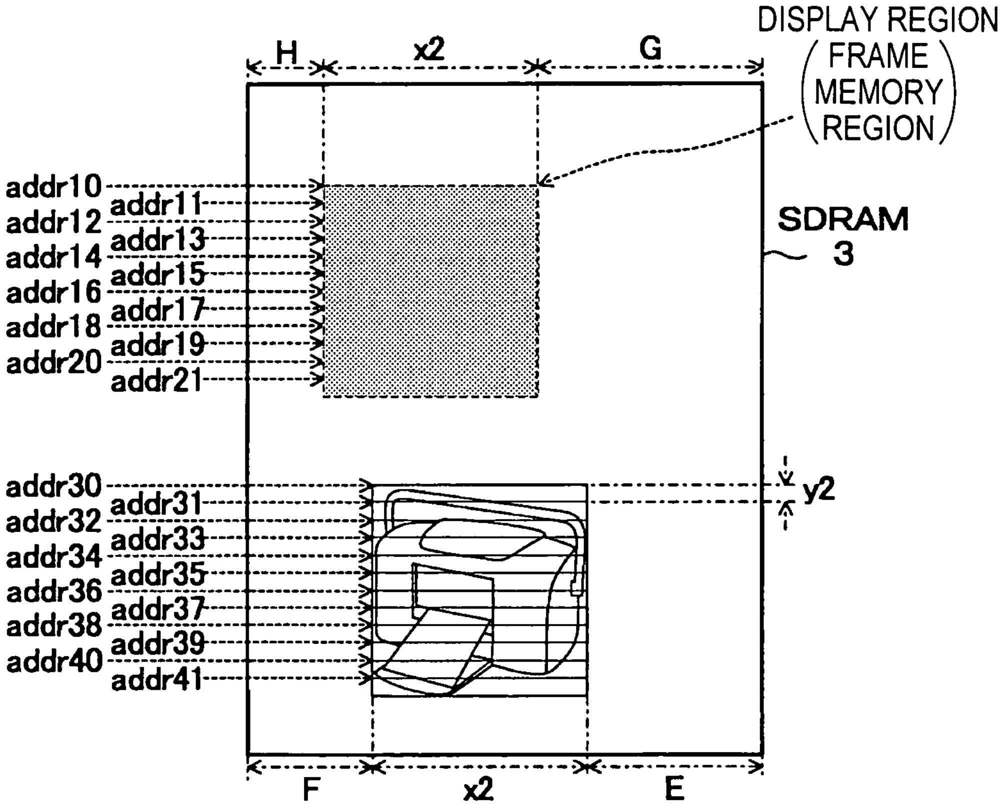
FIG. 24 is a figure showing an example of image data stored in SDRAM shown in FIG. 1.

FIG. 24 is a figure showing an example of image data written to the SDRAM 3. It is noted that the SDRAM 3 is not a display body but is a memory circuit, and what is written to the SDRAM 3 is image data. However, for ready understanding, an image represented by the image data is indicated in the SDRAM 3.

In this example, a rectangular region within the SDRAM 3 having a width x2 and a height y2×12 with an address addr10 as being a head address is set as a display region (frame memory region), and it is assumed that an image based on the image data within the rectangular region is displayed on the LCD panel 7 (see FIG. 1). In the present example, it is assumed that half-tone image data is written to the display region. It is noted that a height between the address addr10 and an address addr11 in the display region, a height between the address addr11 and an address addr12 in the display region, a height between the address addr12 and an address addr13 in the display region, a height between the address addr13 and an address addr14 in the display region, a height between the address addr14 and an address addr15 in the display region, a height between the address addr15 and an address addr16 in the display region, a height between the address addr16 and an address addr17 in the display region, a height between the address addr17 and an address addr18 in the display region, a height between the address addr18 and an address addr19 in the display region, a height between the address addr19 and an address addr20 in the display region, and a height between the address addr20 and an address addr21 in the display region are each assumed to be y2.

Also, in a rectangular region within the SDRAM 3 having a width x2 and a height y2×12 with an address addr30 as being a head address, image data is stored. However, as this rectangular region is not a display region (frame memory region), an image based on the image data within the rectangular region shall not be displayed on the LCD panel 7. It is noted that a height between the address addr30 and an address addr31 in the rectangular region, a height between the address addr31 and an address addr32 in the rectangular region, a height between the address addr32 and an address addr33 in the rectangular region, a height between the address addr33 and an address addr34 in the rectangular region, a height between the address addr34 and an address addr35 in the rectangular region, a height between the address addr35 and an address addr36 in the rectangular region, a height between the address addr36 and an address addr37 in the rectangular region, a height between the address addr37 and an address addr38 in the rectangular region, a height between the address addr38 and an address addr39 in the rectangular region, a height between the address addr39 and an address addr40 in the rectangular region, and a height between the address addr40 and an address addr41 in the rectangular region are each assumed to be y2.

Figure 25:
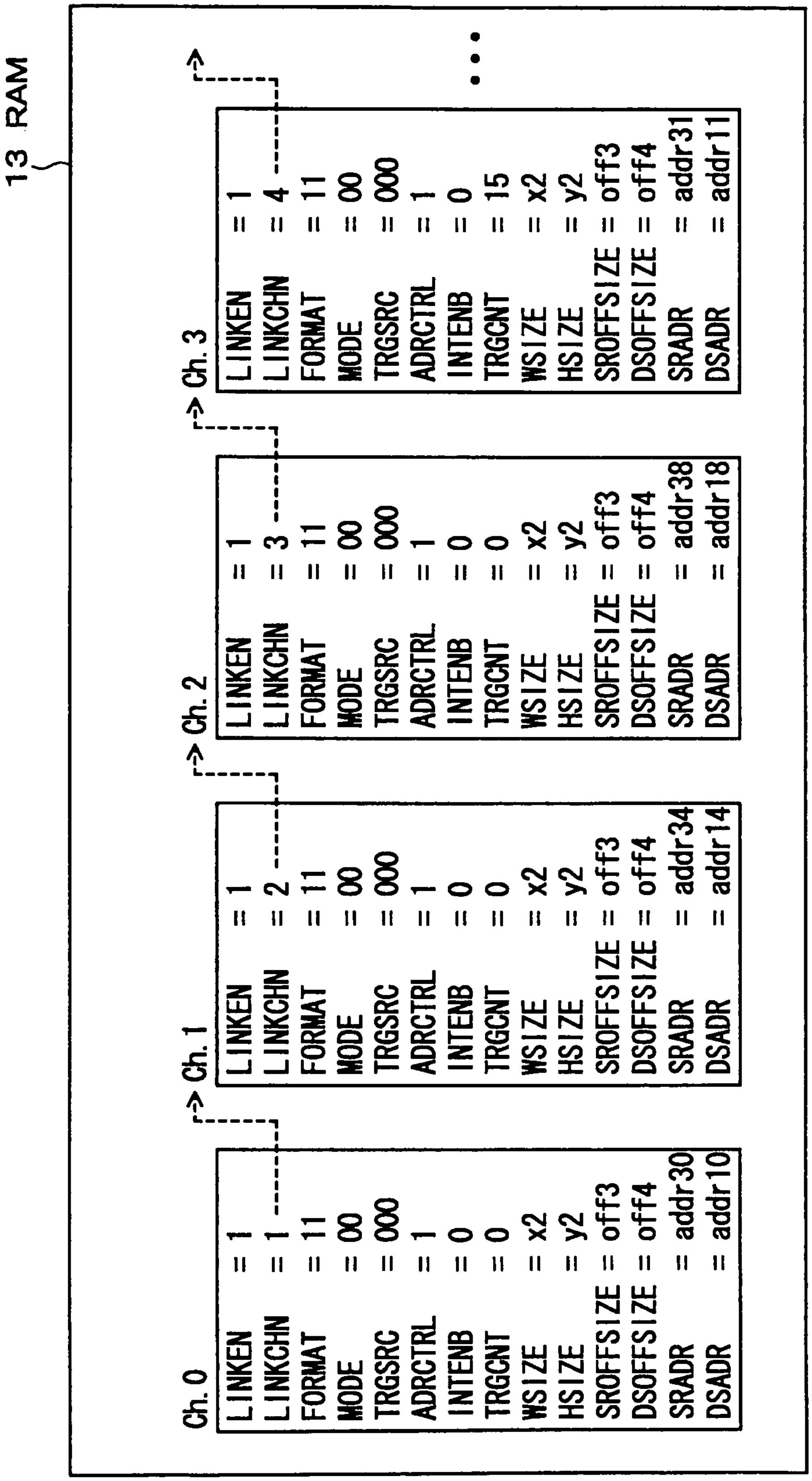
FIG. 25 is a figure showing an example of channels stored in RAM shown in FIG. 2.
Figure 26:
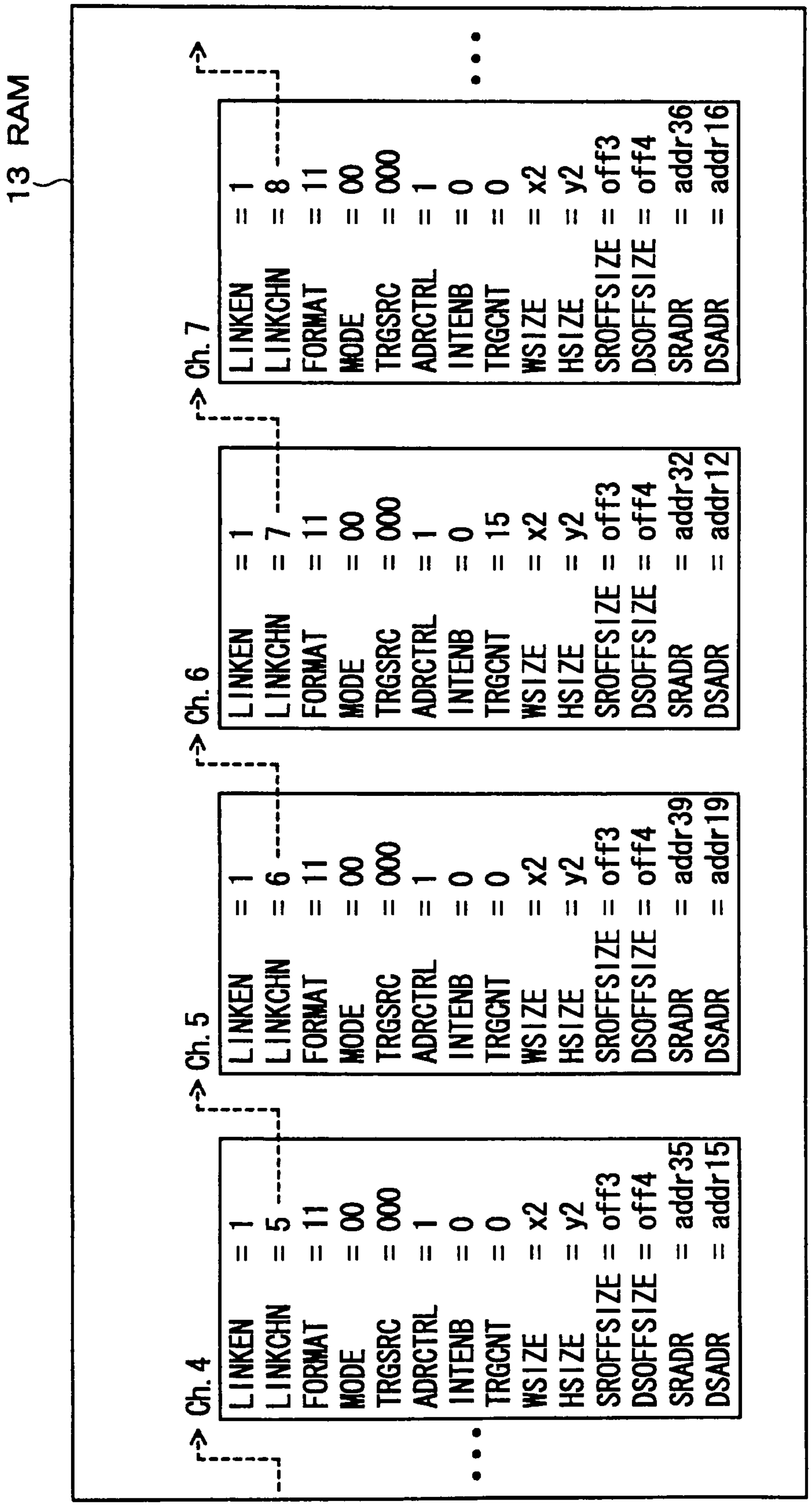
FIG. 26 is a figure showing an example of channels stored in RAM shown in FIG. 2.
Figure 27:
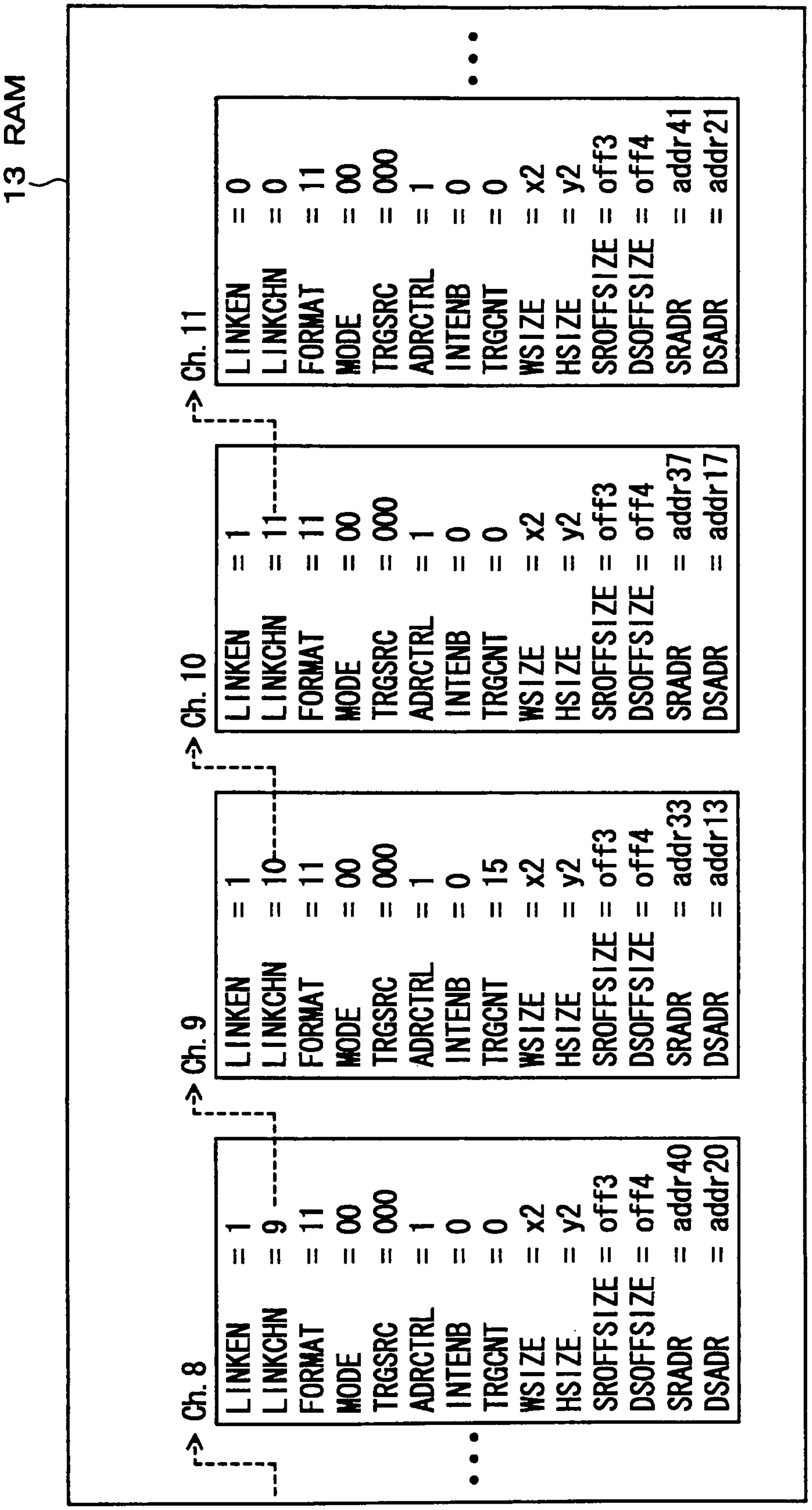
FIG. 27 is a figure showing an example of channels stored in RAM shown in FIG. 2.

FIGS. 25-27 are figures showing examples of the channels written to the RAM 13. As shown in FIG. 25, the channel 0 stores "1" as LINKEN, "1" as LINKCHN, "0b11" as FORMAT, "0b00" as MODE, "0b000" as TRGSRC, "1" as ADRCTRL, "0" as INTENB, "0d0" as TRGCNT, "x2" as WSIZE, "y2" as HSIZE, "off3" as SROFFSIZE, "off4" as DSOFFSIZE, "addr30" as SRADR, and "addr10" as DSADR, respectively. It is noted that "off3" is the sum of E and F shown in FIG. 24, and "off4" is the sum of G and H shown in FIG. 24.

The channel 1 stores "1" as LINKEN, "2" as LINKCHN, "0b11" as FORMAT, "0b00" as MODE, "0b000" as TRGSRC, "1" as ADRCTRL, "0" as INTENB, "0d0" as TRGCNT, "x2" as WSIZE, "y2" as HSIZE, "off3" as SROFFSIZE, "off4" as DSOFFSIZE, "addr34" as SRADR, and "addr14" as DSADR, respectively.

The channel 2 stores "1" as LINKEN, "3" as LINKCHN, "0b11" as FORMAT, "0b00" as MODE, "0b000" as TRGSRC, "1" as ADRCTRL, "0" as INTENB, "0d0" as TRGCNT, "x2" as WSIZE, "y2" as HSIZE, "off3" as SROFFSIZE, "off4" as DSOFFSIZE, "addr38" as SRADR, and "addr18" as DSADR, respectively.

The channel 3 stores "1" as LINKEN, "4" as LINKCHN, "0b11" as FORMAT, "0b00" as MODE, "0b000" as TRGSRC, "1" as ADRCTRL, "0" as INTENB, "0d15" as TRGCNT, "x2" as WSIZE, "y2" as HSIZE, "off3" as SROFFSIZE, "off4" as DSOFFSIZE, "addr30" as SRADR, and "addr11" as DSADR, respectively.

Also, as shown in FIG. 26, the channel 4 stores "1" as LINKEN, "5" as LINKCHN, "0b11" as FORMAT, "0b00" as MODE, "0b000" as TRGSRC, "1" as ADRCTRL, "0" as INTENB, "0d0" as TRGCNT, "x2" as WSIZE, "y2" as HSIZE, "off3" as SROFFSIZE, "off4" as DSOFFSIZE, "addr35" as SRADR, and "addr15" as DSADR, respectively.

The channel 5 stores "1" as LINKEN, "6" as LINKCHN, "0b11" as FORMAT, "0b00" as MODE, "0b000" as TRGSRC, "1" as ADRCTRL, "0" as INTENB, "0d0" as TRGCNT, "x2" as WSIZE, "y2" as HSIZE, "off3" as SROFFSIZE, "off4" as DSOFFSIZE, "addr39" as SRADR, and "addr19" as DSADR, respectively.

The channel 6 stores "1" as LINKEN, "7" as LINKCHN, "0b111" as FORMAT, "0b00" as MODE, "0b000" as TRGSRC, "1" as ADRCTRL, "0" as INTENB, "0d15" as TRGCNT, "x2" as WSIZE, "y2" as HSIZE, "off3" as SROFFSIZE, "off4" as DSOFFSIZE, "addr32" as SRADR, and "addr12" as DSADR, respectively.

The channel 7 stores "1" as LINKEN, "8" as LINKCHN, "0b111" as FORMAT, "0b00" as MODE, "0b000" as TRGSRC, "1" as ADRCTRL, "0" as INTENB, "0d0" as TRGCNT, "x2" as WSIZE, "y2" as HSIZE, "off3" as SROFFSIZE, "off4" as DSOFFSIZE, "addr36" as SRADR, and "addr16" as DSADR, respectively.

Also, as shown in FIG. 27, the channel 8 stores "1" as LINKEN, "9" as LINKCHN, "0b11" as FORMAT, "0b00" as MODE, "0b000" as TRGSRC, "1" as ADRCTRL, "0" as INTENB, "0d0" as TRGCNT, "x2" as WSIZE, "y2" as HSIZE, "off3" as SROFFSIZE, "off4" as DSOFFSIZE, "addr40" as SRADR, and "addr20" as DSADR, respectively.

The channel 9 stores "1" as LINKEN, "10" as LINKCHN, "0b11" as FORMAT, "0b00" as MODE, "0b000" as TRGSRC, "1" as ADRCTRL, "0" as INTENB, "0d15" as TRGCNT, "x2" as WSIZE, "y2" as HSIZE, "off3" as SROFFSIZE, "off4" as DSOFFSIZE, "addr33" as SRADR, and "addr13" as DSADR, respectively.

The channel 10 stores "1" as LINKEN, "11" as LINKCHN, "0b11" as FORMAT, "0b00" as MODE, "0b000" as TRGSRC, "1" as ADRCTRL, "0" as INTENB, "0d0" as TRGCNT, "x2" as WSIZE, "y2" as HSIZE, "off3" as SROFFSIZE, "off4" as DSOFFSIZE, "addr37" as SRADR, and "addr17" as DSADR, respectively.

The channel 11 stores "0" as LINKEN, "0" as LINKCHN, "0b11" as FORMAT, "0b00" as MODE, "0b000" as TRGSRC, "1" as ADRCTRL, "0" as INTENB, "0d0" as TRGCNT, "x2" as WSIZE, "y2" as HSIZE, "off3" as SROFFSIZE, "off4" as DSOFFSIZE, "addr41" as SRADR, and "addr21" as DSADR, respectively.

Next, the CPU 2 writes "0d0" at bits 5-0 of a register "ibitblt0_DMAENB," and "1" at a bit 7 of a register "ibitblt0_DMAENB," respectively.

As TRGCNT of the channel 0 is "0d0," the state machine 12 immediately makes the DMA controller 14 start an image data transfer for the channel 0. By this, the image data in the rectangular region having the width x2 and the height y2 with the address addr30 as being a head address is copied to the rectangular region having the width x2 and the height y2 with the address addr10 as being a head address.

Next, as LINKEN of the channel 0 is "1" and LINKCHN is "1," the state machine 12 performs a processing for the channel 1. As TRGCNT of the channel 1 is "0d0," the state machine 12 immediately makes the DMA controller 14 start an image data transfer for the channel 1. By this, the image data in the rectangular region having the width x2 and the height y2 with the address addr34 as being a head address is copied to the rectangular region having the width x2 and the height y2 with the address addr14 as being a head address.

Next, as LINKEN of the channel 1 is "1" and LINKCHN is "2," the state machine 12 performs a processing for the channel 2. As TRGCNT of the channel 2 is "0d0," the state machine 12 immediately makes the DMA controller 14 start an image data transfer for the channel 2. By this, the image data in the rectangular region having the width x2 and the height y2 with the address addr38 as being a head address is copied to the rectangular region having the width x2 and the height y2 with the address addr18 as being a head address.

Figure 28B:
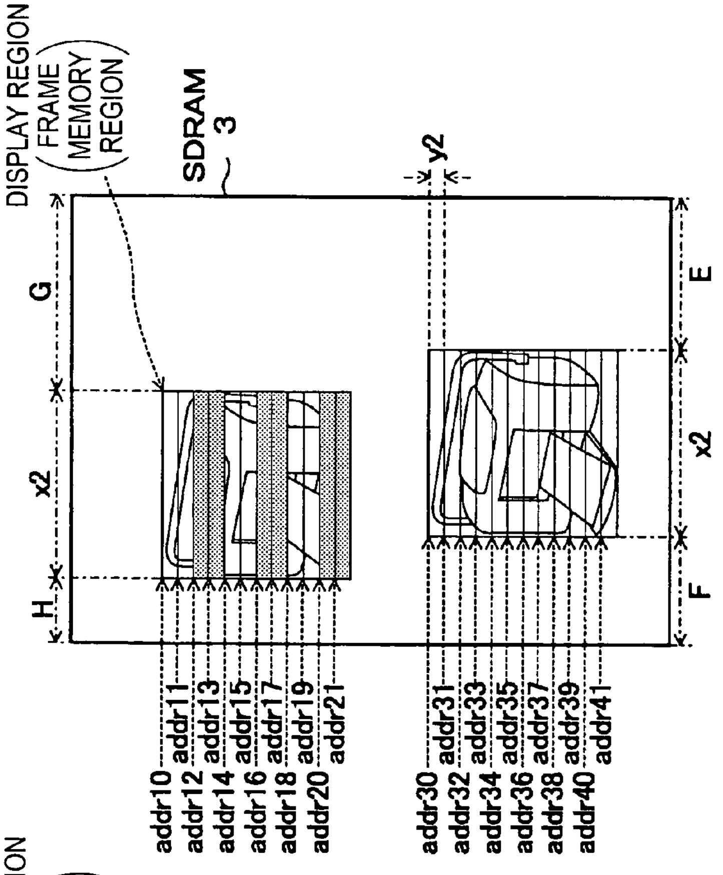
FIGS. 28A and 28B are figures showing examples of image data stored in SDRAM shown in FIG. 1.
Figure 28A:
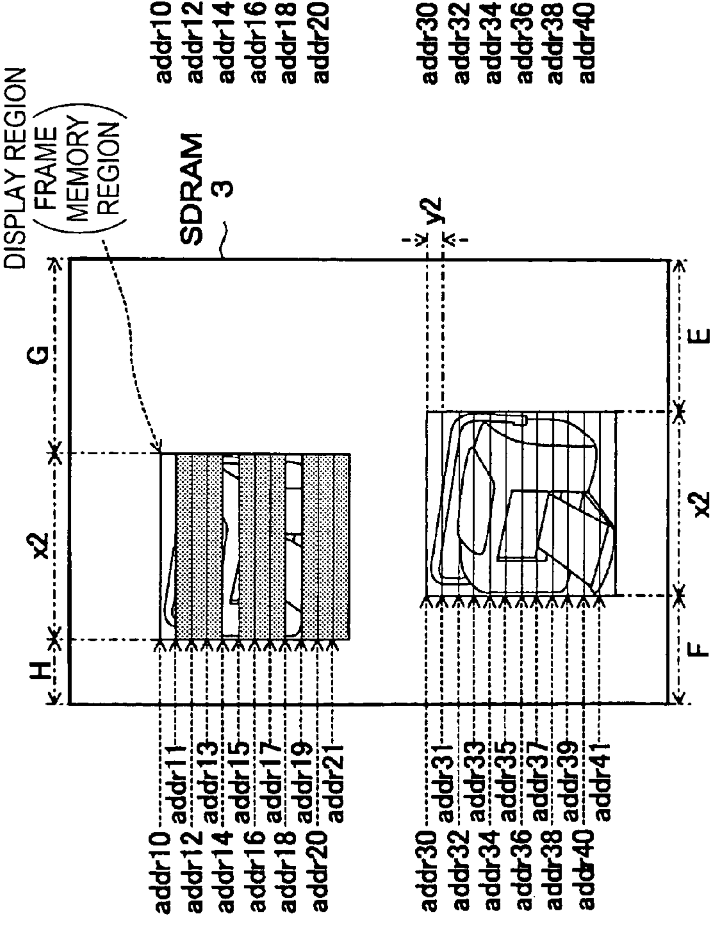

FIG. 28A is a figure showing the SDRAM 3 upon completion of the image data transfer for the channel 2.

Next, as LINKEN of the channel 2 is "1" and LINKCHN is "3," the state machine 12 performs a processing for the channel 3. As TRGCNT of the channel 3 is "0d15," the state machine 12, upon counting the trigger signal (which is VSYNC EVEN because TRGSRC of the channel 1 is "0b000" in this case) 15 times, in other words, 0.5 seconds later, makes the DMA controller 14 start an image data transfer for the channel 3. By this, the image data in the rectangular region having the width x2 and the height y2 with the address addr31 as being a head address is copied to the rectangular region having the width x2 and the height y2 with the address addr11 as being a head address.

Next, as LINKEN of the channel 3 is "1" and LINKCHN is "4," the state machine 12 performs a processing for the channel 4. As TRGCNT of the channel 4 is "0d0," the state machine 12 immediately makes the DMA controller 14 start an image data transfer for the channel 4. By this, the image data in the rectangular region having the width x2 and the height y2 with the address addr35 as being a head address is copied to the rectangular region having the width x2 and the height y2 with the address addr15 as being a head address.

Next, as LINKEN of the channel 4 is "1" and LINKCHN is "5," the state machine 12 performs a processing for the channel 5. As TRGCNT of the channel 5 is "0d0," the state machine 12 immediately makes the DMA controller 14 start an image data transfer for the channel 5. By this, the image data in the rectangular region having the width x2 and the height y2 with the address addr39 as being a head address is copied to the rectangular region having the width x2 and the height y2 with the address addr19 as being a head address.

FIG. 28B is a figure showing the SDRAM 3 upon completion of the image data transfer for the channel 5.

Next, as LINKEN of the channel 5 is "1" and LINKCHN is "6," the state machine 12 performs a processing for the channel 6. As TRGCNT of the channel 6 is "0d15," the state machine 12, upon counting the trigger signal (which is VSYNC EVEN because TRGSRC of the channel 1 is "0b000" in this case) 15 times, in other words, 0.5 seconds later, makes the DMA controller 14 start an image data transfer for the channel 6. By this, the image data in the rectangular region having the width x2 and the height y2 with the address addr32 as being a head address is copied to the rectangular region having the width x2 and the height y2 with the address addr12 as being a head address.

Next, as LINKEN of the channel 6 is "1" and LINKCHN is "7," the state machine 12 performs a processing for the channel 7. As TRGCNT of the channel 7 is "0d0," the state machine 12 immediately makes the DMA controller 14 start an image data transfer for the channel 7. By this, the image data in the rectangular region having the width x2 and the height y2 with the address addr36 as being a head address is copied to the rectangular region having the width x2 and the height y2 with the address addr16 as being a head address.

Next, as LINKEN of the channel 7 is "1" and LINKCHN is "8," the state machine 12 performs a processing for the channel 8. As TRGCNT of the channel 8 is "0d0," the state machine 12 immediately makes the DMA controller 14 start an image data transfer for the channel 8. By this, the image data in the rectangular region having the width x2 and the height y2 with the address addr40 as being a head address is copied to the rectangular region having the width x2 and the height y2 with the address addr20 as being a head address.

Figure 29B:
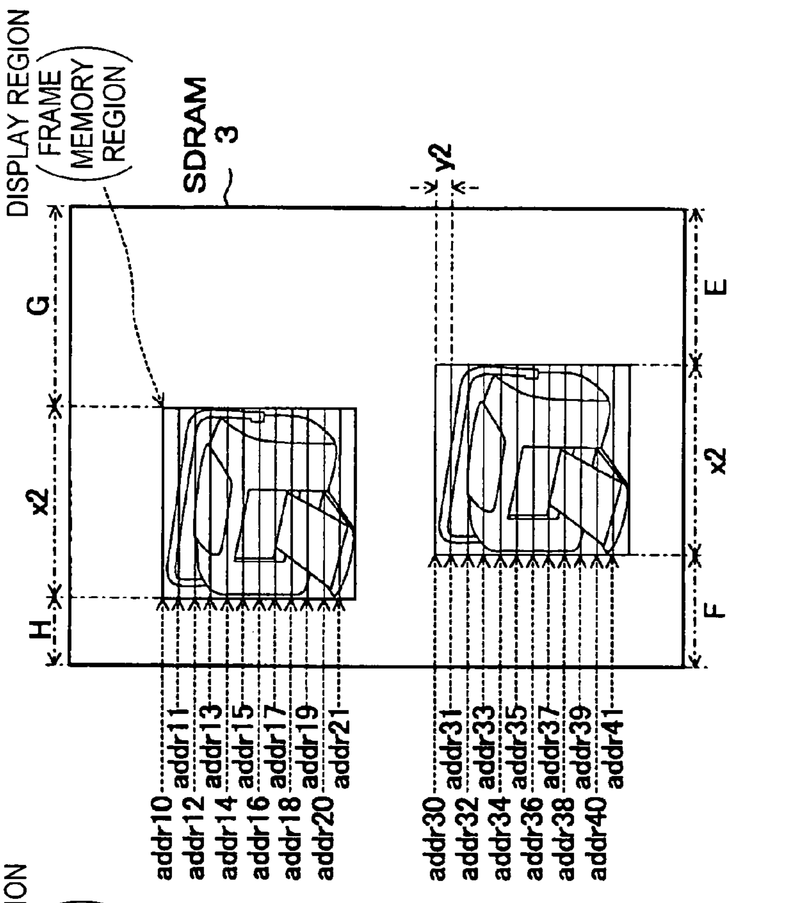
FIGS. 29A and 29B are figures showing examples of image data stored in SDRAM shown in FIG. 1.
Figure 29A:
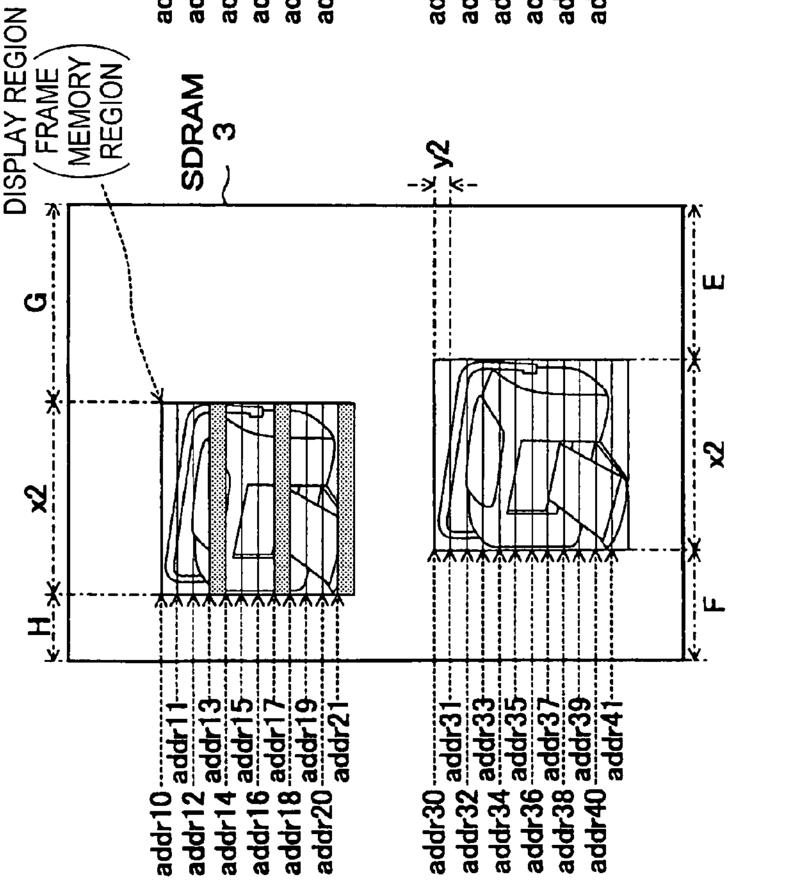

FIG. 29A is a figure showing the SDRAM 3 upon completion of the image data transfer for the channel 8.

Next, as LINKEN of the channel 8 is "1" and LINKCHN is "9," the state machine 12 performs a processing for the channel 9. As TRGCNT of the channel 9 is "0d15," the state machine 12, upon counting the trigger signal (which is VSYNC EVEN because TRGSRC of the channel 1 is "0b000" in this case) 15 times, in other words, 0.5 seconds later, makes the DMA controller 14 start an image data transfer for the channel 9. By this, the image data in the rectangular region having the width x2 and the height y2 with the address addr33 as being a head address is copied to the rectangular region having the width x2 and the height y2 with the address addr13 as being a head address.

Next, as LINKEN of the channel 9 is "1" and LINKCHN is "10," the state machine 12 performs a processing for the channel 10. As TRGCNT of the channel 10 is "0d0," the state machine 12 immediately makes the DMA controller 14 start an image data transfer for the channel 10. By this, the image data in the rectangular region having the width x2 and the height y2 with the address addr37 as being a head address is copied to the rectangular region having the width x2 and the height y2 with the address addr17 as being a head address.

Next, as LINKEN of the channel 10 is "1" and LINKCHN is "11," the state machine 12 performs a processing for the channel 11. As TRGCNT of the channel 11 is "0d0," the state machine 12 immediately makes the DMA controller 14 start an image data transfer for the channel 11. By this, the image data in the rectangular region having the width x2 and the height y2 with the address addr41 as being a head address is copied to the rectangular region having the width x2 and the height y2 with the address addr21 as being a head address.

FIG. 29B is a figure showing the SDRAM 3 upon completion of the image data transfer for the channel 11.

In this manner, in accordance with the present embodiment, the CPU 2 writes channels to the RAM 13, whereby the data transfer function of the display control circuit 5 can be readily expanded, and a blind display can be readily realized. Also, while a blind display is performed (in other words, while the state machine 12 is performing the processing for the channel 0 through the channel 11), the CPU 2 does not need to perform any processing, such that the load on the CPU can be alleviated while the blind display is performed, and the power consumption of the entire system 1 can be reduced.

Next, as a fourth concrete example of operations of the display control circuit 5, a case of performing a slide-in display is described. First, the CPU 2 writes image data in the SDRAM 3 (see FIG. 1), and also writes channels in the RAM 13 (see FIG. 2).

Figure 30:
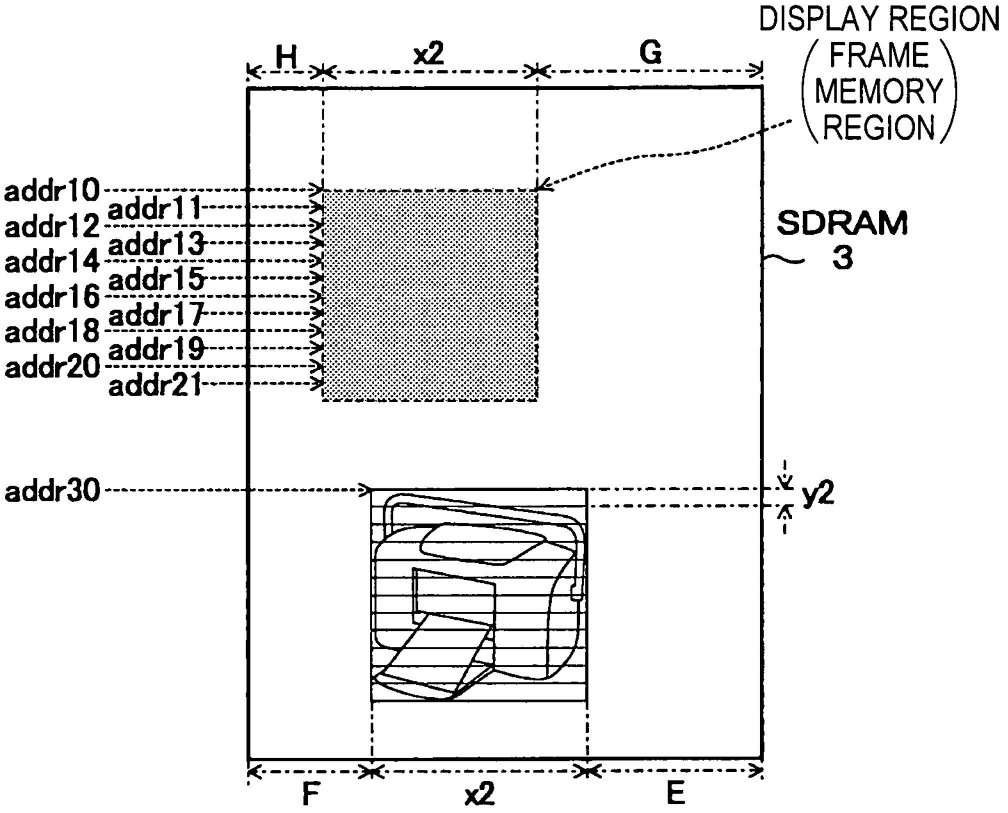
FIG. 30 is a figure showing an example of image data stored in SDRAM shown in FIG. 1.

FIG. 30 is a figure showing an example of image data written to the SDRAM 3. It is noted that the SDRAM 3 is not a display body but is a memory circuit, and what is written to the SDRAM 3 is image data. However, for ready understanding, an image represented by the image data is indicated in the SDRAM 3.

In this example, a rectangular region within the SDRAM 3 having a width x2 and a height y2×12 with an address addr10 as being a head address is set as a display region (frame memory region), and it is assumed that an image based on the image data within the rectangular region is displayed on the LCD panel 7 (see FIG. 1). In the present example, it is assumed that half-tone image data is written to the display region. It is noted that a height between the address addr10 and an address addr11 in the display region, a height between the address addr11 and an address addr12 in the display region, a height between the address addr12 and an address addr13 in the display region, a height between the address addr13 and an address addr14 in the display region, a height between the address addr14 and an address addr15 in the display region, a height between the address addr15 and an address addr16 in the display region, a height between the address addr16 and an address addr17 in the display region, a height between the address addr17 and an address addr18 in the display region, a height between the address addr18 and an address addr19 in the display region, a height between the address addr19 and an address addr20 in the display region, and a height between the address addr20 and an address addr21 in the display region are each assumed to be y2.

Also, in a rectangular region within the SDRAM 3 having a width x2 and a height y2×12 with an address addr30 as being a head address, image data is stored. However, as this rectangular region is not a display region (frame memory region), an image based on the image data within the rectangular region shall not be displayed on the LCD panel 7.

Figure 31:
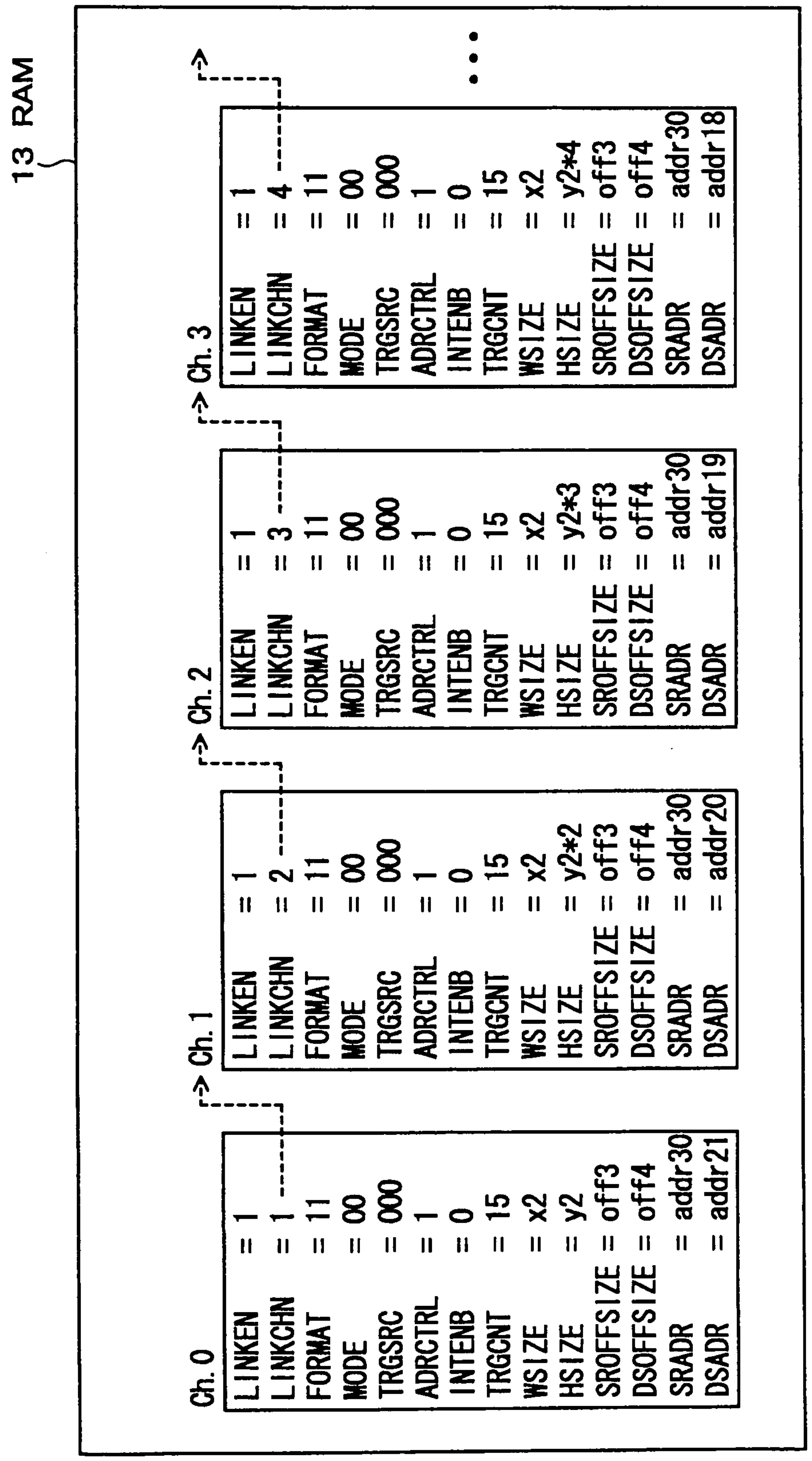
FIG. 31 is a figure showing an example of channels stored in RAM shown in FIG. 2.
Figure 32:
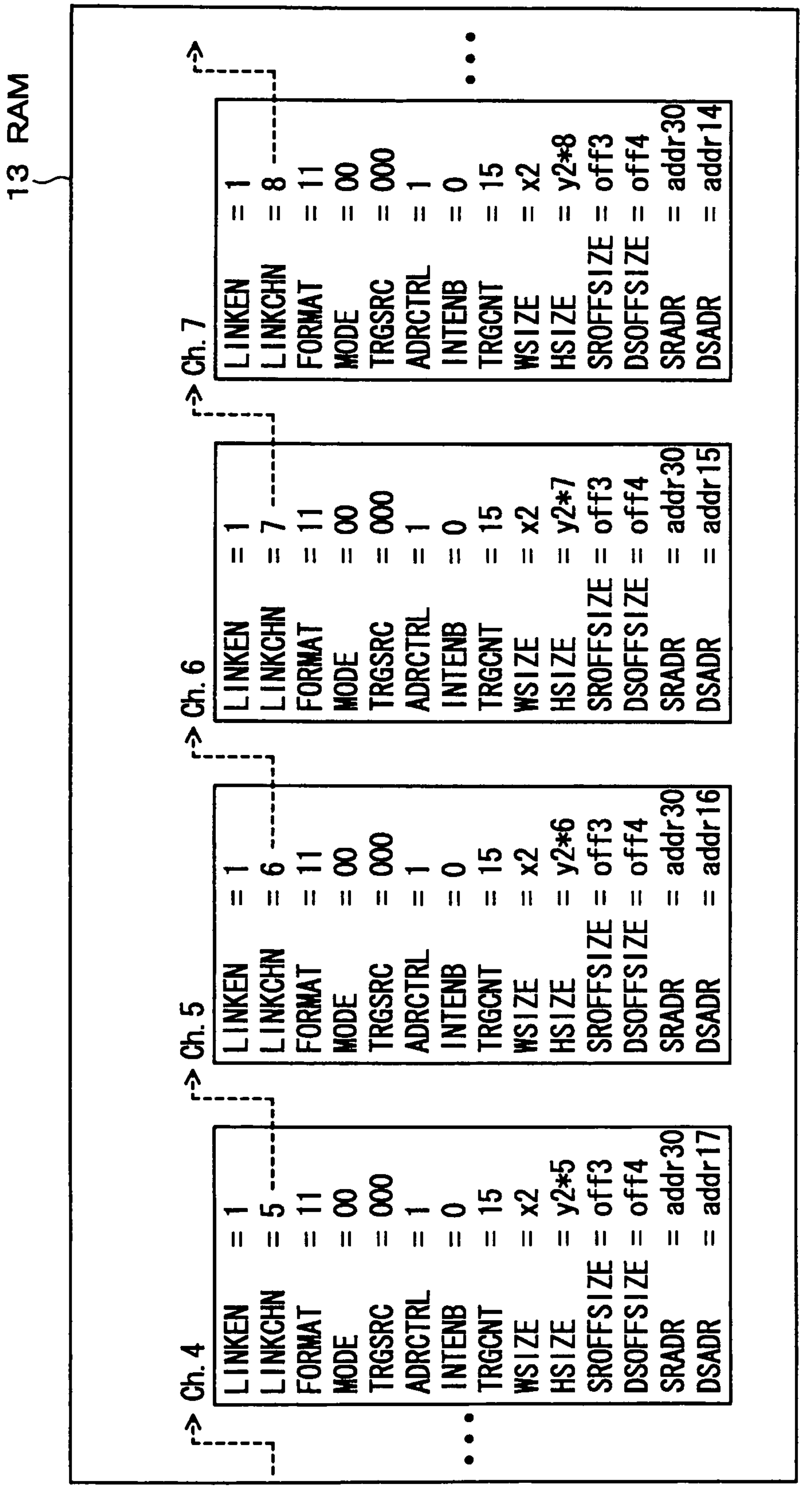
FIG. 32 is a figure showing an example of channels stored in RAM shown in FIG. 2.
Figure 33:
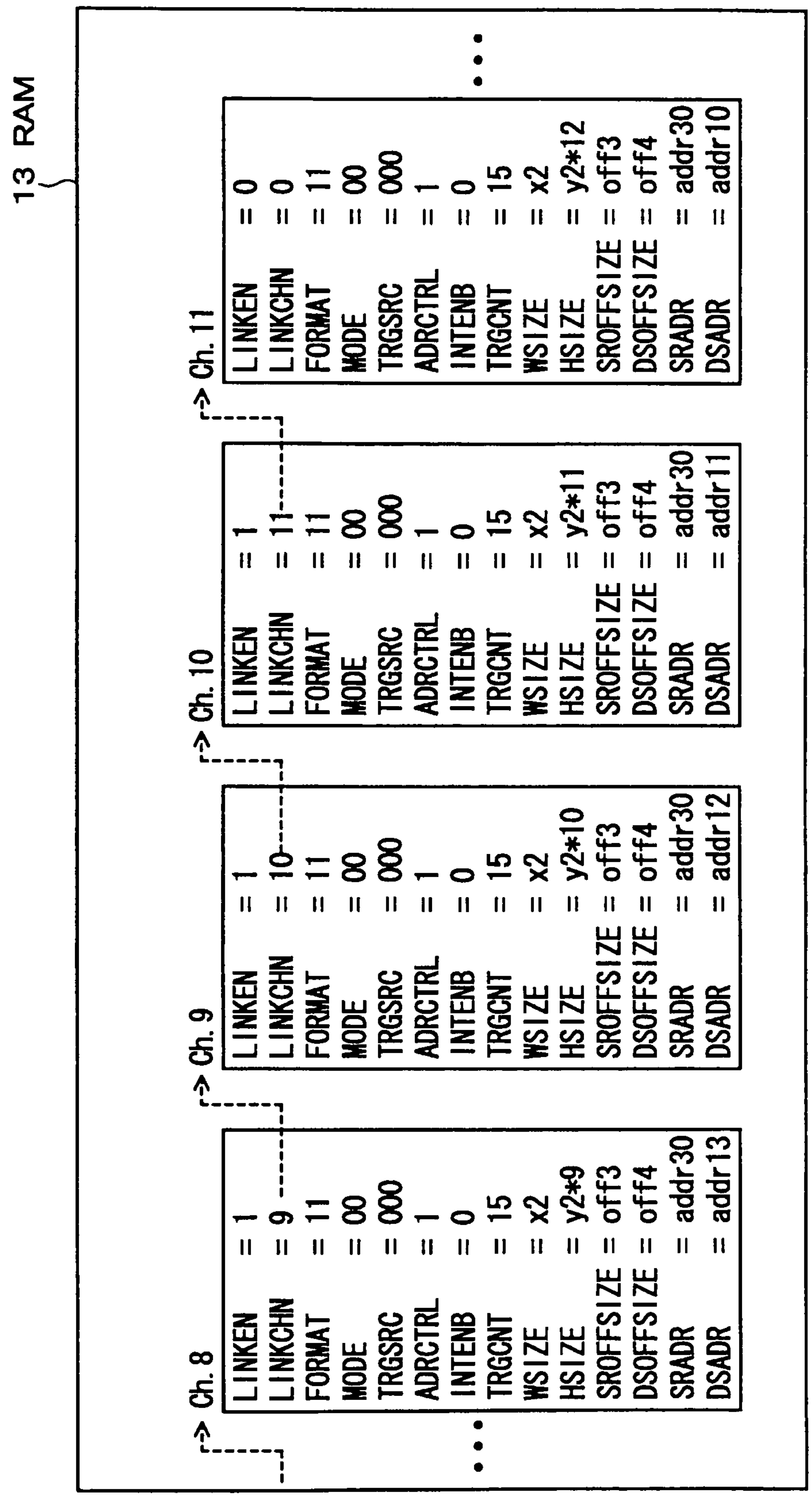
FIG. 33 is a figure showing an example of channels stored in RAM shown in FIG. 2.

FIGS. 31-33 are figures showing examples of the channels written to the RAM 13. As shown in FIG. 31, the channel 0 stores "1" as LINKEN, "1" as LINKCHN, "0b11" as FORMAT, "0b00" as MODE, "0b000" as TRGSRC, "1" as ADRCTRL, "0" as INTENB, "0d15" as TRGCNT, "x2" as WSIZE, "y2" as HSIZE, "off3" as SROFFSIZE, "off4" as DSOFFSIZE, "addr30" as SRADR, and "addr21" as DSADR, respectively. It is noted that "off3" is the sum of E and F shown in FIG. 30, and "off4" is the sum of G and H shown in FIG. 30.

The channel 1 stores "1" as LINKEN, "2" as LINKCHN, "0b11" as FORMAT, "0b00" as MODE, "0b000" as TRGSRC, "1" as ADRCTRL, "0" as INTENB, "0d15" as TRGCNT, "x2" as WSIZE, "y2×2" as HSIZE, "off3" as SROFFSIZE, "off4" as DSOFFSIZE, "addr30" as SRADR, and "addr20" as DSADR, respectively.

The channel 2 stores "1" as LINKEN, "3" as LINKCHN, "0b11" as FORMAT, "0b00" as MODE, "0b000" as TRGSRC, "1" as ADRCTRL, "0" as INTENB, "0d15" as TRGCNT, "x2" as WSIZE, "y2×3" as HSIZE, "off3" as SROFFSIZE, "off4" as DSOFFSIZE, "addr30" as SRADR, and "addr19" as DSADR, respectively.

The channel 3 stores "1" as LINKEN, "4" as LINKCHN, "0b11" as FORMAT, "0b00" as MODE, "0b000" as TRGSRC, "1" as ADRCTRL, "0" as INTENB, "0d15" as TRGCNT, "x2" as WSIZE, "y2×4" as HSIZE, "off3" as SROFFSIZE, "off4" as DSOFFSIZE, "addr30" as SRADR, and "addr18" as DSADR, respectively.

Also, as shown in FIG. 32, the channel 4 stores "1" as LINKEN, "5" as LINKCHN, "0b11" as FORMAT, "0b00" as MODE, "0b000" as TRGSRC, "1" as ADRCTRL, "0" as INTENB, "0d15" as TRGCNT, "x2" as WSIZE, "y2×5" as HSIZE, "off3" as SROFFSIZE, "off4" as DSOFFSIZE, "addr30" as SRADR, and "addr17" as DSADR, respectively.

The channel 5 stores "1" as LINKEN, "6" as LINKCHN, "0b11" as FORMAT, "0b00" as MODE, "0b000" as TRGSRC, "1" as ADRCTRL, "0" as INTENB, "0d15" as TRGCNT, "x2" as WSIZE, "y2×6" as HSIZE, "off3" as SROFFSIZE, "off4" as DSOFFSIZE, "addr30" as SRADR, and "addr16" as DSADR, respectively.

The channel 6 stores "1" as LINKEN, "7" as LINKCHN, "0b11" as FORMAT, "0b00" as MODE, "0b000" as TRGSRC, "1" as ADRCTRL, "0" as INTENB, "0d15" as TRGCNT, "x2" as WSIZE, "y2×7" as HSIZE, "off3" as SROFFSIZE, "off4" as DSOFFSIZE, "addr30" as SRADR, and "addr15" as DSADR, respectively.

The channel 7 stores "1" as LINKEN, "8" as LINKCHN, "0b11" as FORMAT, "0b00" as MODE, "0b000" as TRGSRC, "1" as ADRCTRL, "0" as INTENB, "0d15" as TRGCNT, "x2" as WSIZE, "y2×8" as HSIZE, "off3" as SROFFSIZE, "off4" as DSOFFSIZE, "addr30" as SRADR, and "addr14" as DSADR, respectively.

Further, as shown in FIG. 33, the channel 8 stores "1" as LINKEN, "9" as LINKCHN, "0b11" as FORMAT, "0b00" as MODE, "0b000" as TRGSRC, "1" as ADRCTRL, "0" as INTENB, "0d15" as TRGCNT, "x2" as WSIZE, "y2×9" as HSIZE, "off3" as SROFFSIZE, "off4" as DSOFFSIZE, "addr30" as SRADR, and "addr13" as DSADR, respectively.

The channel 9 stores "1" as LINKEN, "10" as LINKCHN, "0b11" as FORMAT, "0b00" as MODE, "0b000" as TRGSRC, "1" as ADRCTRL, "0" as INTENB, "0d15" as TRGCNT, "x2" as WSIZE, "y2×10" as HSIZE, "off3" as SROFFSIZE, "off4" as DSOFFSIZE, "addr30" as SRADR, and "addr12" as DSADR, respectively.

The channel 10 stores "1" as LINKEN, "11" as LINKCHN, "0b11" as FORMAT, "0b00" as MODE, "0b000" as TRGSRC, "1" as ADRCTRL, "0" as INTENB, "0d15" as TRGCNT, "x2" as WSIZE, "y2×11" as HSIZE, "off3" as SROFFSIZE, "off4" as DSOFFSIZE, "addr30" as SRADR, and "addr11" as DSADR, respectively.

The channel 11 stores "0" as LINKEN, "0" as LINKCHN, "0b11" as FORMAT, "0b00" as MODE, "0b000" as TRGSRC, "1" as ADRCTRL, "0" as INTENB, "0d15" as TRGCNT, "x2" as WSIZE, "y2×12" as HSIZE, "off3" as SROFFSIZE, "off4" as DSOFFSIZE, "addr30" as SRADR, and "addr10" as DSADR, respectively.

Next, the CPU 2 writes "0d0" at bits 5-0 of a register "ibitblt0_DMAENB," and "1" at a bit 7 of a register "ibitblt0_DMAENB," respectively.

As TRGCNT of the channel 0 is "0d15," the state machine 12, upon counting the trigger signal (which is VSYNC EVEN because TRGSRC of the channel 0 is "0b000" in this case) 15 times, in other words, 0.5 seconds later, makes the DMA controller 14 start an image data transfer for the channel 0. By this, the image data in the rectangular region having the width x2 and the height y2 with the address addr30 as being a head address is copied to the rectangular region having the width x2 and the height y2 with the address addr21 as being a head address.

Figure 34A:
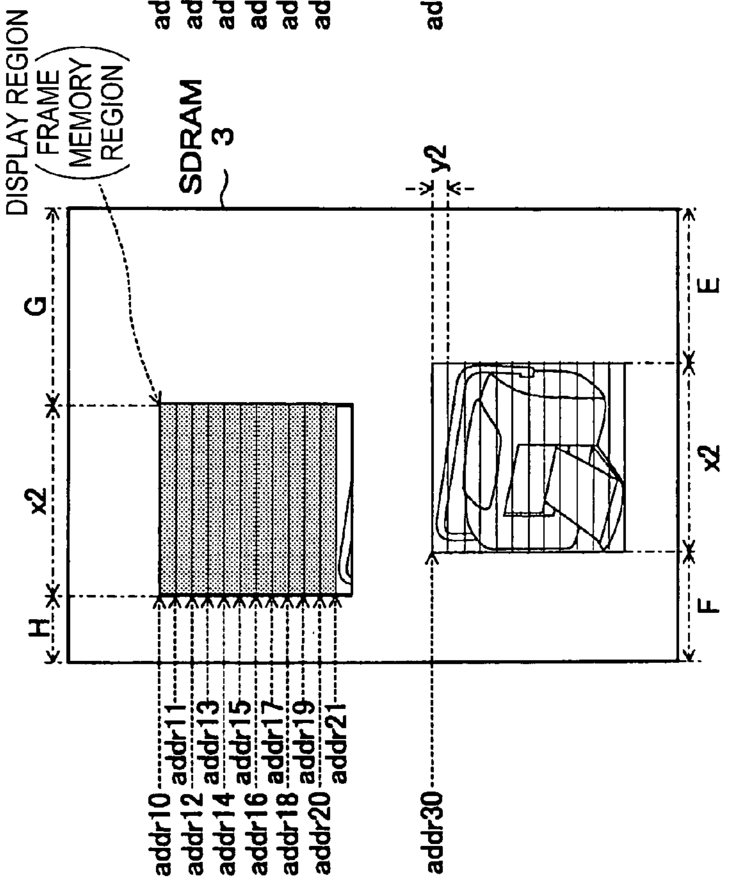
FIGS. 34A and 34B are figures showing examples of image data stored in SDRAM shown in FIG. 1.

FIG. 34A is a figure showing the SDRAM 3 upon completion of the image data transfer for the channel 0.

Next, as LINKEN of the channel 0 is "1" and LINKCHN is "1," the state machine 12 performs a processing for the channel 1. As TRGCNT of the channel 1 is "0d15," the state machine 12, upon counting the trigger signal (which is VSYNC EVEN because TRGSRC of the channel 1 is "0b000" in this case) 15 times, in other words, 0.5 seconds later, makes the DMA controller 14 start an image data transfer for the channel 1. By this, the image data in the rectangular region having the width x2 and the height y2×2 with the address addr30 as being a head address is copied to the rectangular region having the width x2 and the height y2×2 with the address addr20 as being a head address.

Figure 34B:
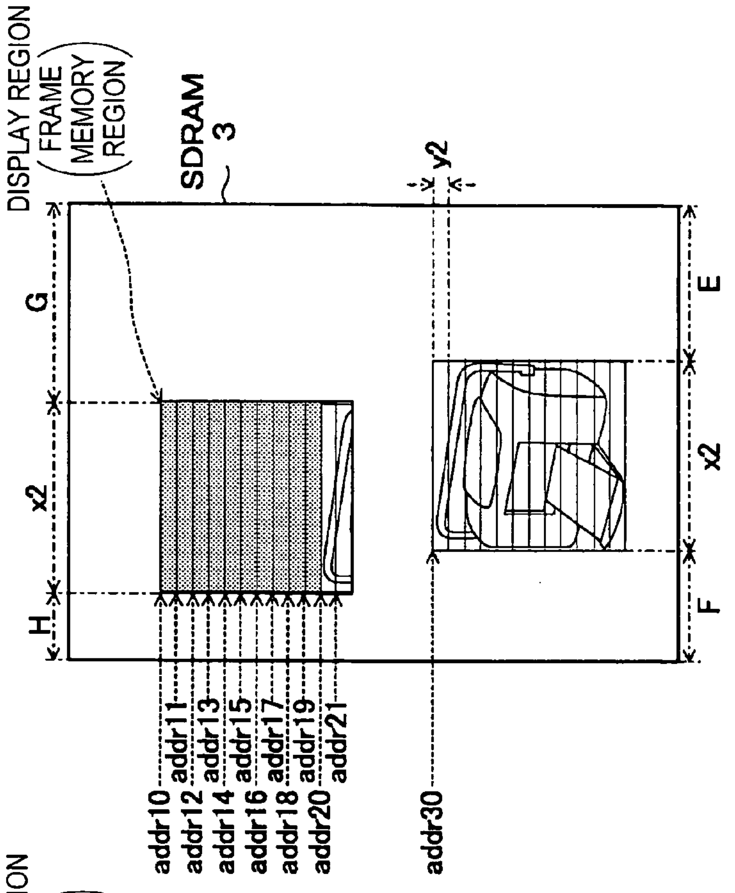

FIG. 34B is a figure showing the SDRAM 3 upon completion of the image data transfer for the channel 1.

Next, as LINKEN of the channel 1 is "1" and LINKCHN is "2," the state machine 12 performs a processing for the channel 2. As TRGCNT of the channel 2 is "0d15," the state machine 12, upon counting the trigger signal (which is VSYNC EVEN because TRGSRC of the channel 1 is "0b000" in this case) 15 times, in other words, 0.5 seconds later, makes the DMA controller 14 start an image data transfer for the channel 2. By this, the image data in the rectangular region having the width x2 and the height y2×3 with the address addr30 as being a head address is copied to the rectangular region having the width x2 and the height y2×3 with the address addr19 as being a head address.

Figure 35A:
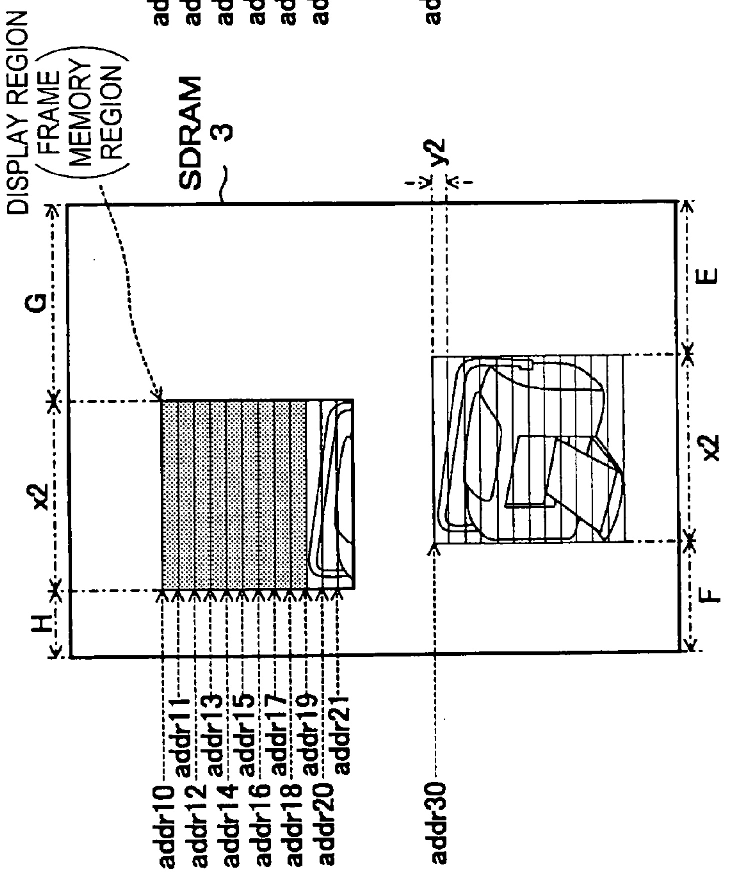
FIGS. 35A and 35B are figures showing examples of image data stored in SDRAM shown in FIG. 1.

FIG. 35A is a figure showing the SDRAM 3 upon completion of the image data transfer for the channel 2.

Next, as LINKEN of the channel 2 is "1" and LINKCHN is "3," the state machine 12 performs a processing for the channel 3. As TRGCNT of the channel 3 is "0d15," the state machine 12, upon counting the trigger signal (which is VSYNC EVEN because TRGSRC of the channel 1 is "0b000" in this case) 15 times, in other words, 0.5 seconds later, makes the DMA controller 14 start an image data transfer for the channel 3. By this, the image data in the rectangular region having the width x2 and the height y2×4 with the address addr30 as being a head address is copied to the rectangular region having the width x2 and the height y2×4 with the address addr18 as being a head address.

Figure 35B:
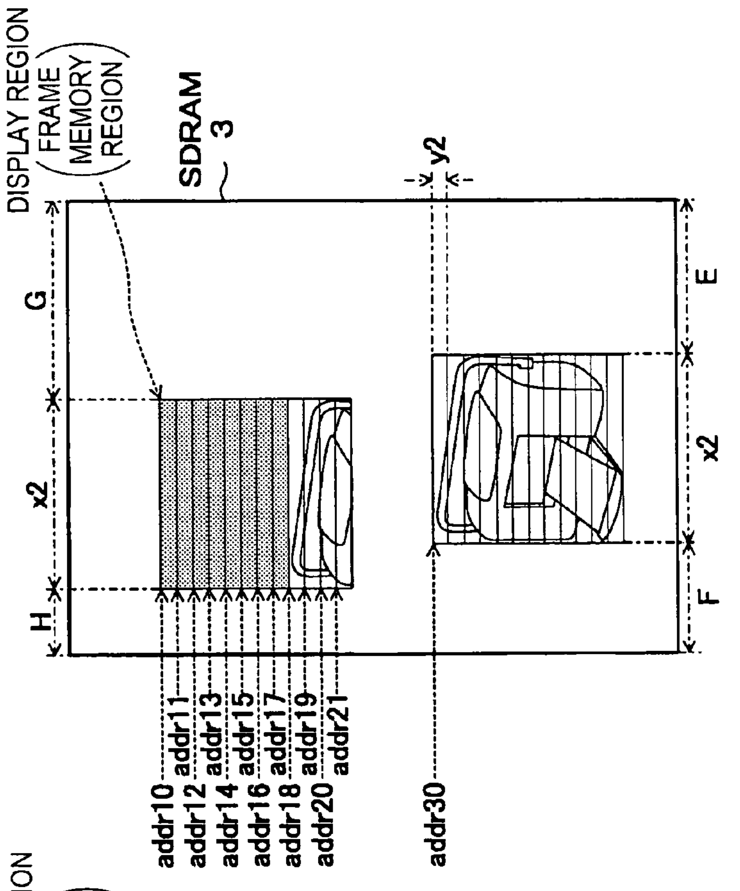

FIG. 35B is a figure showing the SDRAM 3 upon completion of the image data transfer for the channel 3.

Next, as LINKEN of the channel 3 is "1" and LINKCHN is "4," the state machine 12 performs a processing for the channel 4. As TRGCNT of the channel 4 is "0d15," the state machine 12, upon counting the trigger signal (which is VSYNC EVEN because TRGSRC of the channel 1 is "0b000" in this case) 15 times, in other words, 0.5 seconds later, makes the DMA controller 14 start an image data transfer for the channel 4. By this, the image data in the rectangular region having the width x2 and the height y2×5 with the address addr30 as being a head address is copied to the rectangular region having the width x2 and the height y2×5 with the address addr17 as being a head address.

Figure 36A:
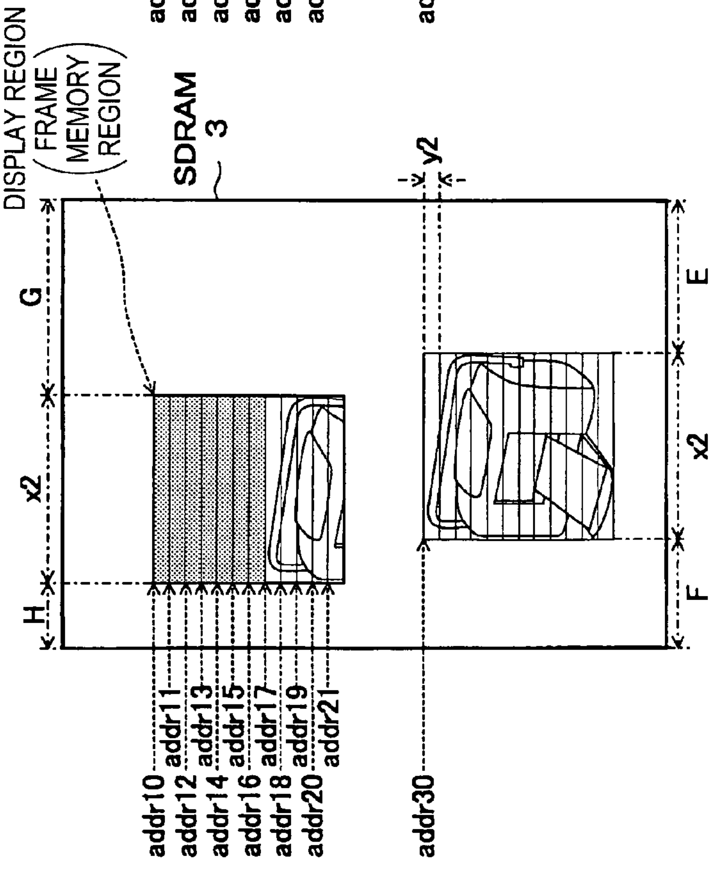
FIGS. 36A and 36B are figures showing examples of image data stored in SDRAM shown in FIG. 1.

FIG. 36A is a figure showing the SDRAM 3 upon completion of the image data transfer for the channel 4.

Next, as LINKEN of the channel 4 is "1" and LINKCHN is "5," the state machine 12 performs a processing for the channel 5. As TRGCNT of the channel 5 is "0d15," the state machine 12, upon counting the trigger signal (which is VSYNC EVEN because TRGSRC of the channel 1 is "0b000" in this case) 15 times, in other words, 0.5 seconds later, makes the DMA controller 14 start an image data transfer for the channel 5. By this, the image data in the rectangular region having the width x2 and the height y2×6 with the address addr30 as being a head address is copied to the rectangular region having the width x2 and the height y2×6 with the address addr16 as being a head address.

Figure 36B:
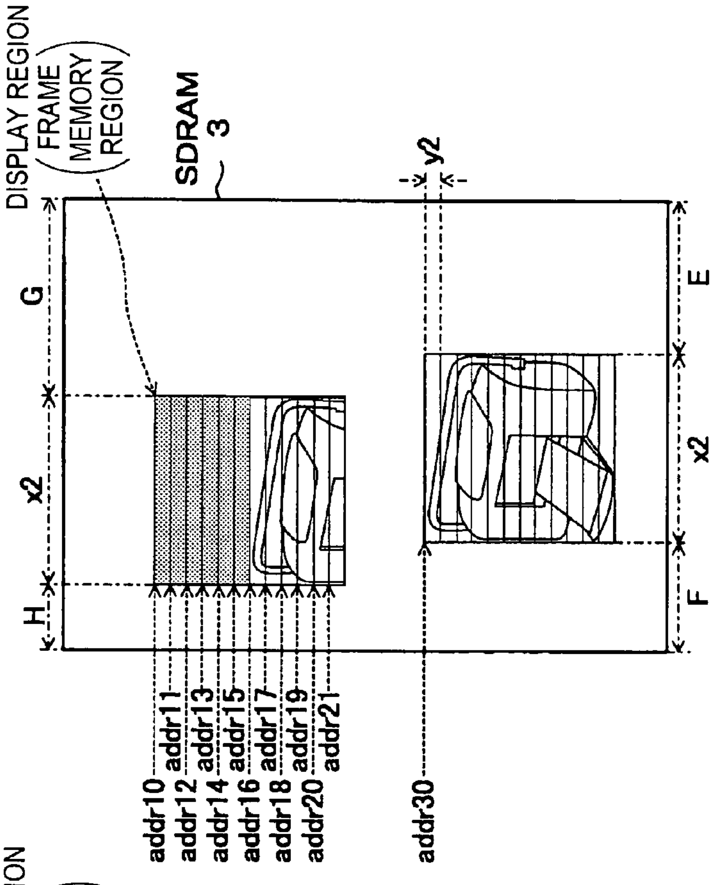

FIG. 36B is a figure showing the SDRAM 3 upon completion of the image data transfer for the channel 5.

Next, as LINKEN of the channel 5 is "1" and LINKCHN is "6," the state machine 12 performs a processing for the channel 6. As TRGCNT of the channel 6 is "0d15," the state machine 12, upon counting the trigger signal (which is VSYNC EVEN because TRGSRC of the channel 1 is "0b000" in this case) 15 times, in other words, 0.5 seconds later, makes the DMA controller 14 start an image data transfer for the channel 6. By this, the image data in the rectangular region having the width x2 and the height y2×7 with the address addr30 as being a head address is copied to the rectangular region having the width x2 and the height y2×7 with the address addr15 as being a head address.

Figure 37B:
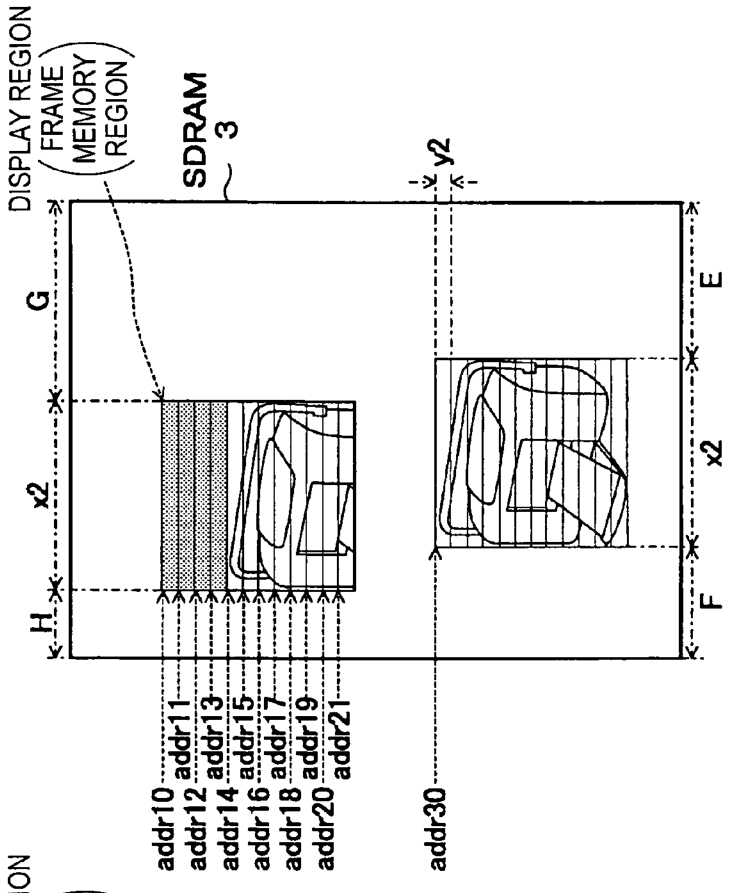
FIGS. 37A and 37B are figures showing examples of image data stored in SDRAM shown in FIG. 1.
Figure 37A:
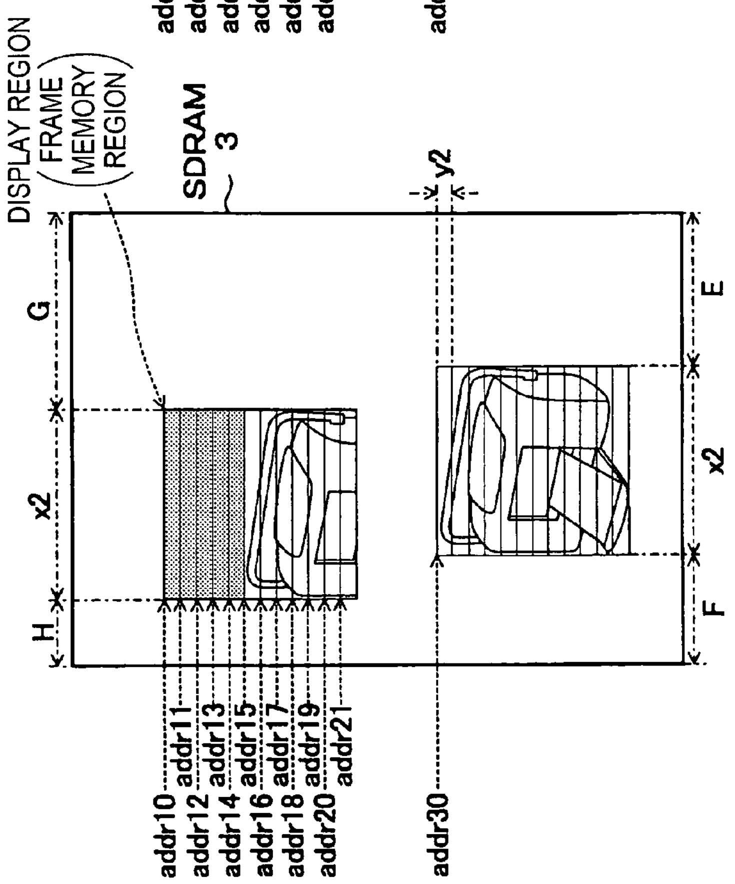

FIG. 37A is a figure showing the SDRAM 3 upon completion of the image data transfer for the channel 6.

Next, as LINKEN of the channel 6 is "1" and LINKCHN is "7," the state machine 12 performs a processing for the channel 7. As TRGCNT of the channel 7 is "0d15," the state machine 12, upon counting the trigger signal (which is VSYNC EVEN because TRGSRC of the channel 1 is "0b000" in this case) 15 times, in other words, 0.5 seconds later, makes the DMA controller 14 start an image data transfer for the channel 7. By this, the image data in the rectangular region having the width x2 and the height y2×8 with the address addr30 as being a head address is copied to the rectangular region having the width x2 and the height y2×8 with the address addr14 as being a head address.

FIG. 37B is a figure showing the SDRAM 3 upon completion of the image data transfer for the channel 7.

Next, as LINKEN of the channel 7 is "1" and LINKCHN is "8," the state machine 12 performs a processing for the channel 8. As TRGCNT of the channel 8 is "0d15," the state machine 12, upon counting the trigger signal (which is VSYNC EVEN because TRGSRC of the channel 1 is "0b000" in this case) 15 times, in other words, 0.5 seconds later, makes the DMA controller 14 start an image data transfer for the channel 8. By this, the image data in the rectangular region having the width x2 and the height y2×9 with the address addr30 as being a head address is copied to the rectangular region having the width x2 and the height y2×9 with the address addr13 as being a head address.

Figure 38A:
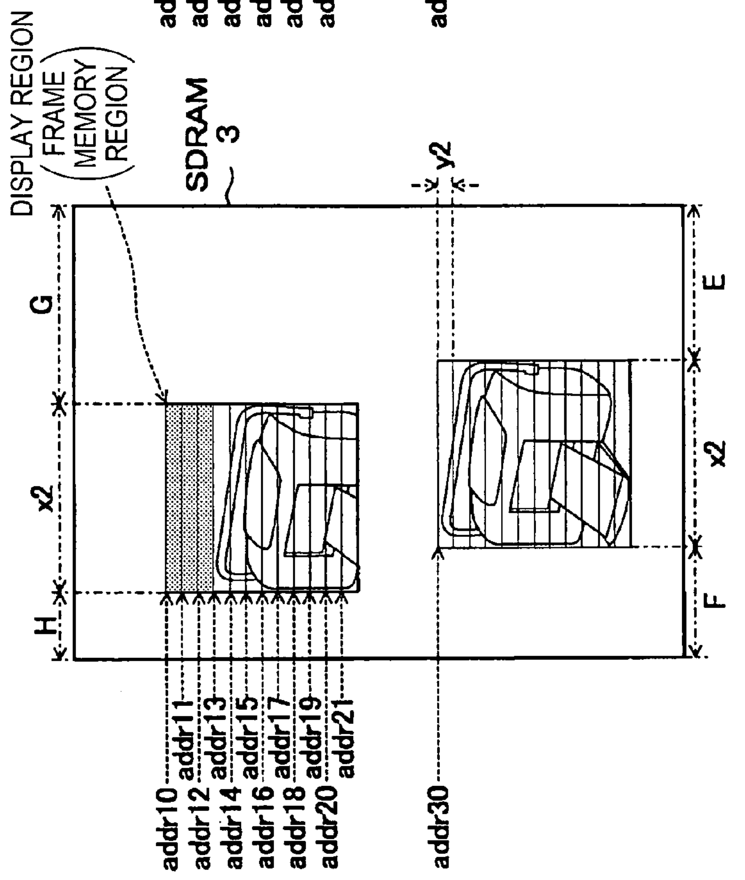
FIGS. 38A and 38B are figures showing examples of image data stored in SDRAM shown in FIG. 1.

FIG. 38A is a figure showing the SDRAM 3 upon completion of the image data transfer for the channel 8.

Next, as LINKEN of the channel 8 is "1" and LINKCHN is "9," the state machine 12 performs a processing for the channel 9. As TRGCNT of the channel 9 is "0d15," the state machine 12, upon counting the trigger signal (which is VSYNC EVEN because TRGSRC of the channel 1 is "0b000" in this case) 15 times, in other words, 0.5 seconds later, makes the DMA controller 14 start an image data transfer for the channel 9. By this, the image data in the rectangular region having the width x2 and the height y2×10 with the address addr30 as being a head address is copied to the rectangular region having the width x2 and the height y2×10 with the address addr12 as being a head address.

Figure 38B:
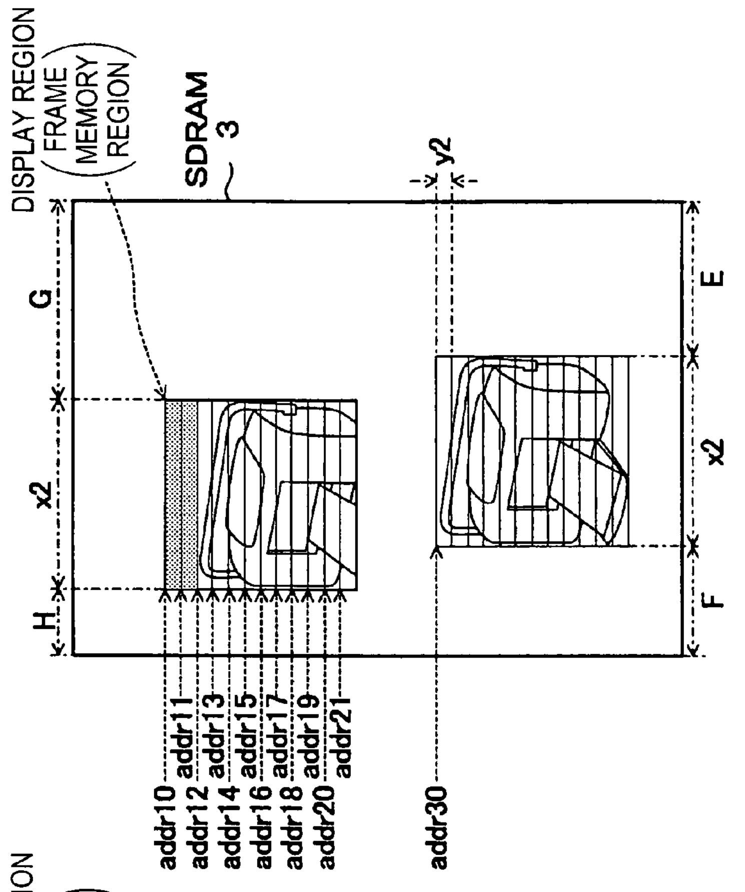

FIG. 38B is a figure showing the SDRAM 3 upon completion of the image data transfer for the channel 9.

Next, as LINKEN of the channel 9 is "1" and LINKCHN is "10," the state machine 12 performs a processing for the channel 10. As TRGCNT of the channel 10 is "0d15," the state machine 12, upon counting the trigger signal (which is VSYNC EVEN because TRGSRC of the channel 1 is "0b000" in this case) 15 times, in other words, 0.5 seconds later, makes the DMA controller 14 start an image data transfer for the channel 10. By this, the image data in the rectangular region having the width x2 and the height y2×11 with the address addr30 as being a head address is copied to the rectangular region having the width x2 and the height y2×11 with the address addr11 as being a head address.

Figure 39B:
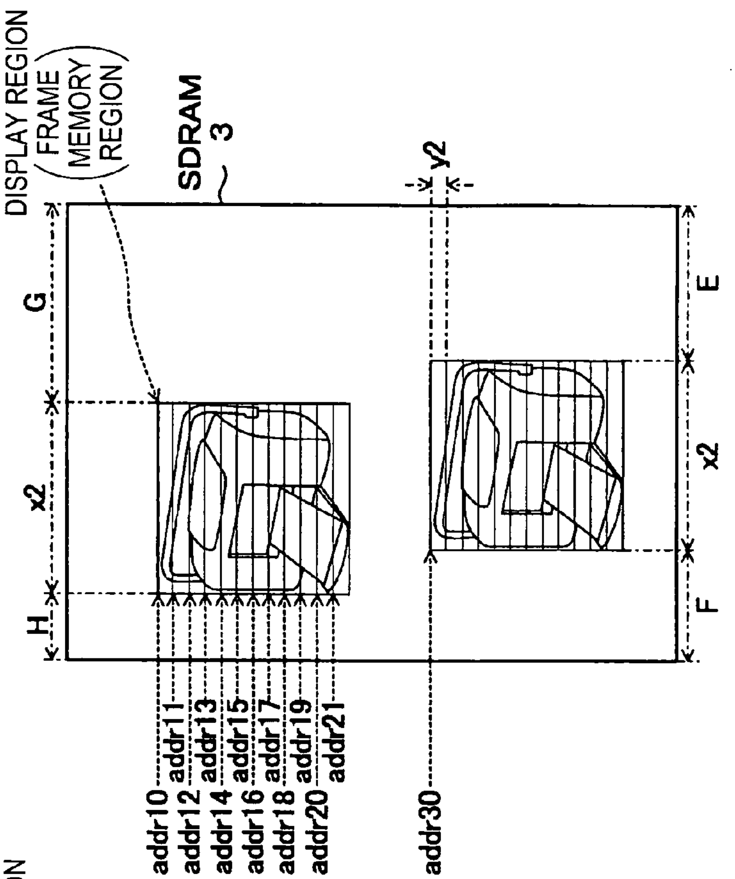
FIGS. 39A and 39B are figures showing examples of image data stored in SDRAM shown in FIG. 1.
Figure 39A:
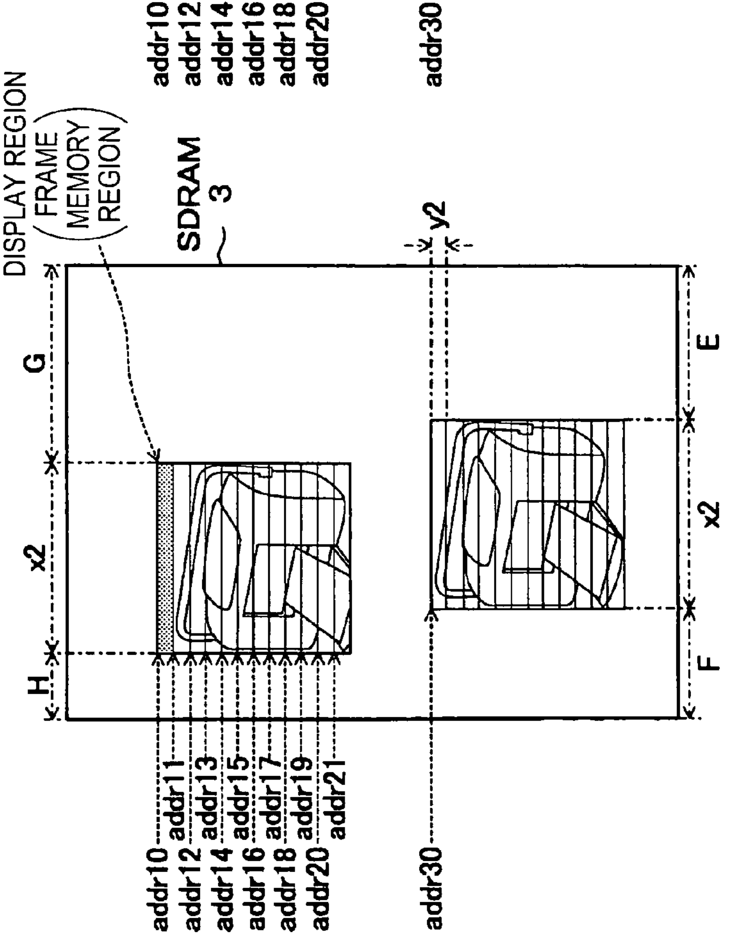

FIG. 39A is a figure showing the SDRAM 3 upon completion of the image data transfer for the channel 10.

Next, as LINKEN of the channel 10 is "1" and LINKCHN is "11," the state machine 12 performs a processing for the channel 11. As TRGCNT of the channel 11 is "0d15," the state machine 12, upon counting the trigger signal (which is VSYNC EVEN because TRGSRC of the channel 1 is "0b000" in this case) 15 times, in other words, 0.5 seconds later, makes the DMA controller 14 start an image data transfer for the channel 11. By this, the image data in the rectangular region having the width x2 and the height y2×12 with the address addr30 as being a head address is copied to the rectangular region having the width x2 and the height y2×12 with the address addr10 as being a head address.

FIG. 39B is a figure showing the SDRAM 3 upon completion of the image data transfer for the channel 11.

In this manner, in accordance with the present embodiment, the CPU 2 writes channels to the RAM 13, whereby the data transfer function of the display control circuit 5 can be readily expanded, and a slide-in display can be readily realized. Also, while a slide-in display is performed (in other words, while the state machine 12 is performing the processing for the channel 0 through the channel 11), the CPU 2 does not need to perform any processing, such that the load on the CPU can be alleviated while the slide-in display is performed.

It is noted that, in the present concrete example, the case of a slide-in display in a height direction is described. Similarly, a slide-in display in a width direction is also possible. Also, characters may be slide-in displayed in a height direction or a width direction with a transparency process added, thereby realizing telops.

INDUSTRIAL AVAILABILITY

The invention is available for data transfer circuits that transfer data. The data transfer circuits are available for image data transfer and the like.

What is claimed is:

1. A data transfer circuit that transfers a first kind of data stored in an external memory circuit, the data transfer circuit comprising:

an internal memory circuit that is capable of, by an external circuit, writing and/or rewriting a second kind of data including information for one region as a transfer source in the external memory circuit and another region as a transfer destination in the external memory circuit;

a transfer circuit that transfers the first kind of data; and a control circuit that makes the transfer circuit transfer the first kind of data stored in the one region to the other region based on the second kind of data, a first data of the second kind of data including at least link information that links to a second data of the second kind of data, the link information including a link to image data for transfer upon completion of the transfer of the first kind of data, the control circuit controlling the transfer circuit based on the link information, and the control circuit receiving a trigger signal input, and controlling transfer timing of the transfer circuit based on the trigger signal input.

2. A data transfer circuit according to claim 1, the second kind of data including information for a timing of a transfer of the first kind of data stored in the one region to the another region, the control circuit making the transfer circuit perform a transfer of the first kind of data stored in the one region to the other region according to a timing based on the information for the timing.

3. A data transfer circuit according to claim 1, the first kind of data stored in the external memory circuit being image data, the other region being a region within a frame memory region, and the second kind of data including information for image data stored in the one region and transparency processing based on image data stored in the other region, and further comprising a transparency processing circuit that performs a transparency processing on the image data stored in the one region and the image data stored in the other region based on the information for transparency processing, the transfer circuit transferring the image data stored in the one region on which the transparency processing has been rendered by the transparency processing circuit to the other region.

4. A data transfer circuit according to claim 1, the internal memory circuit storing a group of the second kind of data linked together, and the control circuit making the transfer circuit transfer a group of the first kind of data based on the group of the second kind of data.

5. A data transfer circuit according to claim 1, the internal memory circuit storing a plurality of groups of the second kind of data, each being linked together, and the control circuit making the transfer circuit transfer a plurality of groups of the first kind of data in parallel based on the plurality of groups of the second kind of data.

6. A semiconductor integrated circuit comprising the data transfer circuit set forth in claim 1.

* * * * *